United States Patent
Irvin, Sr. et al.

(10) Patent No.: US 8,623,212 B2
(45) Date of Patent: Jan. 7, 2014

(54) WATER TREATMENT AND REVITALIZATION SYSTEM AND METHOD

(75) Inventors: Whitaker Ben Irvin, Sr., Park City, UT (US); Luis Octavio Perez Hirschfeld, Ciudad Juarez (MX)

(73) Assignee: QWTIP LLC, Park City, UT (US)

(*) Notice: Subject to any disclaimer, the term of this patent is extended or adjusted under 35 U.S.C. 154(b) by 0 days.

(21) Appl. No.: 13/620,815

(22) Filed: Sep. 15, 2012

(65) Prior Publication Data
US 2013/0008541 A1    Jan. 10, 2013

Related U.S. Application Data

(63) Continuation of application No. 13/213,614, filed on Aug. 19, 2011.

(60) Provisional application No. 61/376,447, filed on Aug. 24, 2010.

(51) Int. Cl.
*B01D 21/26* (2006.01)
*B01D 35/28* (2006.01)

(52) U.S. Cl.
USPC .......... 210/331; 210/330; 210/512.3; 415/90; 55/345; 55/403; 55/406

(58) Field of Classification Search
USPC ......... 210/780, 787, 330, 331, 512.3; 415/90; 55/345, 403, 406
See application file for complete search history.

(56) References Cited

U.S. PATENT DOCUMENTS

| | | | |
|---|---|---|---|
| 1,061,206 A * | 5/1913 | Telsa | 415/90 |
| 3,632,221 A | 1/1972 | Uehling | |
| 4,042,351 A | 8/1977 | Anderson | |
| 4,118,207 A | 10/1978 | Wilhelm | |
| 4,361,490 A | 11/1982 | Saget | |
| 5,215,501 A | 6/1993 | Ushikoshi | |

(Continued)

FOREIGN PATENT DOCUMENTS

| | | |
|---|---|---|
| AT | 196680 | 3/1958 |
| EP | 1770717 A1 | 4/2007 |

(Continued)

OTHER PUBLICATIONS

Coats, Callum, "Living Energies," 2001, pp. 107-117, 156-192, 197-200, and 275-293.

(Continued)

*Primary Examiner* — David A Reifsnyder
(74) *Attorney, Agent, or Firm* — Cahn & Samuels, LLP

(57) ABSTRACT

A system and method are provided in at least one embodiment to filter water through a vortex leading into a disk-pack turbine having an expansion chamber and outlets into a discharge chamber that leads to at least one discharge port. In a further embodiment, the system includes an intake module, a vortex module, a disk-pack module, and a motor for driving the disk-pack turbine. The intake module brings water into the system and routes the water to the vortex module that speeds up the water into a vortex that flows into the disk-pack turbine that discharges into a discharge chamber that leads to at least one discharge port. The disk-pack turbine includes a plurality of disks that are spaced apart forming chambers between the disks that provide at least one passageway between the expansion chamber and the discharge chamber.

22 Claims, 37 Drawing Sheets

(56) References Cited

U.S. PATENT DOCUMENTS

| | | | |
|---|---|---|---|
| 5,248,238 | A | 9/1993 | Ishida et al. |
| 5,254,250 | A * | 10/1993 | Rolchigo et al. ............ 210/330 |
| 5,498,329 | A | 3/1996 | Laminen et al. |
| 5,778,696 | A | 7/1998 | Conner |
| 6,116,430 | A | 9/2000 | Horton |
| 6,328,527 | B1 | 12/2001 | Conrad et al. |
| 6,890,443 | B2 | 5/2005 | Adams |
| 7,341,424 | B2 | 3/2008 | Dial |
| 7,489,060 | B2 | 2/2009 | Qu et al. |
| 2004/0009063 | A1 | 1/2004 | Polacsek |
| 2004/0107681 | A1 | 6/2004 | Carlsson et al. |
| 2004/0159085 | A1 | 8/2004 | Carlsson et al. |
| 2006/0054549 | A1 | 3/2006 | Schoendorfer |
| 2006/0272624 | A1 | 12/2006 | Pettersson |
| 2007/0144956 | A1 | 6/2007 | Park et al. |
| 2008/0067813 | A1 | 3/2008 | Baarman et al. |
| 2008/0168899 | A1 | 7/2008 | Decker |
| 2009/0314161 | A1 | 12/2009 | Al-Alusi et al. |
| 2010/0107647 | A1 | 5/2010 | Bergen |
| 2010/0180854 | A1 | 7/2010 | Baumann et al. |
| 2011/0038707 | A1 | 2/2011 | Blackstone |
| 2012/0048813 | A1 | 3/2012 | Irvin et al. |
| 2012/0051908 | A1 | 3/2012 | Irvin |

FOREIGN PATENT DOCUMENTS

| | | |
|---|---|---|
| GB | 1187632 | 4/1970 |
| GB | 1262961 | 2/1972 |
| JP | 2009293984 A | 11/2009 |
| WO | 2004112938 A1 | 12/2004 |
| WO | 2008054131 A1 | 5/2008 |
| WO | 2009024154 A1 | 2/2009 |

OTHER PUBLICATIONS

Schauberger, Viktor, translated and edited by Callum Coats, "The Energy Evolution: Harnessing Free Energy from Nature," vol. 4 of the Eco-Technology Series, Mar. 2001, pp. 9-28, 62-63, 104-113, 130-142, 164-195, and 200-203.

Schauberger, Viktor, translated and edited by Callum Coats, "The Fertile Earth: Nature's Energies in Agriculture, Soil Fertilisation and Forestry," vol. Three of Eco-Technology Series, Mar. 2001, pp. 26-29, 39-43, 48-50, 57-68, and 72-74.

GuardianTrader, Genesis Vortex, http://guardiantrader.com/Genesis_Vortex.html, printed Jul. 12, 2011.

Natural Energy Works, "Wasserwirbler (Water Vortex Shower)", http://www.orgonclab.orgicart/yvortex.htm, printed Jul. 12, 2011.

Wikipedia, "Tesla Turbine," http://en.wikipedia.org/wiki/Tesla_turbine, printed Mar. 23, 2010.

Jens Fischer, "Original Martin-Wirbelwasser", http://fischer-wirbelwasser.de/Schauberger/schauberger.html, printed Jul. 12, 2011.

Fractal Water, LLC, "Structured water is Fractal Waters Implosion nozzle Vortex", copyrighted 2012, printed on Dec. 28, 2012 from http://www_fractalwatercom/vortext.

Fractal Water, LLC, "Magnetic Water Treatment with the Fractal Water Super Imploder Magnetics", copyrighted 2012, printed on Dec. 28, 2012 from http://www.fractalwatercom/magnetics/.

Fractal Water, LLC, "Fractal Water: Vortex Magnetic Systems:: Physics of the Imploder Vortex Nozzle", copyrighted 2012, printed on Dec. 28, 2012 from http://www.fractalwatercom/science/physics-of-the-imploder-vortex-nozzle/.

Fractal Water, LLC, "Buy the Super Imploder from Fractal Water, Vortex Magnetic System", copyrighted 2012, printed on Dec. 28, 2012 from http://www.fractalwatercom/products/imploder-magnetic-water.

Fractal Water, LLC, "Implosion water structured vortex", copyrighted 2012, printed on Dec. 28, 2012 from http://www.fractalwater.com/products/tri-ploder-vortex/.

Fractal Water, LLC, "Fractal Water: Vortex Magnetic Systems :: Imploder Vortex Shower Head", copyrighted 2012, printed on Dec. 28, 2012 from http://www.fractalwater.com/products/imploder-vortex-shower-head/.

Espacenet, English abstract of JP 2009-273967 A, 2010.
Espacenet, English abstract of JP 2009-276330 A, 2010.
Espacenet, English abstract of JP 2009-293984 A, 2010.

* cited by examiner

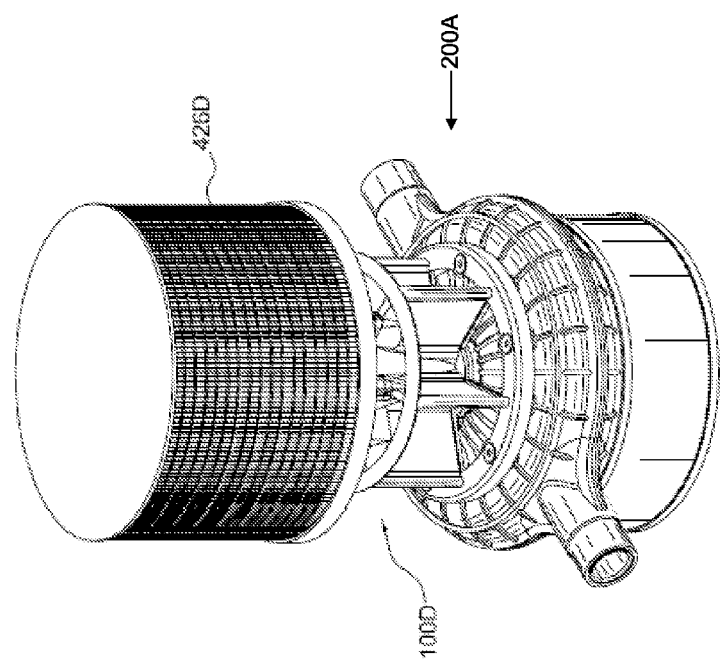

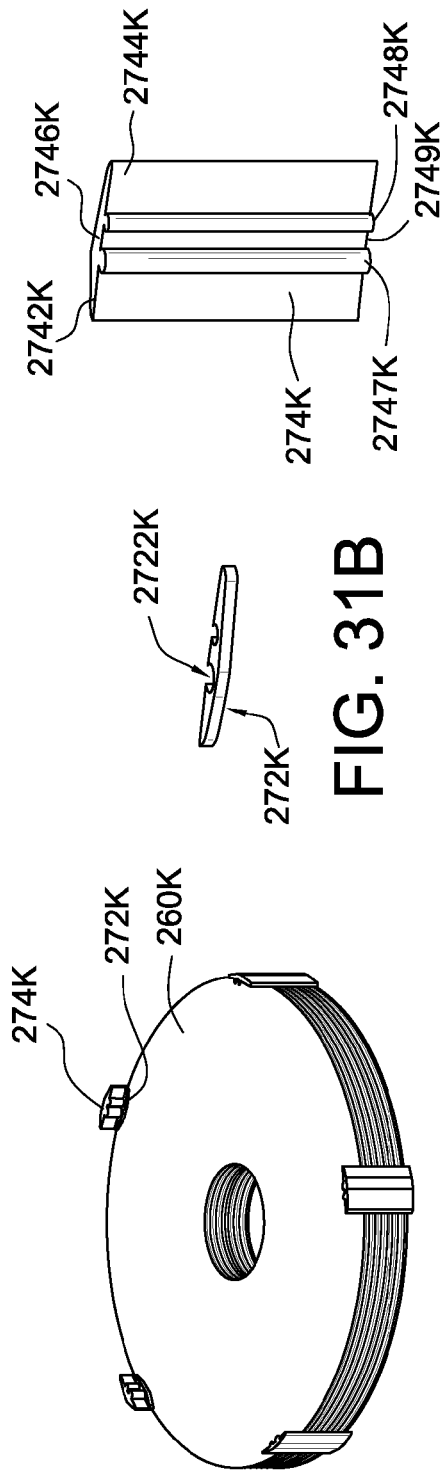

TESTS PERFORMED BY INSTITUTO POLITECNICO NACIONAL

WATER SOURCE: CENTRAL PATIO FOUNTAIN, CONTAMINATED AND ALGAE INFESTED
LOCATION: IZQUIPAN, MICHOACAN, MEXICO

| PARAMETER | INITIAL | | | AFTER 2 HOURS OF TREATMENT | | | AFTER 4 HOURS OF TREATMENT | | | UNITS OF MEAS./METHODOLOGY |
|---|---|---|---|---|---|---|---|---|---|---|
| | SAMPLE 1 | SAMPLE 2 | SAMPLE 3 | SAMPLE 1 | SAMPLE 2 | SAMPLE 3 | SAMPLE 1 | SAMPLE 2 | SAMPLE 3 | |
| PH | 8.9 | | | 9 | | | 9 | | | Mmhos/cm |
| ELECTRIC CONDUCTIVITY | | | | | | | | | | mg/l |
| TOTAL DISSOLVED SOLIDS | 580 | | | 500 | | | 500 | | | mg/l (as CaCO3) |
| TOTAL HARDNESS | 360 | | | 260 | | | 260 | | | gravimeter |
| CHLORIDES | 1299.98 | | | 1228.53 | | | 1228.84 | | | EDTA |
| AMMONIA NITRATES | 0.1 | | | 0.1 | | | 0.1 | | | Argentimetric |
| SULFATES | N.D. | | | N.D. | | | N.D. | | | KJELDAL |
| CADMIUM | 2.1 | | | 4 | | | 3.9 | | | turbidity |
| COPPER | N.D. | | | N.D. | | | N.D. | | | atomic absorption |
| IRON | N.D. | | | N.D. | | | N.D. | | | atomic absorption |
| MANGANESE | N.D. | | | N.D. | | | N.D. | | | atomic absorption |
| LEAD | N.D. | | | N.D. | | | N.D. | | | atomic absorption |
| POTASSIUM | 7.7 | | | 6.7 | | | 5.1 | | | atomic absorption |
| SODIUM | 55.5 | | | 54.3 | | | 54.2 | | | atomic absorption |
| ZINC | N.D. | | | N.D. | | | N.D. | | | atomic absorption |
| TOTAL COLIFORMS | 2,200,000 | 1,200,000 | 1,300,000 | 3,300,000 | 2,300,000 | 2,300,000 | 1,200 | 1,300 | 9,000 | NOM-112-SSA1-94 |
| FECAL COLIFORMS | 370,000 | 370,000 | 299,000 | 9,000 | 7,000 | 4,300 | 110 | 210 | 120 | NOM-112-SSA1-94 |
| E. COLI | POSITIVE | POSITIVE | POSITIVE | ABSENT | ABSENT | ABSENT | ABSENT | ABSENT | ABSENT | MUG-Fluorescence |
| MOLDS | 400 | 640 | 280 | 400 | 400 | 300 | 10 | 10 | 10 | NOM-113-SSA1-94 |
| CLOSTRIDIUM SP | POSITIVE | POSITIVE | POSITIVE | POSITIVE | POSITIVE | POSITIVE | NEGATIVE | NEGATIVE | NEGATIVE | incubation |
| ALGAE | 180 | 180 | 180 | 320 | 370 | 360 | 10 | 20 | 33 | Sed-Wick-Rafter |
| HELMINT EGGS | POSITIVE | POSITIVE | POSITIVE | POSITIVE | POSITIVE | POSITIVE | NEGATIVE | NEGATIVE | NEGATIVE | NOM-003ECOL-1997 |

N.D. NOT DETECTED

FIG. 43

TESTS PERFORMED BY INSTITUTO POLITECNICO NACIONAL

WATER SOURCE: IRRIGATION CANAL "VALLADO DEL REY"
LOCATION: ZAMORA, MICHOACAN, MEXICO

| PARAMETER | INITIAL | | | AFTER 2 HOURS OF TREATMENT | | | AFTER 4 HOURS OF TREATMENT | | | UNITS OF MEAS./METHODOLOGY |
|---|---|---|---|---|---|---|---|---|---|---|
| | SAMPLE 1 | SAMPLE 2 | SAMPLE 3 | SAMPLE 1 | SAMPLE 2 | SAMPLE 3 | SAMPLE 1 | SAMPLE 2 | SAMPLE 3 | |
| pH | 7.4 | | | 7.9 | | | 7.8 | | | |
| ELECTRIC CONDUCTIVITY | 200 | | | 200 | | | 200 | | | μmhos/cm |
| TOTAL DISSOLVED SOLIDS | 90 | | | 90 | | | 90 | | | mg/l |
| TOTAL HARDNESS | 614.28 | | | 557.13 | | | 542.85 | | | mg/l (as CaCO3) |
| CHLORIDE | 0.1 | | | 0.1 | | | 0.1 | | | gravimetric |
| AMMONIA NITRATES | N.D. | | | N.D. | | | N.D. | | | EPA |
| SULFATES | 4.7 | | | 4.5 | | | 4.6 | | | Argentometric |
| CADMIUM | N.D. | | | N.D. | | | N.D. | | | ICHEDAL |
| COPPER | N.D. | | | N.D. | | | N.D. | | | turbidity |
| IRON | 1.4 | | | 1.4 | | | 1.4 | | | atomic absorption |
| MANGANESE | N.D. | | | N.D. | | | N.D. | | | atomic absorption |
| LEAD | 0.1 | | | 0.1 | | | 0.1 | | | atomic absorption |
| POTASSIUM | 1.5 | | | 1.5 | | | 1.5 | | | atomic absorption |
| SODIUM | 18 | | | 17.9 | | | 17.9 | | | atomic absorption |
| ZINC | 0.1 | | | 0.1 | | | 0.1 | | | atomic absorption |
| TOTAL COLIFORMS | 71,400,000.00 | 71,600,000.00 | 72,400,000.00 | 1,800,000 | 2,300,000 | 2,100,000 | 58,000 | 24,000 | 17,000 | NOM-112-SSA1-94 |
| FECAL COLIFORMS | 1,000,000.00 | 3,900,000.00 | 1,200,000.00 | 210,000 | 330,000 | 140,000 | 240,000 | 240,000 | 110,000 | NOM-112-SSA1-94 |
| E. COLI | POSITIVE | POSITIVE | POSITIVE | POSITIVE | POSITIVE | POSITIVE | ABSENT | ABSENT | ABSENT | MUG/fluorescence |
| MOLDS | 1000 | 4200 | 6000 | 720 | 800 | 620 | 500 | 500 | 620 | NOM-111-SSA1-94 |
| CLOSTRIDIUM SP | POSITIVE | POSITIVE | POSITIVE | POSITIVE | NEGATIVE | POSITIVE | NEGATIVE | NEGATIVE | POSITIVE | Incubation |
| ALGAE | 3700 | 3700 | 3800 | 280 | 270 | 280 | 200 | 210 | 30 | Sedg-Wick-Rafter |
| HELMINT EGGS | POSITIVE | POSITIVE | POSITIVE | POSITIVE | POSITIVE | POSITIVE | NEGATIVE | NEGATIVE | NEGATIVE | NOM-036ECOL-1997 |

N.D. NOT DETECTED

FIG. 44

WATER TREATMENT AND REVITALIZATION SYSTEM AND METHOD

This application is a continuation application of U.S. patent application Ser. No. 13/213,614, filed Aug. 19, 2011, which claims the benefit of U.S. provisional Application Ser. No. 61/376,447, filed Aug. 24, 2010, which are hereby both incorporated by reference.

I. BACKGROUND OF THE INVENTION

Nikola Tesla considered the Tesla Turbine his greatest achievement. It was Tesla's belief that his stacked-disk turbine design, which relies on achieving mechanical advantage through utilization of the properties inherent in viscous molecular boundary layers, would provide the fundamental basis for the future of ultra-efficient prime-mover and pump development. With the exception of the direct successes of Tesla himself with his turbine designs, numerous organizations and countless individuals have dedicated millions of man-hours in attempts to understand, harness and apply Tesla's turbine ideas for prime movers and pumps with marginal results at best.

II. SUMMARY OF THE INVENTION

In at least one embodiment, the invention includes an assembly of submerged rotating disks (hereafter referred to as the disk-pack or disk-pack turbine) which serve to induce, concentrate and multiply fluid and rotary dynamic influences that purify, energize, vitalize and/or revitalize and otherwise improve water that runs through the system. In at least one embodiment, the fluid as it leaves the discharge ports departs under relatively low pressure as compared to a pump thus allowing residual motion to be maintained within the fluid as it returns to the fluid source.

At least one embodiment, according to the invention, provides an efficient system to treat and revitalized water from water that can be categorized via qualitative analysis as inferior, diseased, deteriorated, polluted, and unhealthy water. The water to be treated and revitalized may include a variety of impurities such as containments, bacteria, mosquito larvae, algae, turbidity and other material that pollutes the water.

The invention in at least one embodiment includes a system including: a motor; a driveshaft engaging said motor; a vortex module having a housing, a plurality of inlets spaced around the periphery of the housing near a top of said housing, and a vortex chamber formed in said housing and in fluid communication with said plurality of inlets; and a disk-pack module having a disk-pack housing having a discharge chamber formed in said disk-pack housing, and said discharge chamber having a plurality of discharge ports providing a fluid pathway from said discharge chamber to outside of said disk-pack housing, and a disk-pack having an expansion chamber formed in an axial center and in fluid communication with said vortex chamber, said disk-pack having a plurality of spaced apart disks providing chambers between them to form a plurality of passageways between said expansion chamber and said discharge chamber, said disk-pack engaging said driveshaft.

The invention in at least one embodiment includes a disk-pack turbine including: a top disk plate having an opening passing through an axial center of said top disk plate; a plurality of disks with each disk having an opening passing through an axial center of said disk; a bottom plate having a depression located at an axial center of said disk, and a driveshaft mount; and a plurality of wing shims connecting and aligning said top disk plate, said plurality of disks and said bottom plate to form an area defined by the plurality of openings and the depression of said bottom plate, said plurality of wing shims space apart said plurality of disks such that disk chambers exist between adjacent disks.

The invention in at least one embodiment includes a method of operation of a system having a vortex module and a disk-pack module including: rotating a disk-pack turbine in the disk-pack module; spinning a fluid to create a vortex where the fluid that enters the vortex is located outside of the vortex module prior to entry; discharging the fluid from the vortex module into an expansion chamber formed in the disk-pack turbine of the disk-pack module; channeling the fluid between spaces that exist between disks of the disk-pack turbine to travel from the expansion chamber to a discharge chamber surrounding the disk-pack turbine; and accumulating fluid in the discharge chamber before discharging the fluid through at least one discharge port.

III. BRIEF DESCRIPTION OF THE DRAWINGS

The present invention is described with reference to the accompanying drawings. In the drawings, like reference numbers indicate identical or functionally similar elements. The use of cross-hatching and shading within the drawings is not intended as limiting the type of materials that may be used to manufacture the invention.

FIG. 18 illustrates another alternative embodiment according to the invention.

Figure 21:
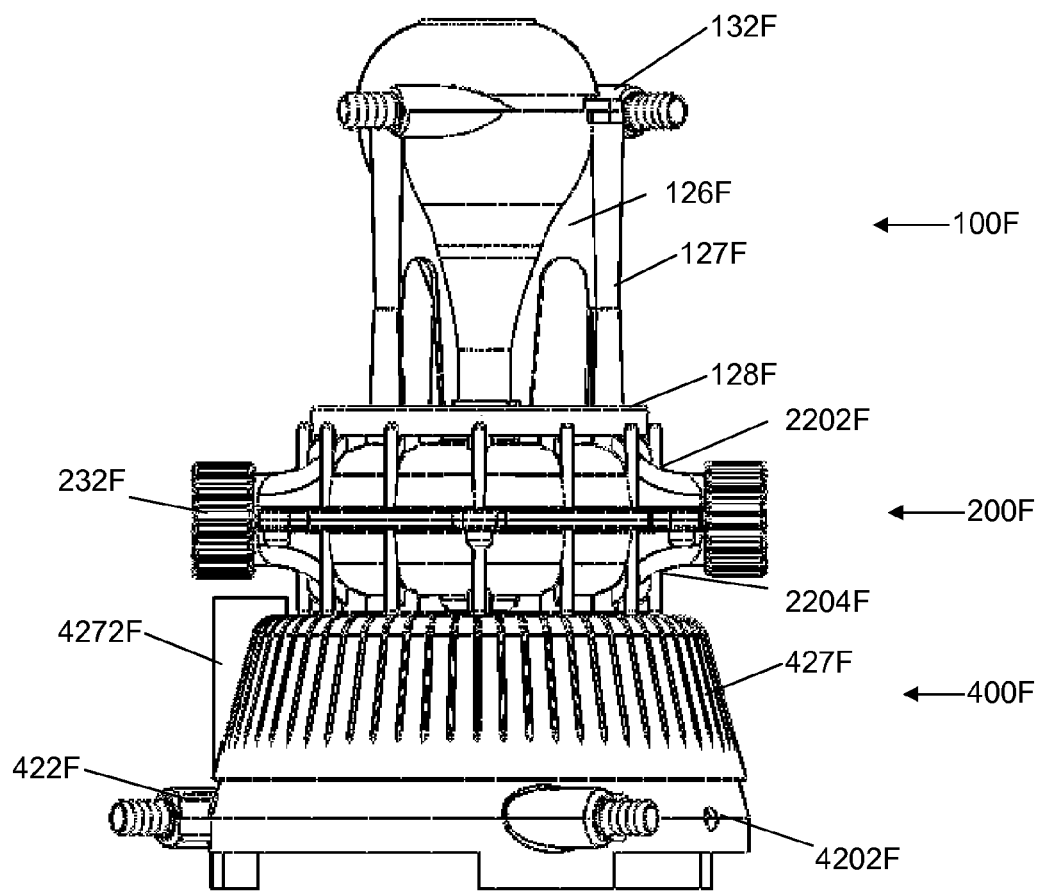
FIG. 21 illustrates a fifth embodiment according to the invention.
Figure 22:
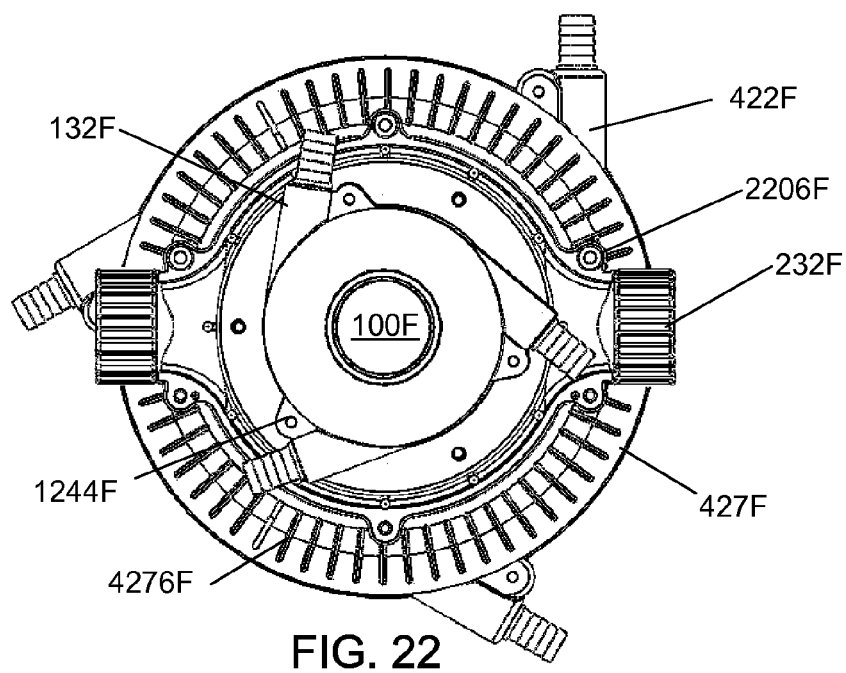
FIG. 22 illustrates a top view of the embodiment illustrated in FIG. 21.
Figure 25A:
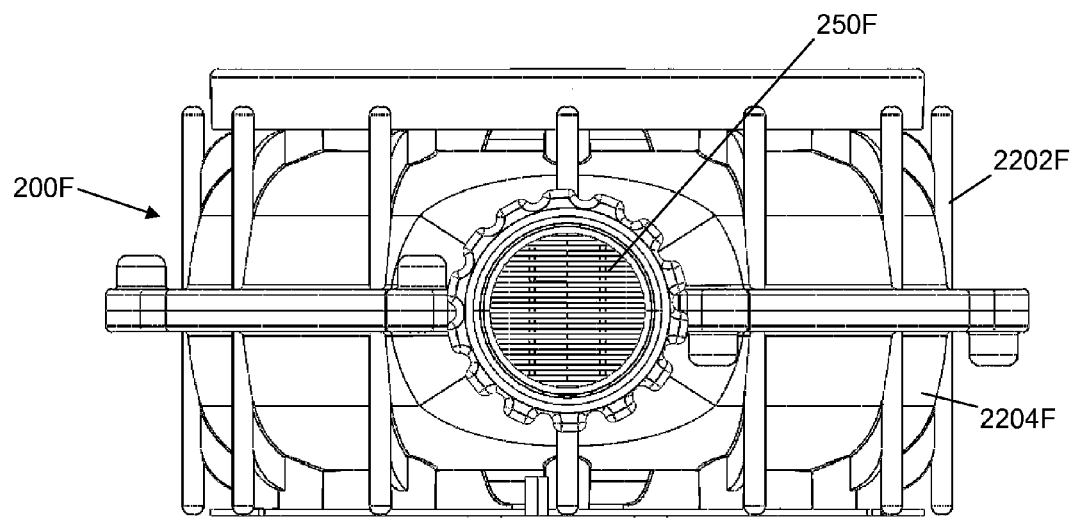
Figure 25B:
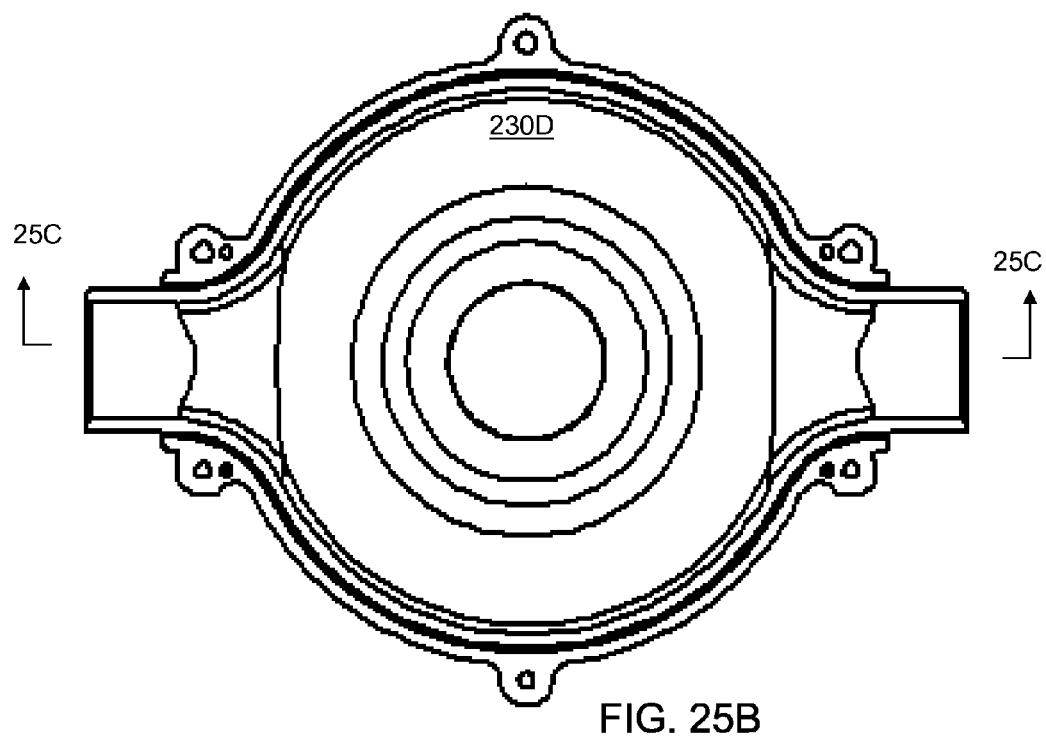
Figure 25C:
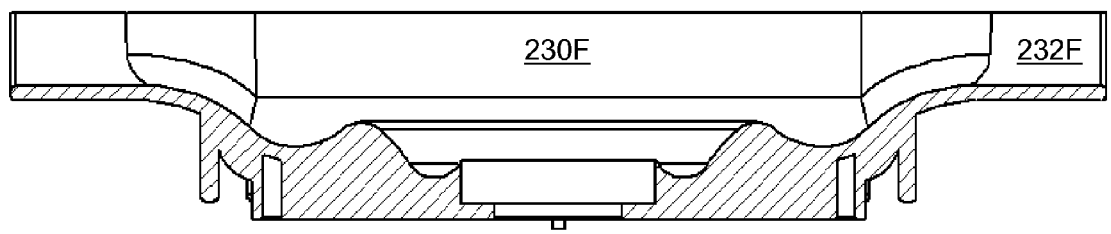

FIG. 25A illustrates a side view of a disk-pack turbine module of the embodiment illustrated in FIG. 21. FIG. 25B illustrates an internal view of a housing part of the disk-pack module. FIG. 25C illustrates a cross-section view of the housing part illustrated in FIG. 25B.

Figure 26A:
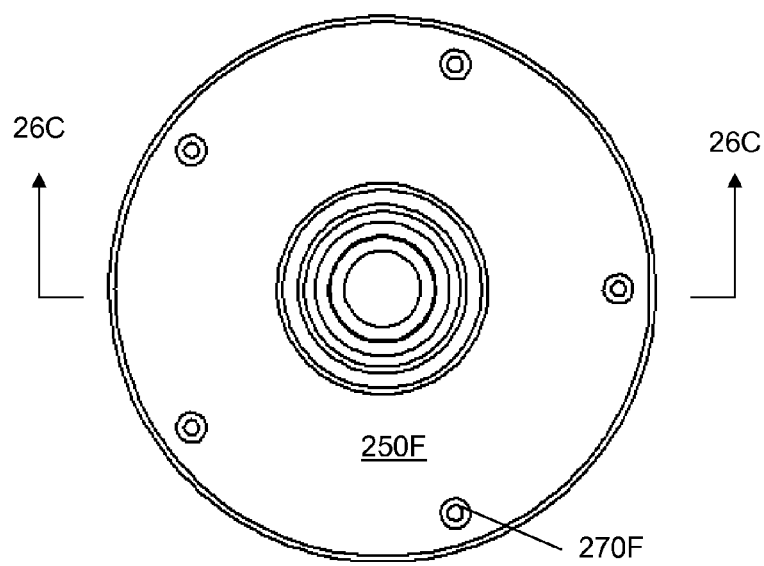
Figure 26B:
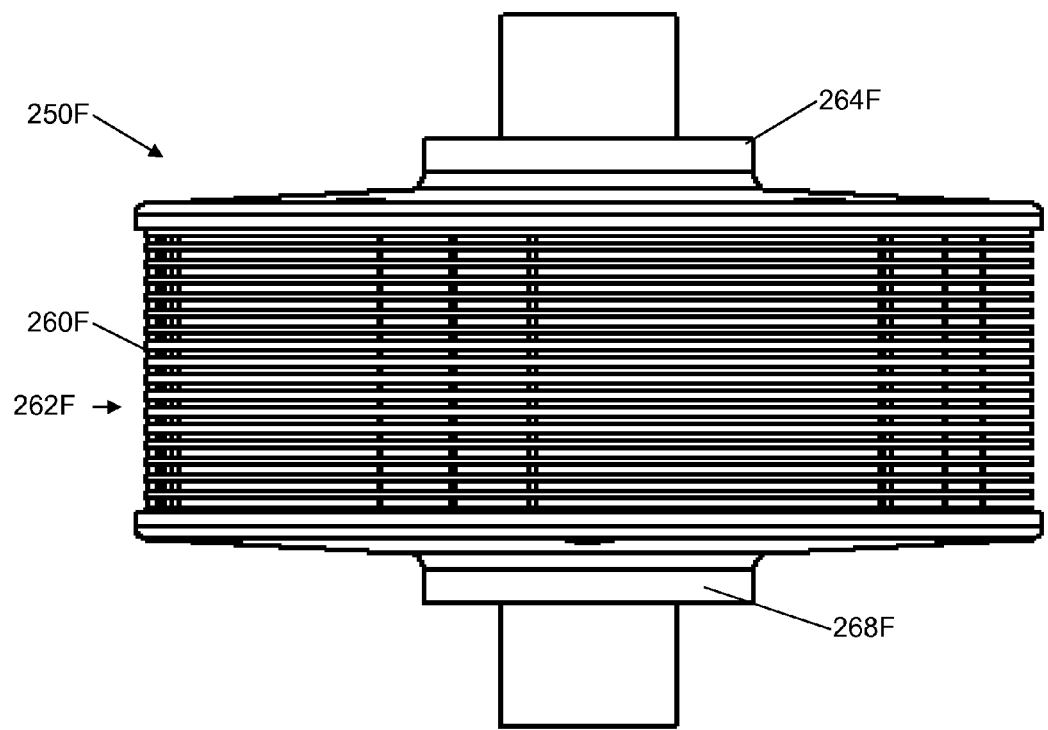

FIG. 26A illustrates a top view of the disk-pack turbine according to an embodiment of the invention. FIG. 26B illustrates a side view of the disk-pack turbine illustrated in FIG. 26A.

Figure 26C:
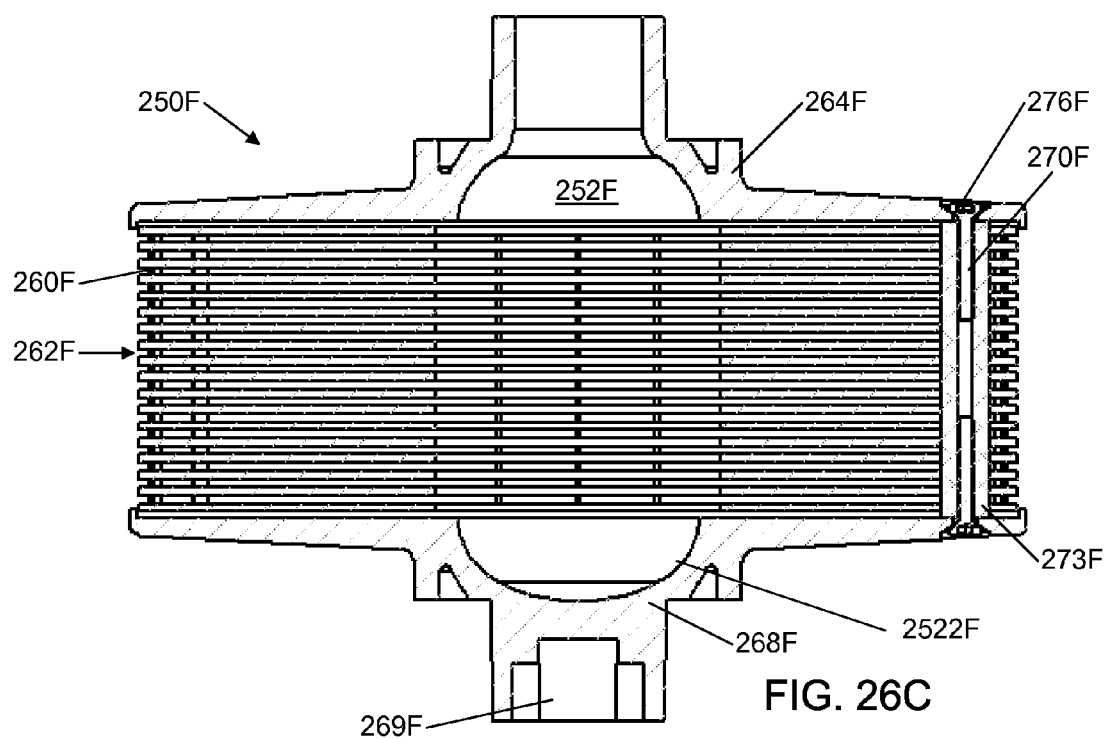

FIG. 26C illustrates a cross-section view of the disk-pack turbine illustrated in FIG. 26A.

Figure 27A:
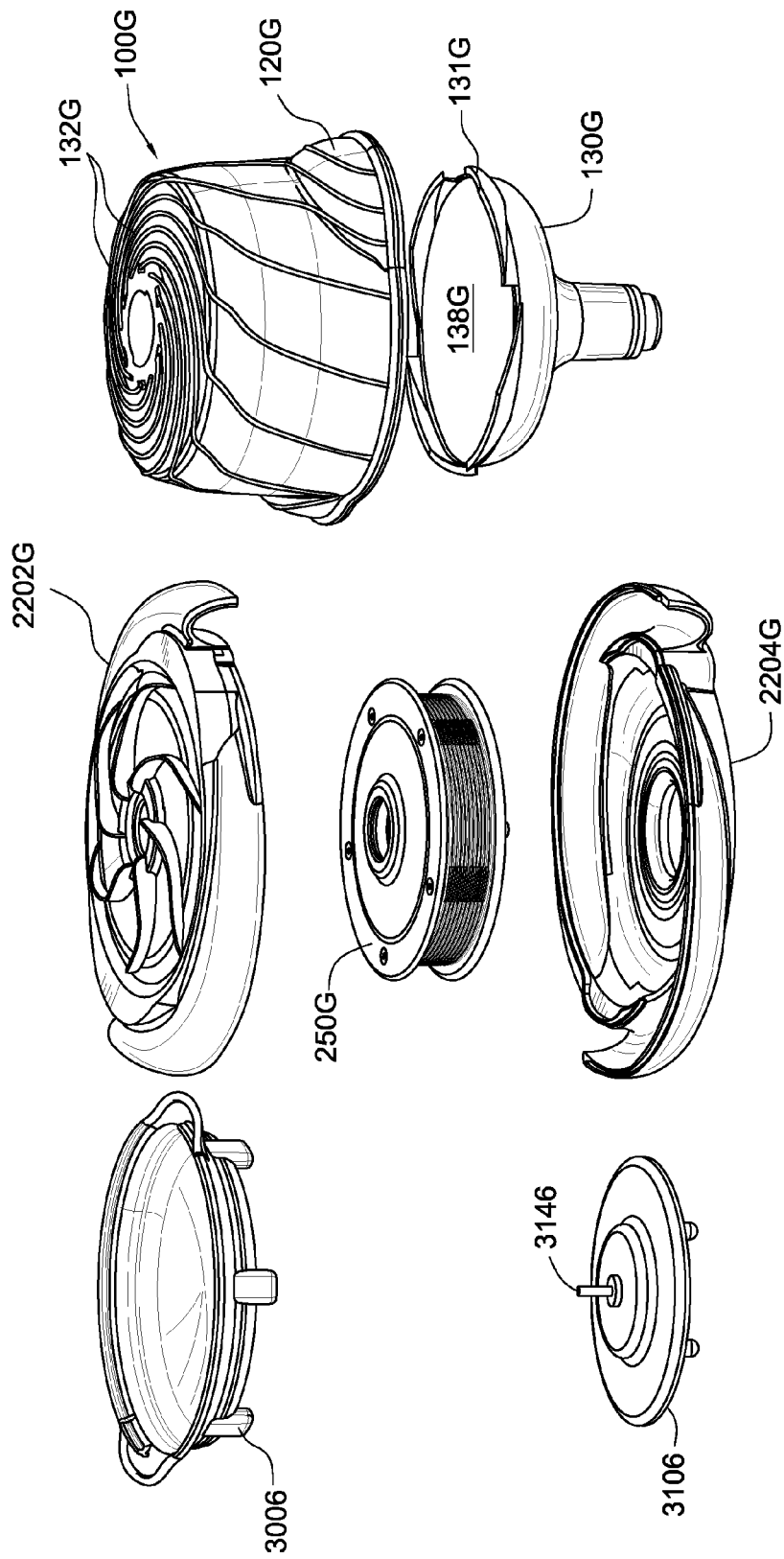
Figure 27B:
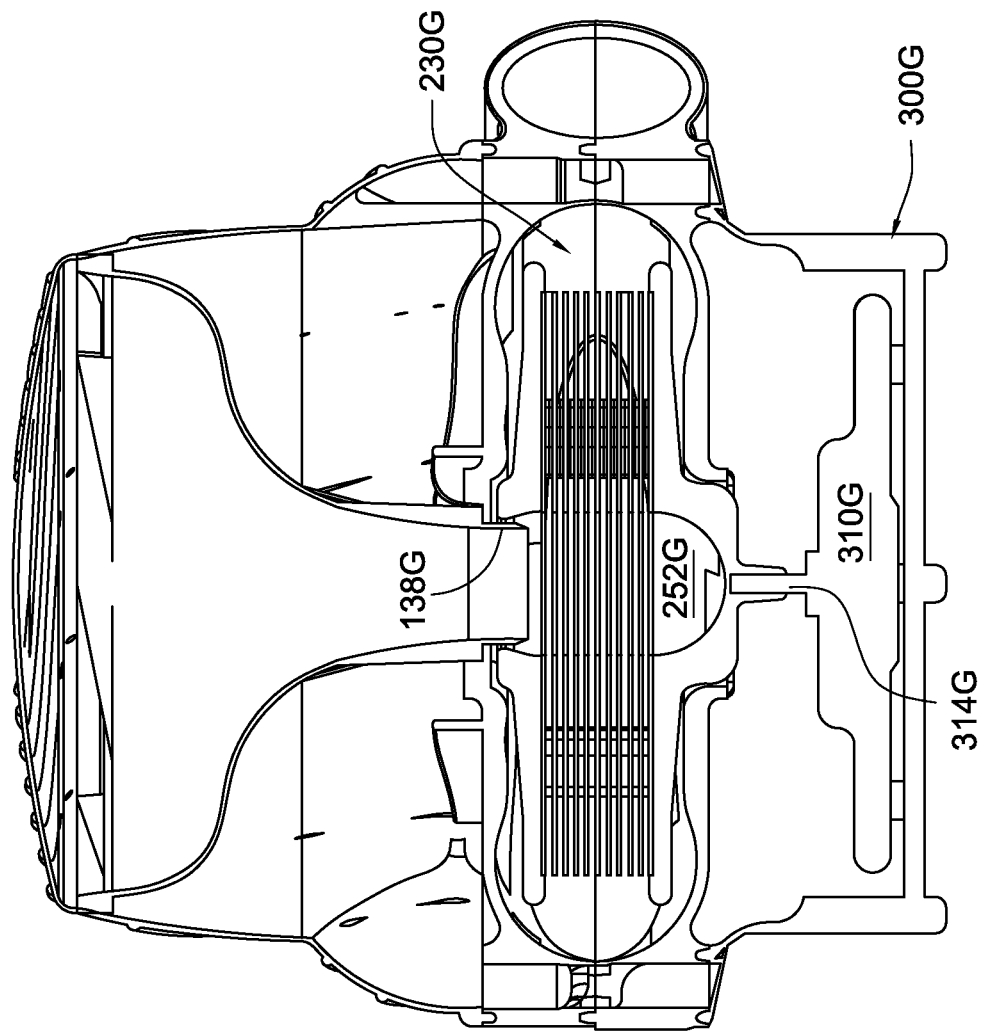

FIG. 27A illustrates an exploded view of a sixth embodiment according to the invention. FIG. 27B illustrates a cross-section view of the embodiment illustrated in FIG. 27A.

Figure 28B:
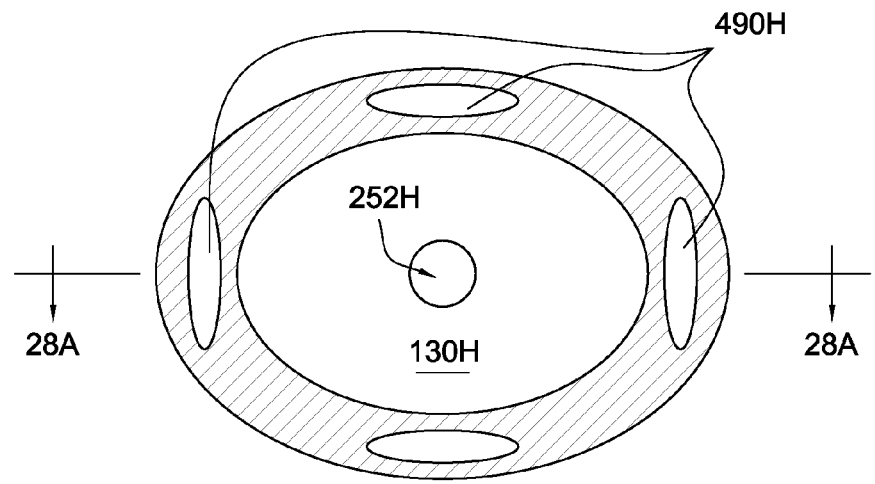
Figure 28A:
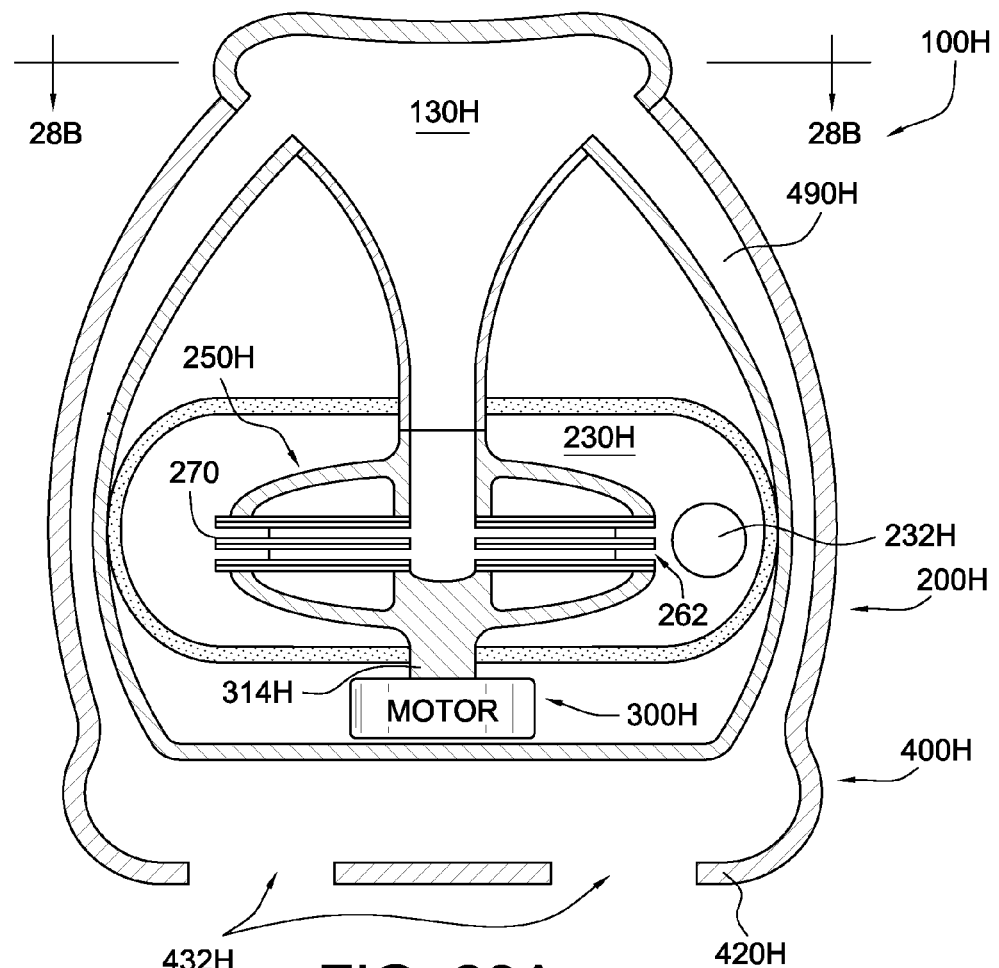

FIGS. 28A-28B illustrate cross-sections of a seventh embodiment according to the invention.

Figure 29:
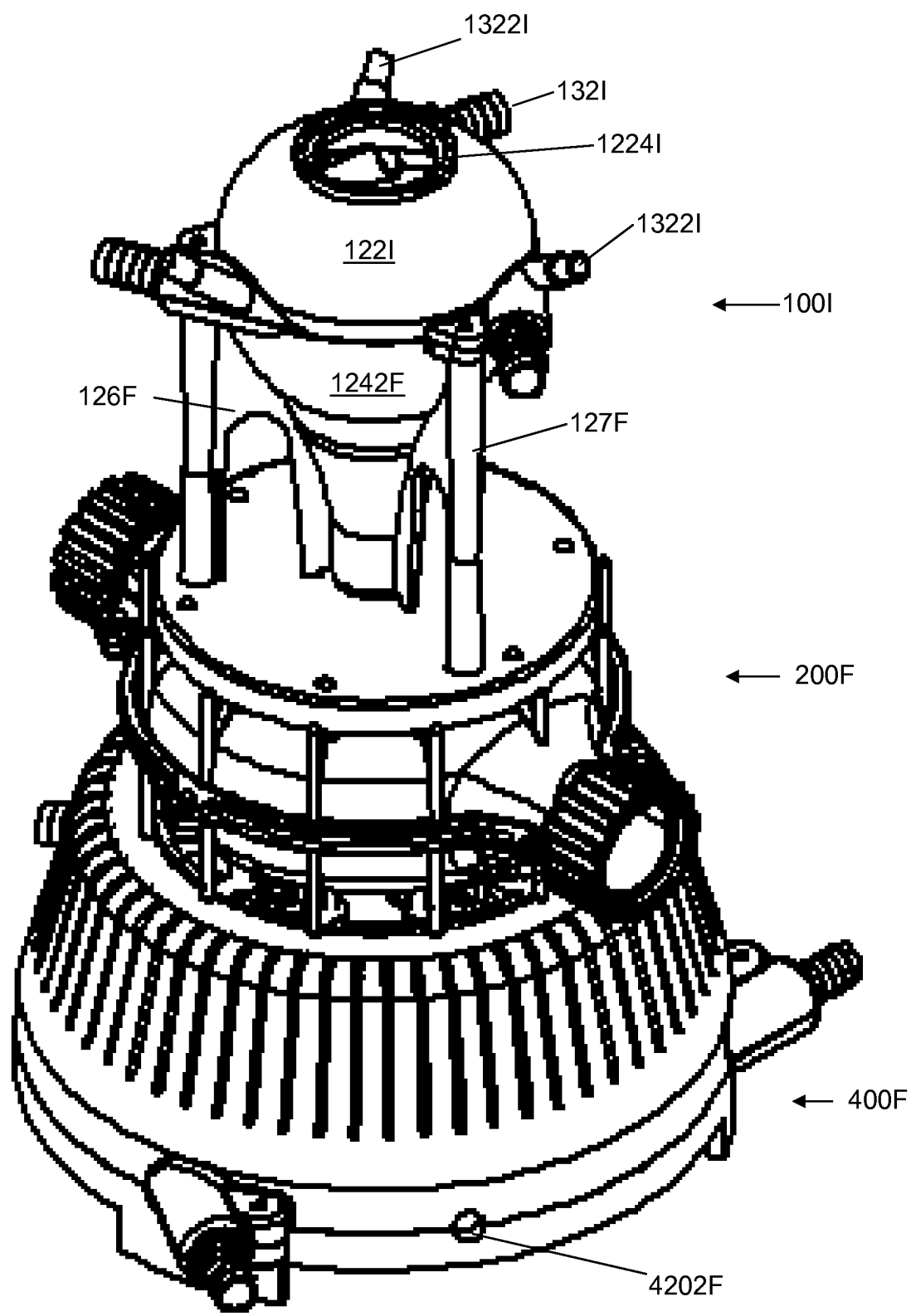

FIG. 29 illustrates a perspective view of an eighth embodiment according to the invention.

Figure 30:
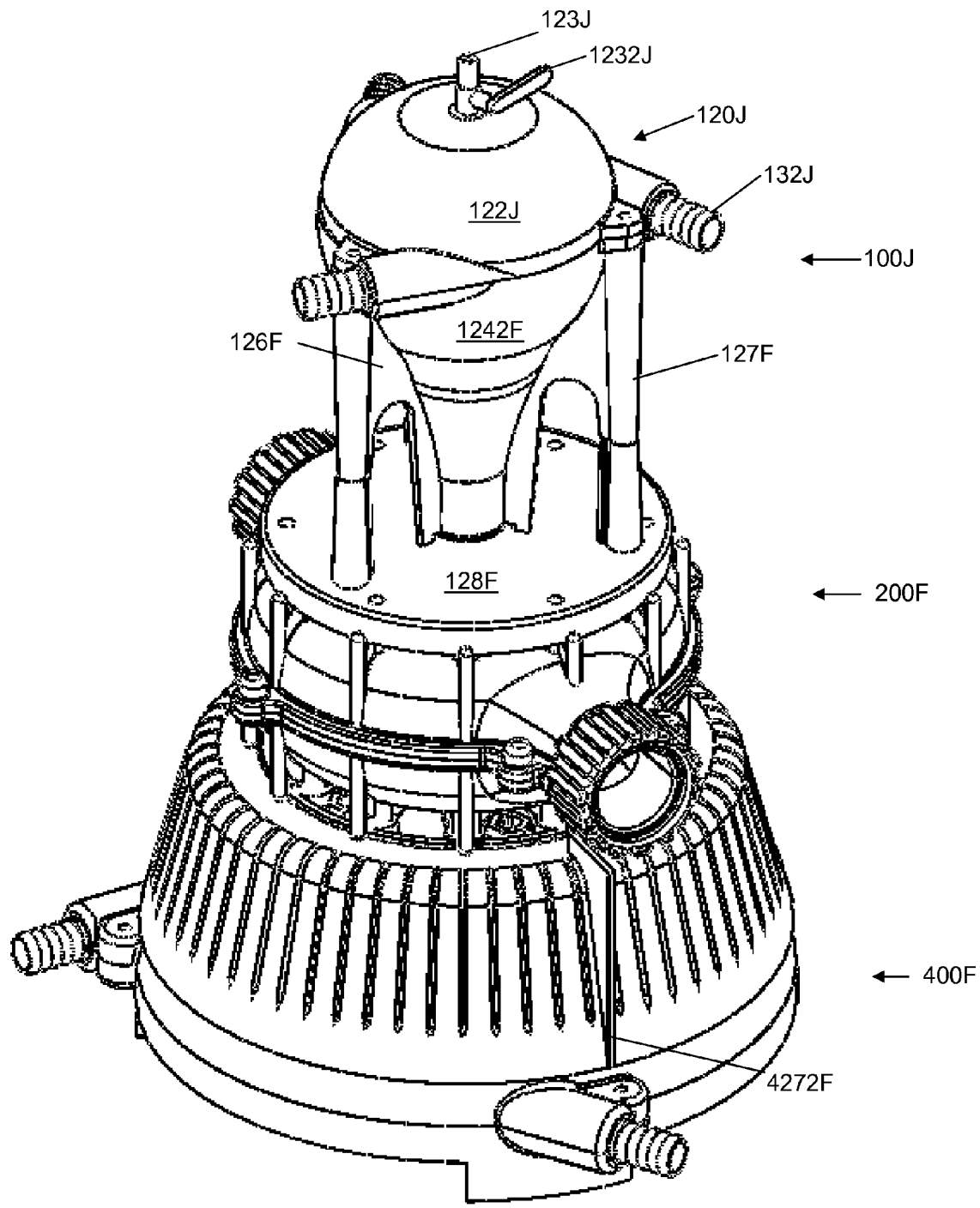

FIG. 30 illustrates a perspective view another alternative embodiment according to the invention.

FIGS. 31A-31D illustrate a wing shim embodiment according to the invention.

Figure 32C:
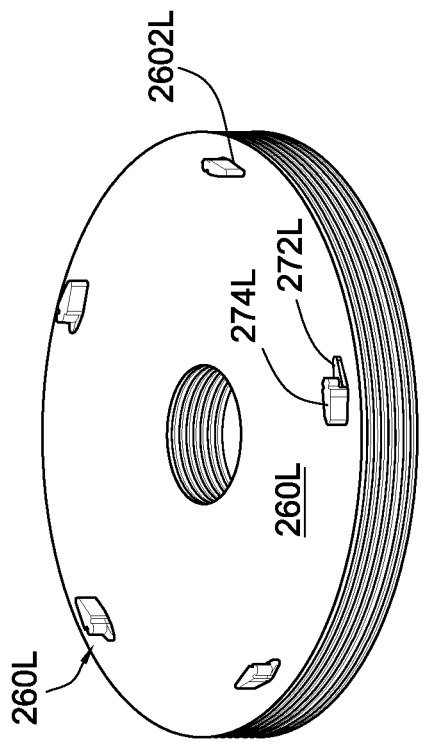
Figure 32B:
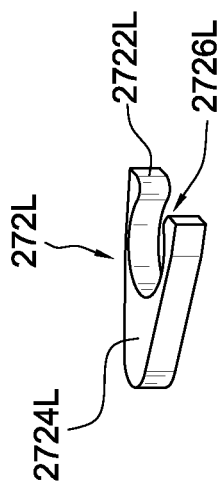
Figure 32A:
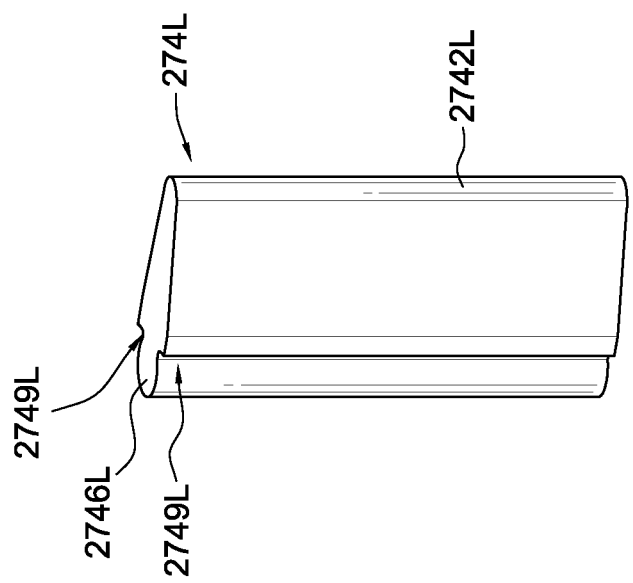

FIGS. 32A-32C illustrate another wing shim embodiment according to the invention.

Figure 33B:
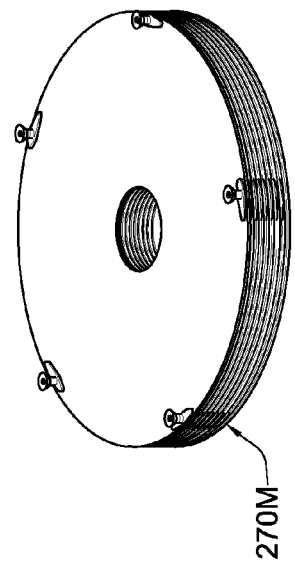
Figure 33A:
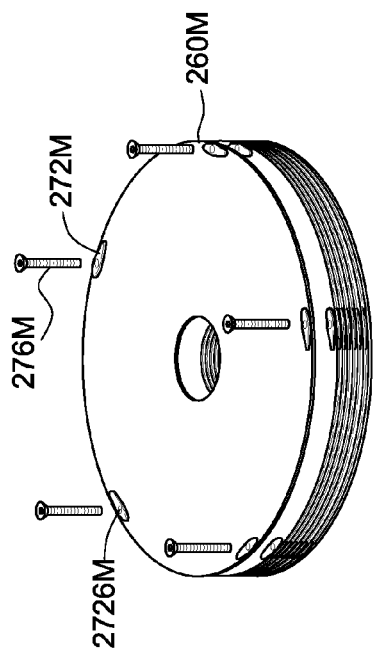
Figure 33C:
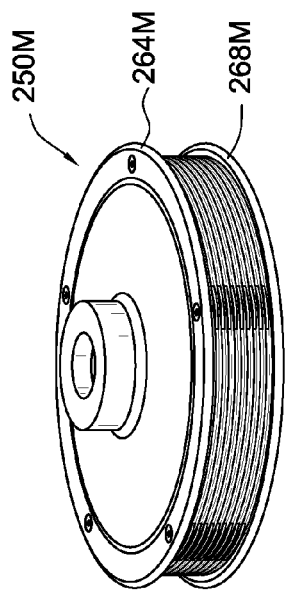

FIGS. 33A-33C illustrate another wing shim embodiment according to the invention.

Figure 34:
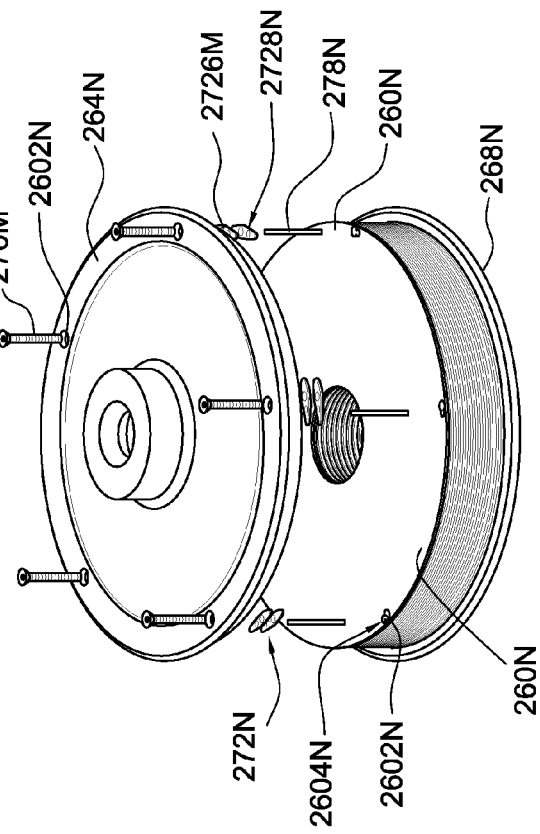

FIG. 34 illustrates another wing shim embodiment according to the invention.

Figure 35:
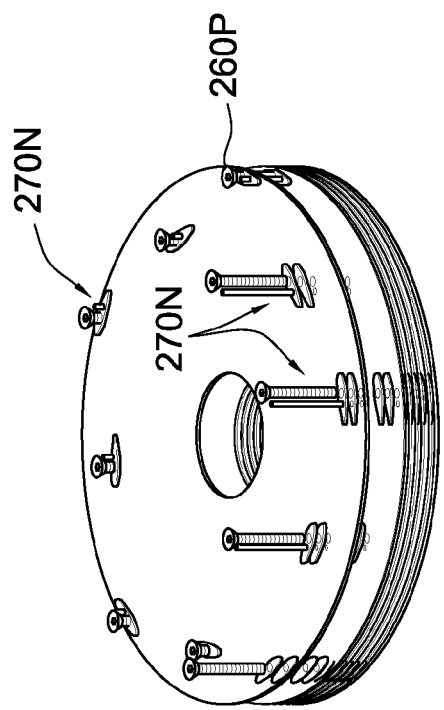

FIG. 35 illustrates another wing shim embodiment according to the invention.

Figure 36:
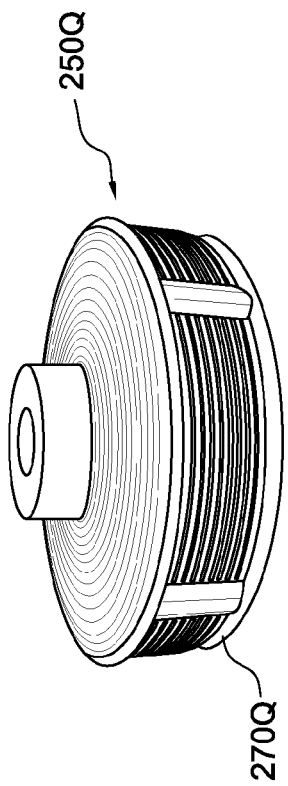

FIG. 36 illustrates an alternative disk-pack and wing shim embodiment according to the invention.

Figure 37C:
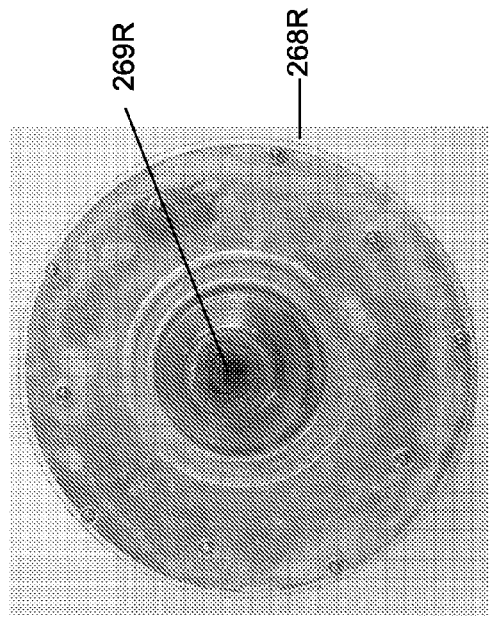
Figure 37B:
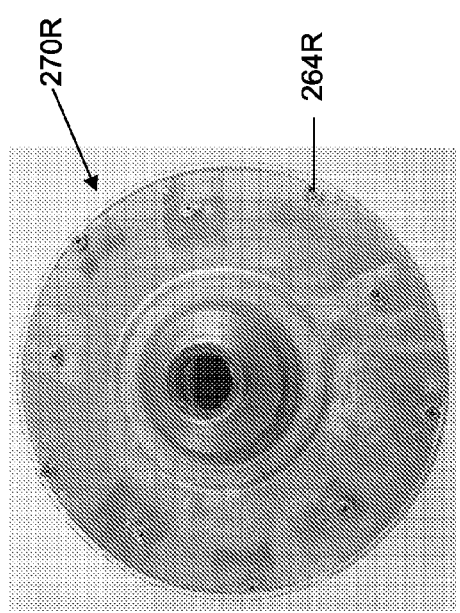
Figure 37A:
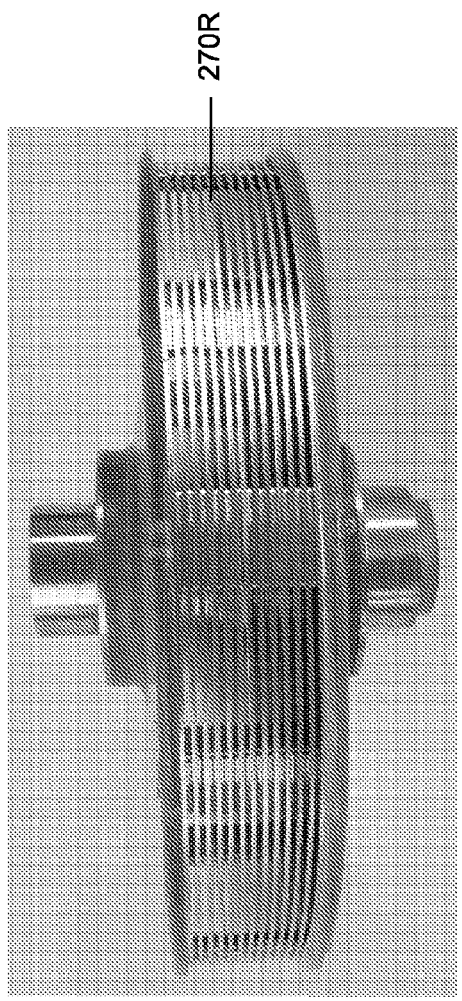

FIGS. 37A-37C illustrate another disk-pack turbine embodiment according to the invention.

Figure 38B:
Figure 38A:
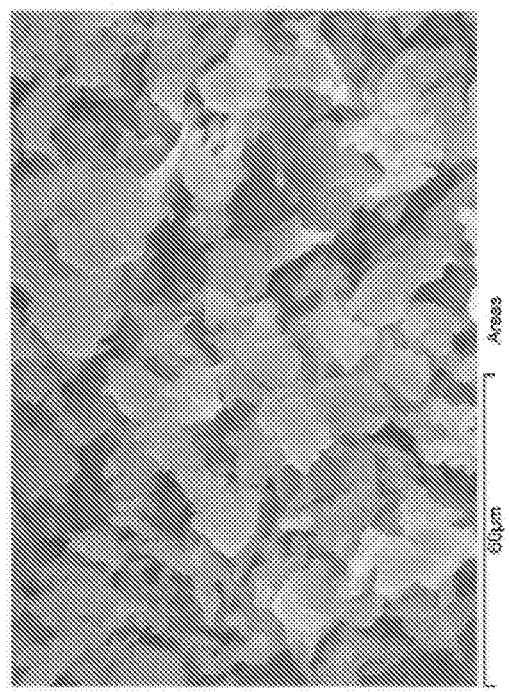

FIGS. 38A-38B illustrate electron microscope images of water.

Figure 39B:
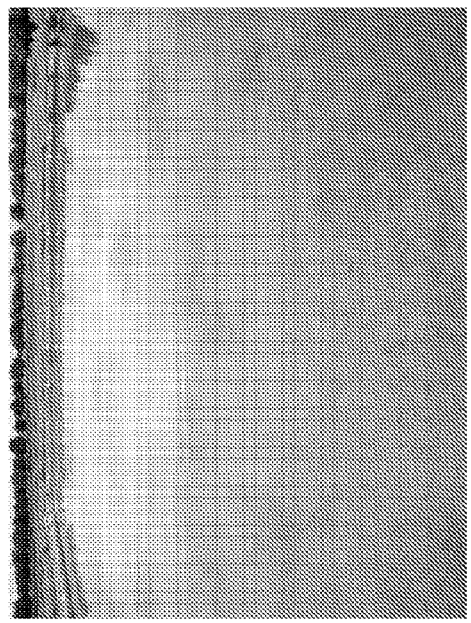
Figure 39C:
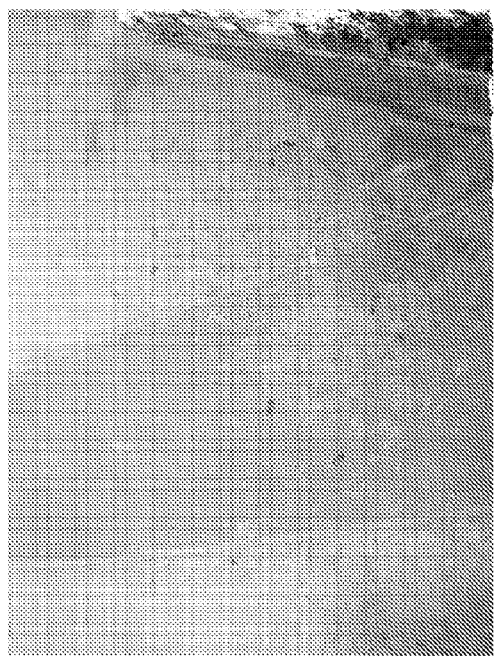
Figure 39A:

FIGS. 39A-39C illustrate an irrigation pond used in an experiment of a system built according to at least one embodiment of the invention.

Figure 40B:
Figure 40A:
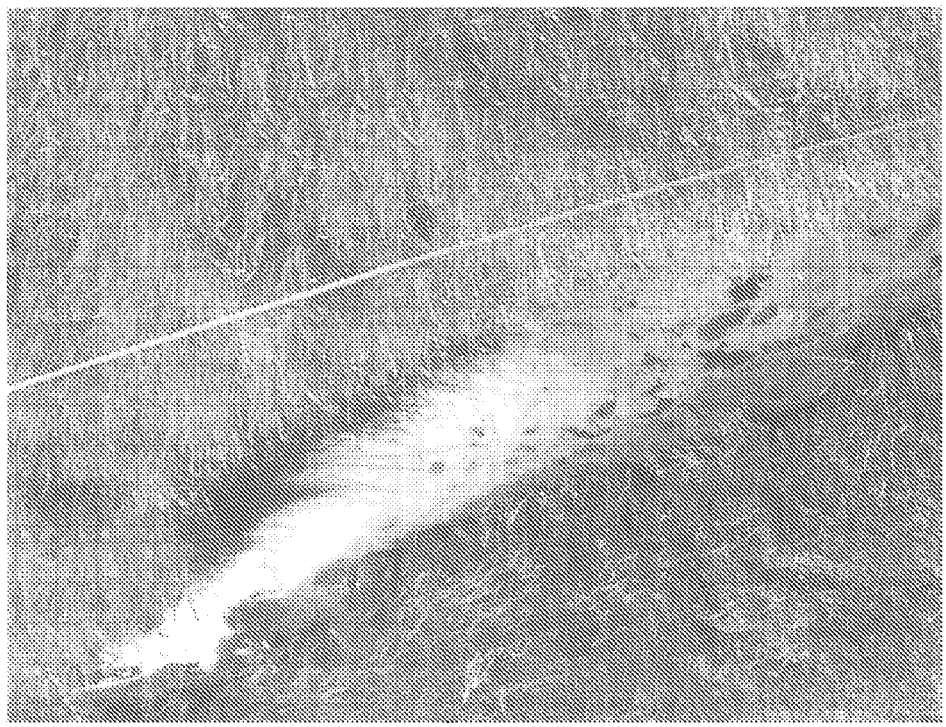
Figure 40C:
Figure 42B:
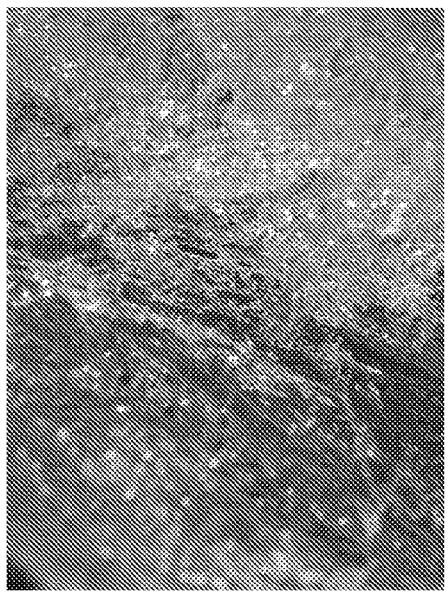
Figure 42D:
Figure 42A:
Figure 42C:
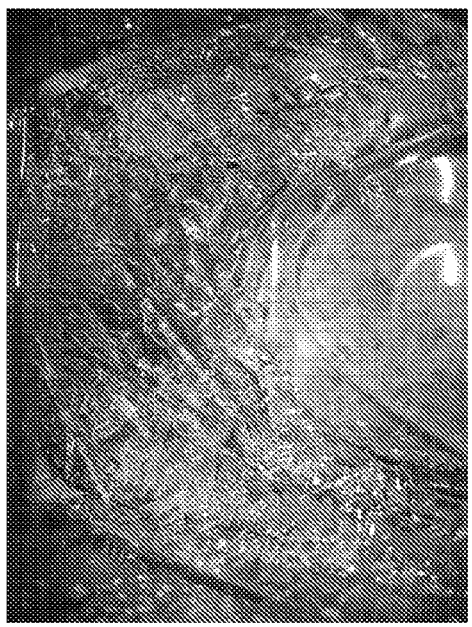

FIGS. 40A-40C illustrate a creek used in an experiment of a system built according to at least one embodiment of the invention.

Figure 41:
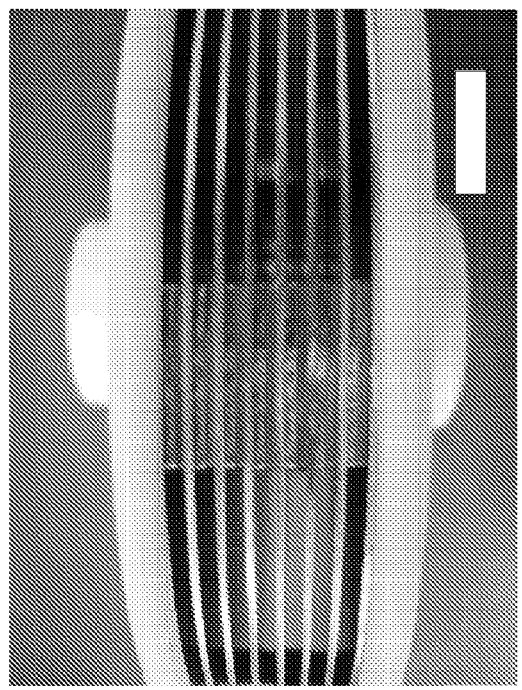

FIG. 41 illustrates a disk-pack turbine showing electroplating resulting from use of the disk-pack turbine built according to at least one embodiment of the invention.

42A-42D illustrate different views of water frozen after processing with a system built according to at least one embodiment of the invention.

FIG. 43 shows a table with results of biological and chemical testing of a water sample that was processed with a system built according to at least one embodiment of the invention.

FIG. 44 shows a table with results of biological and chemical testing of another water sample that was processed with a system built according to at least one embodiment of the invention.

IV. DETAILED DESCRIPTION OF THE INVENTION

FIGS. 2-38C illustrate a variety of embodiments according to the invention. The different illustrated embodiments share common features for the invention that facilitate the movement of fluid through the device and resulting in many of the embodiments revitalize fluid in a vessel by having the outputted fluid propagate throughout the vessel containing the fluid. As discussed herein, fluid is intended to cover both liquids and gases capable of flowing. The embodiments described herein are directed at water as the fluid. Based on this disclosure, it should be readily recognized that the invention is not limited to water but is applicable to all other fluids. In many of the embodiments, the water enters into a vortex chamber that includes a plurality of inlets that are spaced apart, and in at least one embodiment the inlets are evenly spaced around and near the top of the vortex chamber. The vortex chamber further increases the rotational speed of the water as the water passes through the vortex chamber into an expansion and distribution chamber (or expansion chamber). In at least one embodiment, the rotational velocity of the water is pre-accelerated to match the rotational velocity of the expansion chamber and disk-pack turbine adding substantially to energy exchange dynamics. The water in at least one embodiment is drawn into the expansion chamber at least in part by a disk-pack turbine spinning about the expansion chamber. The water is drawn into and through the space (or disk chambers) between the disks of the disk-pack turbine into an accumulation, energy exchange and discharge chamber (or discharge chamber) surrounding the disk-pack turbine. The discharge chamber in at least one embodiment includes a torus/paraboloid shape that assists with the conditioning of the water prior to its discharge through at least one discharge port. In most of the embodiments, the embodiment includes a plurality of discharge ports, and in at least one embodiment the discharge ports are evenly spaced around the periphery of the discharge chamber. The disk-pack turbine is rotated by a driveshaft driven by a motor, which in at least one embodiment is present in a motor module while in at least another embodiment resides in the disk-pack module. In an alternative embodiment, the motor may indirectly drive the driveshaft with, for example, a belt or other linkage.

In other embodiments, the device includes a pump (or intake) module that further drives the fluid into the vortex chamber. The pump module in at least one embodiment includes an impeller connected to the motor through a driveshaft. In at least one embodiment, the impeller and disk-pack are driven by different driveshafts or even different respective motors. The impeller pulls fluid into the device and drives it through connected conduit into the vortex chamber. In at least one embodiment, there is one intake outlet and connecting conduit for each vortex chamber inlet.

In other embodiments, the fluid intake is through a filter section that feeds conduit running to the vortex chamber inlets. The connecting conduit can take a variety of forms including, for example, piping, tubing, enclosed channels and a combination of any two or more of these examples. In further embodiments, the vortex chamber inlets are connected to filter and/or screening intake systems that are separate from the system with the vortex chamber, with the connection between the systems being provided by conduit. This arrangement will allow for the processing system to be situated outside of the water source where there would be conduit attached to the discharge ports to return the processed water to the water source or another location or vessel.

The following descriptions describe different embodiments according to the invention. Different elements or modules may be exchanged and/or added to other described embodiments. The disclosure also provides a discussion of testing and experiments conducted with prototypes built according to the invention. The use of subheadings is to provide identification of different topics being discussed in this disclosure.

a. Considerations

Most of the following embodiments are configurations having a design that lends itself to operating submerged/immersed within a subject volume of naturally flowing or contained water with the intent of inducing vital, purifying, energetic restorative motion into the water progressing through the system. Strict adherence to design criteria in at least one embodiment precludes any conditions that may result in the propagation of highly elevated fluid pressures, extreme fluid-discharge velocities, temperature elevation through mechanical action, fluid friction or any other dissimilative/dissociative tendencies resulting from recirculation, stall, dead-head, cavitation or other mechanical action that would result in cutting, chopping, or abrading water within the process. One way to accomplish this in some embodiments is the elimination (or at least minimization) of right and/or sharp angles being present in the conduit and chamber walls by using radii on all surfaces that contact water in addition to use of a large discharge chamber relative to the expansion and disk chambers. In some figures the components having been simplified with the removal of curved structures to minimize the number of lines present in the figures.

Figure 1C:
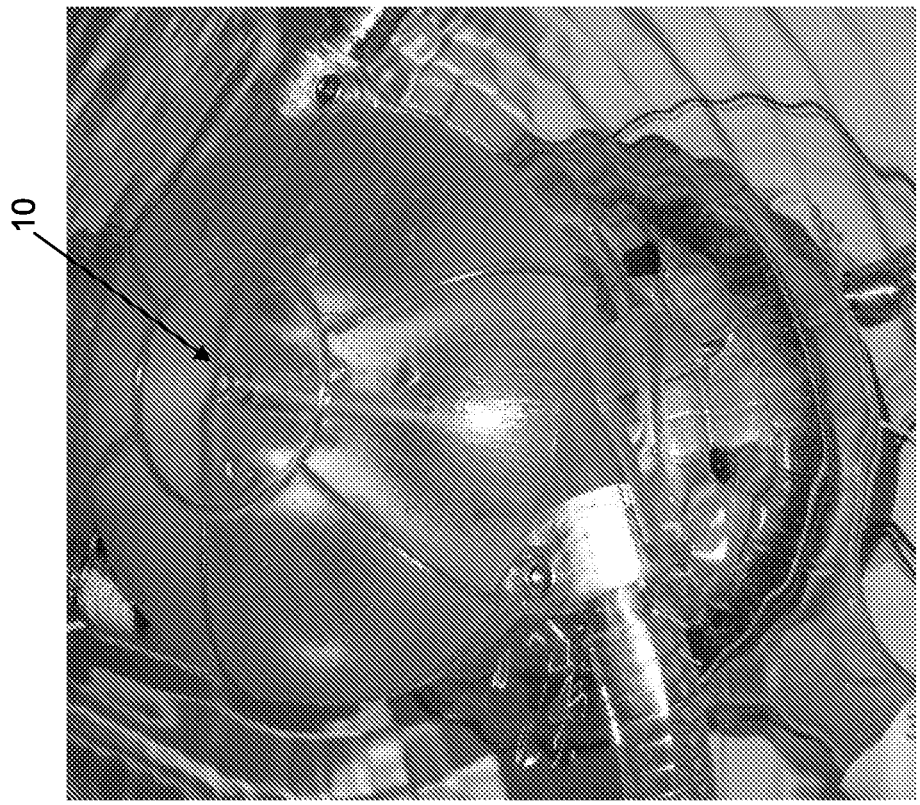
FIG. 1C illustrates a closer view of the vortex chamber of the system to illustrate the tight vortex in the axial center of the vortex chamber.
Figure 1A:
FIG. 1A-1B illustrate the impact of a device built according to the invention placed into a water containment unit filled with water illustrating before operation and during operation of the device.
Figure 1B:
Figure 10:
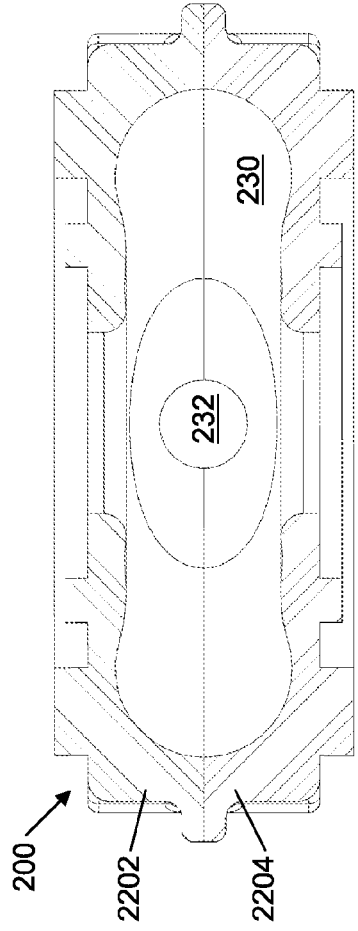
FIG. 10 illustrates a cross-section view of the disk-pack module of the embodiment illustrated in FIG. 9.

Water sent through at least some of the described embodiments will not be subjected to any unnatural motion or non-organic geometries beyond those necessary to draw water into the system. In at least one embodiment, the water progresses into and through the disk-pack turbine and over substantially flat disks. The water is discharged from the periphery of the substantially flat disks into a discharge chamber. FIGS. 1A-10 illustrate the use of a system in a water storage container with FIG. 1A showing the water storage container prior to running the system. The discharge geometries create extreme differentials in fluid motion and a dynamic exchange of energy, resulting in highly varied energetic flows and the propagation of myriad vortices which manifest as visible phenomena in the body of water into which the processed water is discharged as illustrated in FIG. 1B after system start-up as compared to FIG. 1A. FIG. 10 illustrates how the vortex 10 that is formed during running of the system is a tight substantially cylindrical vortex 10 axially centered above the expansion chamber inlet incorporated within the disk-pack turbine.

The discharge chamber geometries reduce the effects of viscous molecular boundary layers as well as reducing (if not, in at least one embodiment, avoiding) back pressures that allows for natural expansion and exchange of energies within the fluid. The process culminates with the discharge of highly energized water through process-enhancing discharge port geometries, which follow a discharge path comprised of long radii transitions from the paraboloid-shaped discharge chamber, avoiding right or hard angles, and which are substantially greater in diameter as compared to the fluid inlet geometry into the disk-pack module. The long radii and oversized discharge ports allow for the preservation of accumulated energies/motion as the water is dispersed/contacts the greater volume. For example, in at least one embodiment, the 0.50 inch vortex feed inlet to the disk-pack turbine is used in a device having dual discharge ports having at least a 1.50 inch diameter from the disk-pack module. In at least one embodiment, the concentrated vortex feeding phenomena makes it possible to develop enough systemic throughput to fully charge the discharge ports, which accomplishes the specific objective of at least one embodiment of avoiding elevated pressures and high velocities at discharge, which conserves the energy and motion in the processed water, providing the method and means by which the systems imitate nature's creational, transformational, cleansing power, resulting in exponential compounding and focused intensification of naturally occurring creational and restorative energies in such a way as to emulate the Earth's natural dynamics.

b. First Example Embodiment

Figure 2:
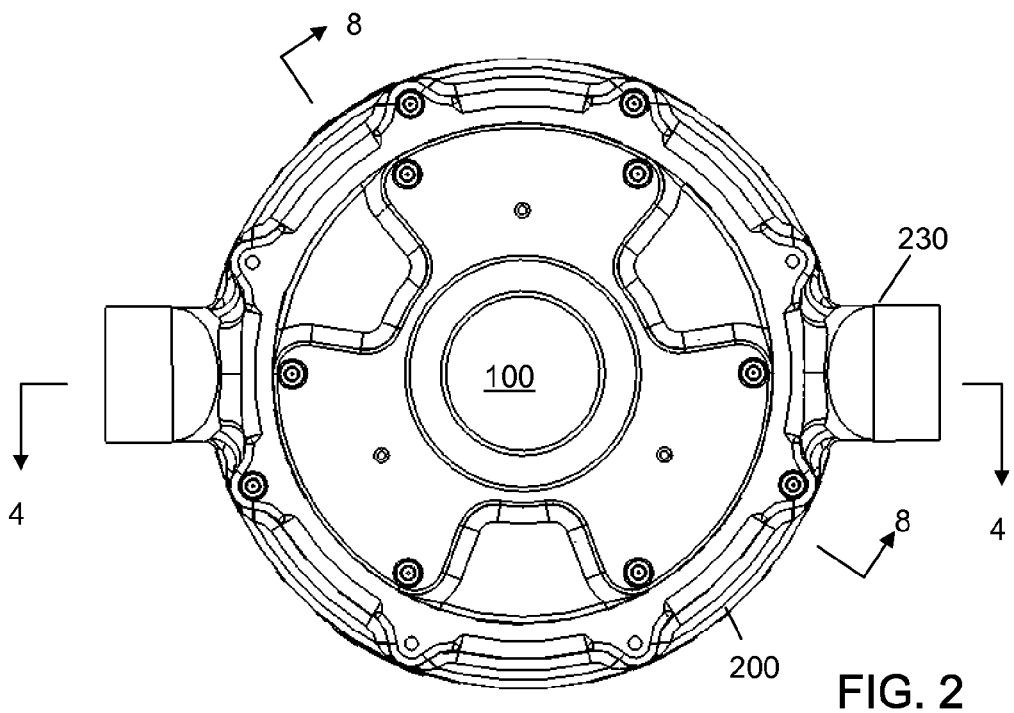
FIG. 2 illustrates a top view of an embodiment according to the invention.
Figure 3:
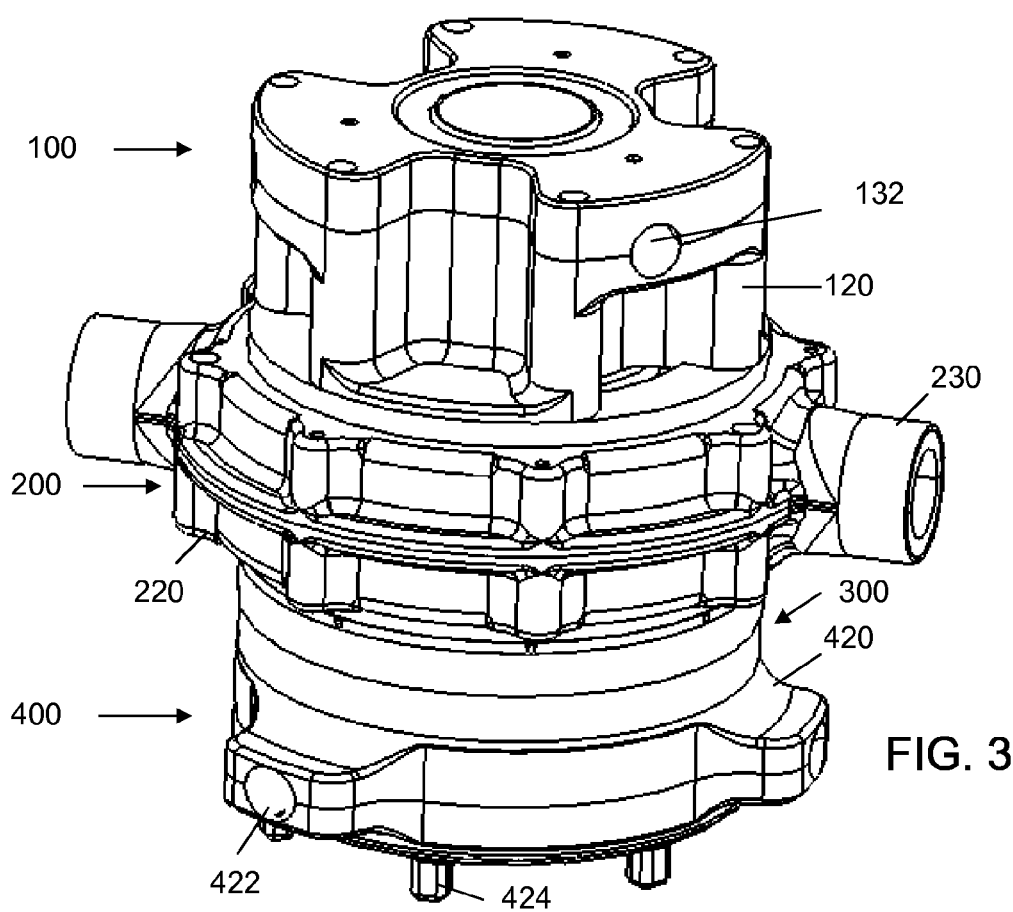
FIG. 3 illustrates a side view of the embodiment illustrated in FIG. 2.

FIGS. 2-10 illustrate an embodiment according to the invention. The illustrated embodiment includes a vortex module 100, a disk-pack module 200, a motor module 300, and a pump (or intake) module 400. The pump module 400, via axial centrifugal suction, draws water (or fluid) into the pump module which, under positive pressure, delivers water into the vortex module 100 that shapes the in-flowing water into a through-flowing vortex which continually feeds the concentrated rotating fluid into the disk-pack module 200 prior to discharging. In one implementation, the illustrated embodiment in FIGS. 2 and 3 is submerged, at a minimum, to a depth to completely submerge the discharge ports of the disk-pack module 200 to allow for the intake and discharge of the water from/back into the water source. However in another implementation, conduit (not shown) is connected to the pump module 400 for drawing water into it from the vessel (or water source) and the disk-pack module 200 could discharge into additional conduit (not shown) for returning the water to its water source. As used in this disclosure, "vessel", for example, includes jars, bowls, buckets, containers, tanks, swimming pools, fountains, stream-fed vernal ponds, ponds, canals, streams, rivers, domestic water wells, irrigation ditches, irrigation reservoirs, evaporative air conditioning systems, and industrial process water systems.

The motor module 300 illustrated, for example, in FIGS. 4-7 includes a dual shaft motor 310 that drives both a disk-pack 250 in the disk-pack module 200 and an impeller 410 in the pump module 400. In at least one embodiment, the dual shaft motor 310 is a pancake motor, although other types of motors could be used to rotate the disk-pack 250. The motor 310 in at least one embodiment is electrical and powered by a power source (not illustrated) such as a battery, rechargeable battery, AC power supply, DC power supply, solar, or any combinations of these examples. In an alternative embodiment the illustrated housing 320 for the motor module 300 is eliminated; and the motor 310 is located in another module either in its own housing or in a cavity within the housing of another module.

Figure 4:
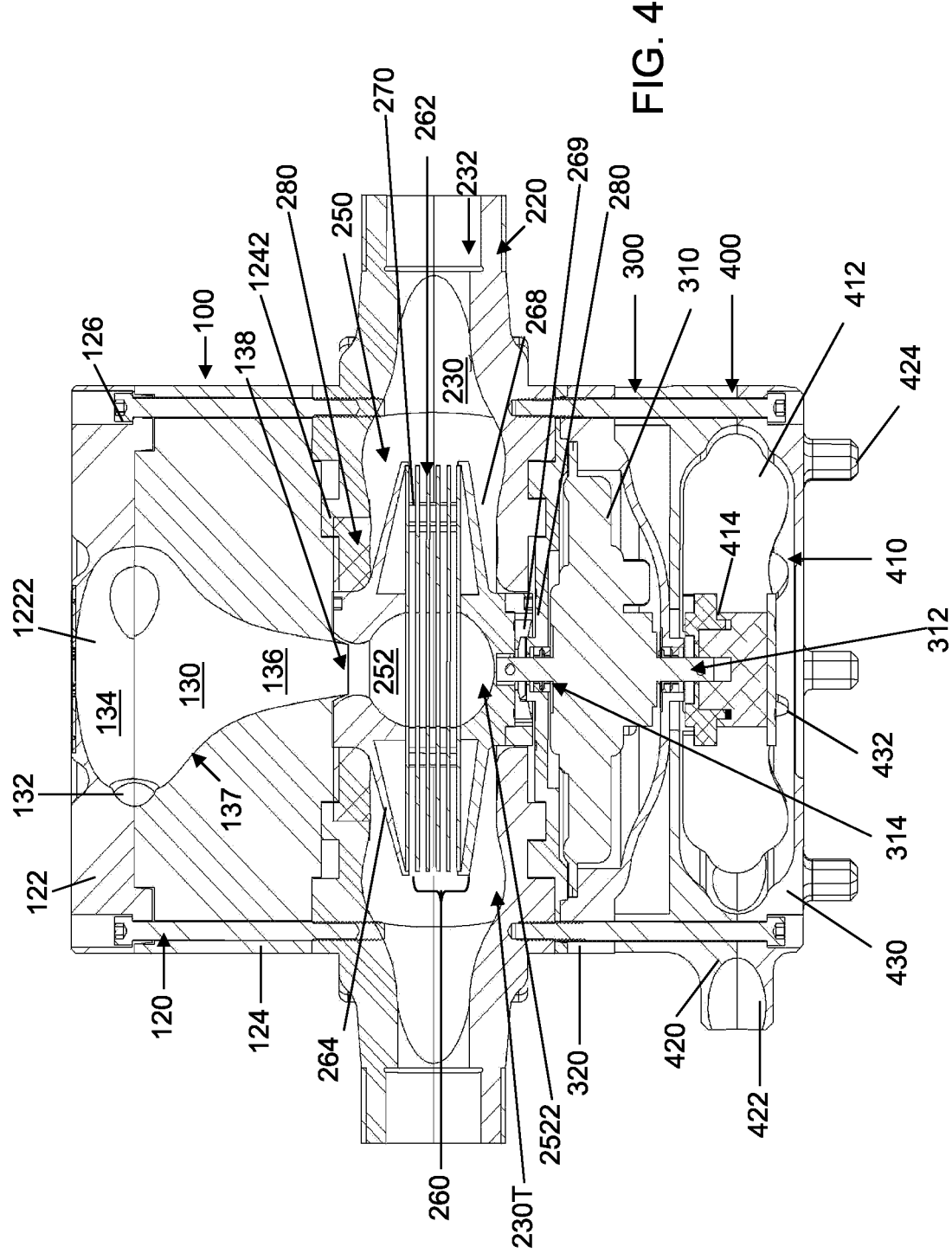
FIG. 4 illustrates a cross-section view of the embodiment illustrated in FIG. 2.
Figure 7:
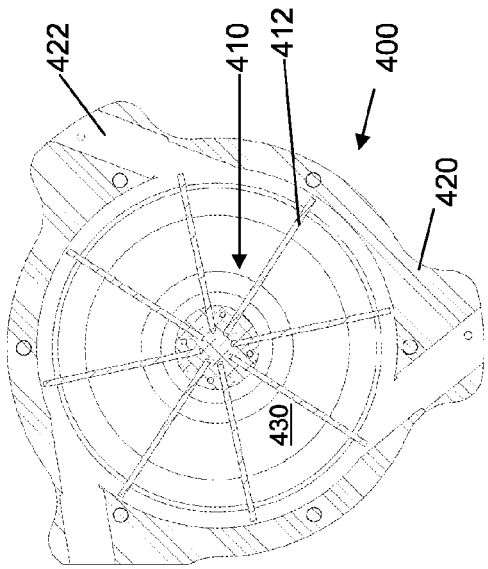
FIG. 7 illustrates a top view of the pump module of the embodiment illustrated in FIG. 2.
Figure 6:
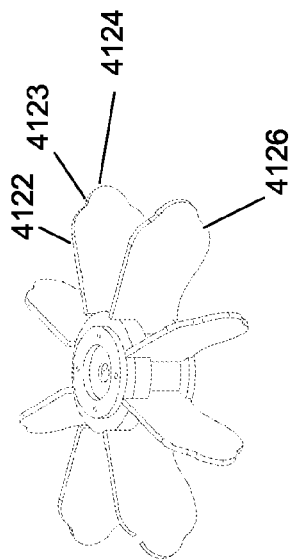
FIG. 6 illustrates an impeller of the embodiment illustrated in FIG. 2.
Figure 5:
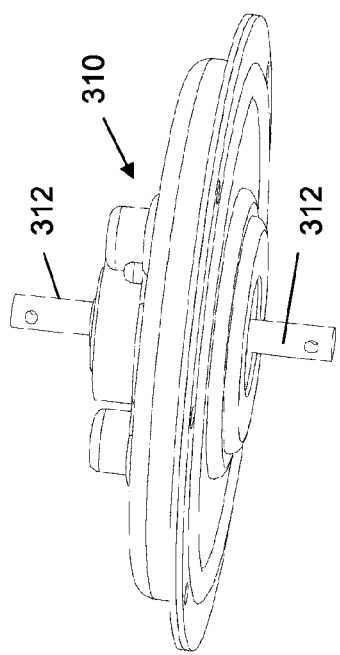
FIG. 5 illustrates a representation of a motor of the embodiment illustrated in FIG. 2.

The pump module 400 includes a bottom suction 8-bladed impeller 410 within a triple-outlet housing 420 as illustrated, for example, in FIGS. 4, 6 and 7. Although the number of blades 412 may number other than eight, for example, any number from two to twelve. Although the blades 412 are illustrated as being substantially vertical, in at least one embodiment the blades 412 are angled relative to an imaginary vertical plane extending radially out from the center of the impeller 410. For example in an embodiment for the Northern Hemisphere, the top of the blade will be forward of the bottom of the blade to drive the fluid towards the outlets. A rotor 414 of the impeller is coupled to the lower driveshaft 312 of the motor 310. FIGS. 4 and 6 illustrate the contours of the impeller blades 412 and complimentary contours of the pump housing 420 that together yield high pressure, high volume, unbroken flows to each of the triple pump outlets 422 to create a forced vortex in the vortex chamber 130.

The illustrated blades 412 have substantially the same lengths as illustrated in FIGS. 6 and 7. The illustrated blades 412 also share a common contour that has a substantially flat horizontal surface 4122 until near the tip of the blade where the tip includes an arcuate section 4124 that is approximately centered on the height of the blade 412 that on either end includes a convex curve section to connect to the top surface 4123 and the bottom surface 4126 of the blade. The illustrated bottom surface 4126 of each blade 412 includes a concave section (or alternatively a flat section) that transitions into a convex section that connects into the lower convex curve of the blade tip 4124. Other shapes may be utilized depending on the contour of the bottom of the pump chamber 430. In at least one illustrative embodiment, each of the blades 412 has the following ranges of dimensions including the end points, which will be true for all example ranges in this disclosure: length between 2.5 and 3.0 inches, height at the tallest between 1.2 and 1.8 inches, height at the shortest between 0.75 and 1.1 inches, thickness of 0.5 to 1.5 inches, and a radius of 0.3 to 0.5 inches for the convex section at the tip. Based on this disclosure, it should be understood that reference to dimensions is illustrative and does not preclude the scaling up or down of the blades or other components to work in smaller or larger devices.

The illustrated pump chamber 430 is fed through an axial inlet 432 that draws water from approximately a central point below the system through an axial passageway that opens into the bottom of the pump chamber 430 as illustrated, for example, in FIG. 4. In at least one embodiment, the axial inlet 432 has a spiral pattern when viewed from above although it is not entirely horizontal as illustrated in FIG. 4, but increases in elevation from the bottom surface 421 of the pump module 400 to the opening in the bottom of the pump chamber 430. Although an alternative structure for the inlet is to have at least one direct passageway (or opening) from the bottom into the pump chamber such as an opening passing vertically through the bottom surface 421.

The illustrated pump module 400 includes a plurality of pump outlets 422. As illustrated in FIGS. 3 and 7, these outlets 422 may number three and be evenly spaced around the periphery of the pump module 400. Any number of outlets 422 may be provided for with the restraints being space for them and the number of inlets 132 into the vortex chamber 130. In an alternative embodiment, one or more outlets feed one inlet where the conduit combines and merges together. In another alternative embodiment, one outlet feeds one or more inlets through branching of the conduit.

A further example of the number of outlets 422 is in a range of from two to eight. FIG. 7 illustrates an example of the pump outlets 422 being tangential extensions off of the pump chamber 430. Using a tangential extension (or similar angle extension), in at least one embodiment, furthers the creation of the vortex in the vortex module 100 when, for example, the conduit (not illustrated) running from the pump module 400 to the vortex module 100 continues a curved (or spiral) connection as illustrated, for example, in FIG. 19 to encourage a spinning motion for the fluid. In at least one illustrative embodiment, the pump chamber 430 has an internal height of between 1.7 and 2.0 inches with the pump outlets 422 having a diameter of between 0.6 and 1.1 inches.

The illustrated pump module 400 includes a plurality of footings 424 or other supports to raise the bottom feeding inlet 432 off of the surface on which the device is placed as illustrated, for example, in FIGS. 3 and 4. However, if the inlet(s) for the pump module 400 is not located on the bottom but, instead, along the side(s) of the housing as illustrated, for example, in FIG. 13, then it is possible to omit the footings 424 while not impacting performance of the device.

Based on this disclosure, it should be appreciated that the above-described pump module in at least one embodiment is a pump for use separate from the described system. In at least one such an embodiment, the number of outlets equals one while in other embodiments the number of outlets is as described above.

Each of the illustrated pump outlets 422 is connected via pipe/tubing (or conduit) to a corresponding inlet 132 for the vortex chamber 130 in the vortex module 100. Pressurized water from the (feed) pump module 400 is supplied to the vortex chamber 130 through the inlets 132 which are illustrated in FIGS. 2-4 and 8 as being arranged radially with a 120 degree separation between them. In at least one embodiment, the inlets 132 are angled to further establish fluid circulation in the vortex chamber 130, which results in a continuous highly energetic, concentrating, through-flowing vortex as illustrated, for example, in FIG. 10.

Figure 8:
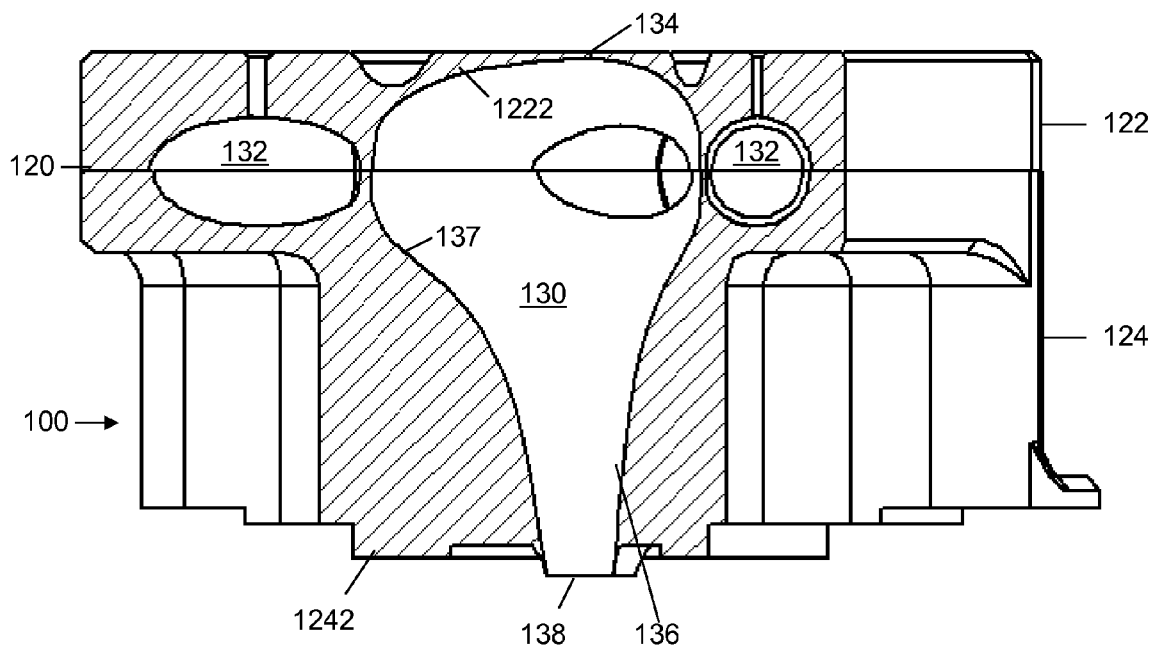
FIG. 8 illustrates a partial cross-section view of the vortex module of the embodiment illustrated in FIG. 2.
Figure 9:
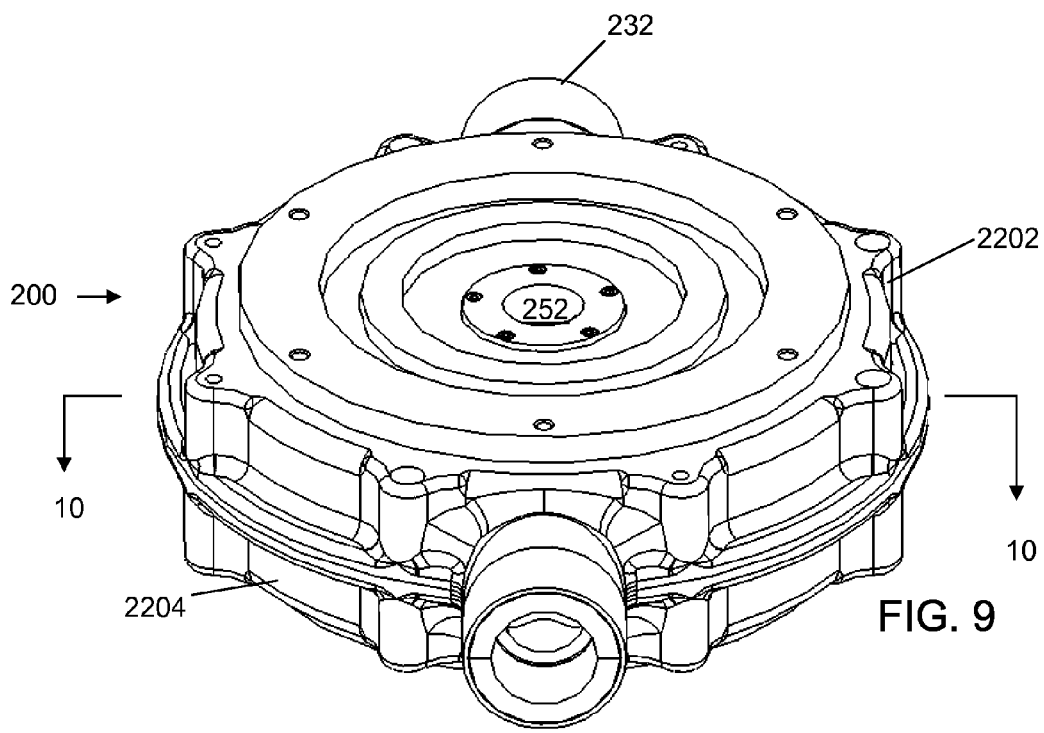
FIG. 9 illustrates a perspective view of the disk-pack module of the embodiment illustrated in FIG. 2.

The illustrated inlets 132 are substantially horizontal although angled to the outside of the housing 120 of the vortex module 100, for example, this angle is such that the inlet 132 enters the vortex housing 120 along a line substantially tangential to the vortex chamber as illustrated, for example, in FIG. 8. An alternative approach would further angle the inlet 132 relative to an imaginary plane with a suitable modification to the vortex chamber to receive the fluid flow. One such modification would be to include an arcuate channel which, if extended, would form a descending spiral to assist with increasing the rotational speed of the fluid. In at least one embodiment, the inlets 132 have a diameter between 0.6 and 1.1 inches to match the size of the pump outlets 422.

As illustrated, for example, in FIGS. 4 and 8, the vortex chamber 130 is a cavity formed inside a housing 120 of the vortex module 100 to shape the in-flowing water into a through-flowing vortex that is fed into the disk-pack module 200. The illustrated vortex chamber 130 includes a structure that funnels the water into a vortex chamber upper section 134 having a bowl (or modified concave hyperbolic) shape for receiving the water that opens into a lower section 136 having conical-like (or funnel) shape with a steep vertical angle of change that opens into the disk-pack module 200. The vortex chamber 130 in at least one embodiment serves to accumulate, accelerate, stimulate and concentrate the water as it is drawn into the disk-pack module 200 via centrifugal suction. In at least one embodiment, the vortex chamber 130 is formed by a wall 137. The sides of the wall 137 follow a long radial path in the vertical descending direction from a top to an opening (or outlet) 138 that reduces the horizontal area defined by the sides of the wall 137 as illustrated, for example, in FIGS. 4 and 8. By way of example, in at least one illustrative embodiment, the housing 120 has a diameter between 6 and 10 inches with the vortex chamber upper section 134 having a diameter between 3 and 3.5 inches and the vortex chamber lower section 136 having a diameter between 0.5 and 0.85 inches at opening 138.

As illustrated, for example, in FIGS. 4 and 8, the housing 120 of the vortex module 100 includes a two-part configuration with a cap 122 and a main body 124. The cap 122 and the main body 124 can be attached in a variety of ways including, for example, with screws, bolts 126, adhesive, interlocking engagement such as threaded or keyed sections, etc. The cap 122 is illustrated as having the top portion of the vortex chamber 130 formed by a concentric concave depression 1222 on the inside face of the cap 122. The cap 122 and the main body 124 together form the plurality of vortex inlets 132.

The main body 124 is illustrated as having a cylindrical shape with a passageway passing vertically through it to form the lower portion 136 of the vortex chamber 130. The main body 124 in at least one embodiment is attached to the disk-pack housing 220 with the same bolts 126 used to attach the cap 122 to the main body 124 as illustrated, for example, in FIG. 4. Other examples for attaching the main body 124 to the disk-pack module 200 include adhesive, screws, and interlocking engagement such as threaded or keyed sections. FIGS. 4 and 10 also illustrates that the main body 124 and the disk-pack module 200 may include a variety of protrusions and complimentary grooves/slots for lining the two pieces together in addition to the main body 124 and vortex chamber 130 extending below the rest of the bottom 1242 of the main body 124 to provide an overlap with the expansion chamber 252 in the disk-pack module 200.

As the rotating, charging water passes through the base discharge opening 138 of the vortex chamber 130 it is exposed to a depressive/vacuum condition as it enters into the revolving expansion and distribution chamber (or expansion chamber) 252 in the disk-pack module 200 as illustrated in FIG. 4. The disk-pack module 200 includes the revolving expansion chamber 252 that is illustrated as having an oval/elliptical/egg-shape chamber that includes a curved bottom portion provided by a rigid feature 2522 such as a concave radial depression incorporated into the bottom rotor 268 of the disk-pack turbine 250. Most of the volumetric area for the expansion chamber 252 being formed by the center holes in the separated stacked disks 260 which serve as water inlet and distribution ports for stacked disk chambers 262. The top portion of the expansion chamber 252 roughly mirrors the bottom with the addition of an opening passing through an upper (or top) rotor 264 that is bordered by a curved structure. The opening is centered axially with the vortex chamber 130 above it as illustrated, for example, in FIG. 4.

An example of a disk-pack turbine 250 is illustrated in FIG. 4. The illustrated disk-pack turbine 250 includes the top rotor 264, a plurality of stacked disks 260, and the bottom rotor 268 having a concave radial depression 2522 in its top surface that provides a bottom for the expansion chamber 252. The illustrated bottom rotor 268 includes an integrally formed motor hub 269. The motor hub 269 provides the interface to couple the disk-pack 250 to the upper drive shaft 314 extending from the motor module 300 as illustrated, for example, in FIG. 4. Although illustrated as being separate pieces, the motor hub may be integrally formed with the bottom rotor. The top rotor 264, the bottom rotor 268, and/or the motor hub 269 are coupled to the housing 220 with a bearing element 280 or have a bearing incorporated into the piece to allow for substantially reduced rotational friction of the disk-pack 250 relative to the housing as driven by the drive shaft and the motor.

Each of the disks 260 includes an opening (or hole) passing through its center with stacked disk openings substantially aligned with each other to define a portion of the expansion chamber 252. The opening of the top plate 264 and top catch plate 266 are axially aligned with the outlet 138 of the vortex chamber 130 providing a pathway through which the fluid can pass between the two respective chambers. In at least one embodiment, the opening in the disks 260 has a diameter between 1 and 2 inches with the disks 260 having an outside diameter of 5 to 6 inches.

Centrifugal suction created by fluid progressing from the inner disk-pack chamber openings, which are the holes in the center of the disks 260 illustrated, for example, in FIG. 4, toward the periphery of the disk chambers 262 establishes the primary force that draws, progresses, pressurizes and discharges fluid from the disk-pack turbine 250. The viscous molecular boundary layer present on the rotating disk surfaces provides mechanical advantage relative to impelling fluid through and out of the disk-pack turbine 250. Additional impelling influences are derived from the rotating wing-shims 270 (examples of which are illustrated in FIGS. 31-37), which simultaneously provide structure and support for the disks 260 in the disk-pack turbine 250 and are responsible for maintaining disk positions and separation tolerances. The wing-shims 270 are designed to create minimal disturbance of flows relative, for example, to resistance, turbulence, and cavitation, by way of the designed wing geometry that aids in the generation of peripheral suction conditions as well as production of variations in high and low pressure fluid dynamic velocities and the propagation of vortices, which all work synergistically to boost system flow-through dynamics and efficiencies.

FIG. 4 also provides an illustration of wing shims 270 being used to space and support the disks 260 from each other to provide chambers 262 through which water travels from the expansion chamber 252 to the discharge chamber 230. As will be discussed in a later section regarding the wing shims 270, the structure, the number, and the location of the wing shims 270 can vary along with their structure and dynamic function.

The disk-pack turbine 250 is held in place by the housing 220 of the disk-pack module 200. The housing 220 includes a discharge chamber 230 in which the disk-pack 250 rotates. The discharge chamber 230 is illustrated, for example, in FIG. 4 as having a hyperbolic parabloid cross-section that leads to a plurality of discharge ports 232 on the outside periphery of the housing 220. In this illustrated embodiment, there are two discharge ports 232, but more discharge ports 232 may be added and, in at least one embodiment, the discharge ports 232 are equally spaced around the housing periphery as illustrated in FIGS. 2, 3 and 10, which also illustrates the outside of the disk-pack module housing 220. In at least one illustrative embodiment, the housing 220 has a diameter between 10 and 14 inches; the discharge chamber 230 has a diameter between 7 and 8 inches; and the discharge port 232 has an opening diameter of between 0.8 and 2 inches, and more particularly between 1.5 and 2 inches.

The highly concentrated energetic, pressurized, rotating through-flowing water converges and is discharged through the base outlet 138 of the vortex chamber 130 before diverging into the expansion chamber 252 in the disk-pack module 200, where the energetic fluid rapidly expands within the elliptical rotating expansion chamber 252. There, the spinning, expanding fluid is divided, distributed, and accelerated between multiple separated chambers 262 formed by the gap/space/separation between the disks 260 within the disk-pack turbine 250 as illustrated, for example, in FIG. 4. Although fluid is fed into the disk-pack turbine 250 under positive pressure in at least one embodiment where the vortex chamber outlet 138 diameter is intentionally restricted. The fact that a large volume of fluid is capable of passing through the restricted orifice 138 is a direct result of the concentrated, focalized nature of the vortex feed. Nonetheless, the efficiency of the feed rate is also impacted by the level of propagating suction forces within the fluid originating with the centrifugal forces from the spinning disk chambers 262.

As mentioned above, once the fluid passes through the disk-pack turbine 250, it enters the discharge chamber 230 in which the disk-pack turbine 250 rotates. As illustrated, for example, in FIG. 4, the discharge chamber 230 is an ample, over-sized, geometrically torus/paraboloid shaped chamber within the disk-pack module 200. The discharge chamber 230 gathers the fluid after it has passed through the disk-pack turbine 250 to accumulate, exchange energies, and further generate, for example, mixed flows, pressures, counter-flows, currents, vortices, and temperature. The highly energetic fluid smoothly transitions to be discharged at low pressure and velocity through the plurality of over-sized discharge ports 232 back into the environment from which the fluid was taken. FIGS. 4 and 10 illustrate the presence of two discharge ports 232 that are over-sized as compared to the inlet into the expansion chamber. As illustrated, for example, in FIG. 4, the tallest portion 230T of the discharge chamber 230 is approximately at a distance from center equal to the radius of the disk-pack turbine 250. The height of the discharge chamber 230 decreases from the tallest portion 230T to the periphery 234 of the discharge chamber 230 to form a curved outer wall as illustrated in FIG. 10 except for where the discharge ports 232 are located as illustrated in FIG. 4.

While progressing through the vortex chamber 130, the expansion chamber 252, over disk-pack surfaces, through the discharge chamber 230 and out through its discharge ports 232, the fluid is exposed to a multiplicity of dynamic action and reactionary forces and influences, all of which work in concert to achieve desired outcomes relative to water-enhancing processes.

c. Second Example Embodiment

FIGS. 11-15 illustrate another embodiment according to the invention that shares similarities with the previous embodiment despite differences in the external design for the vortex module 100A and combination motor and intake module 400A. An example of material that can be used to manufacture the housings for these modules includes a broad range of plastics such as polyethylene chloride (PVC), polycarbonate, acrylonitrile butadiene styrene, acetal, acrylic, and polyethynols; carbon fiber; Teflon; and metals such as stainless steel and brass.

Figure 11:
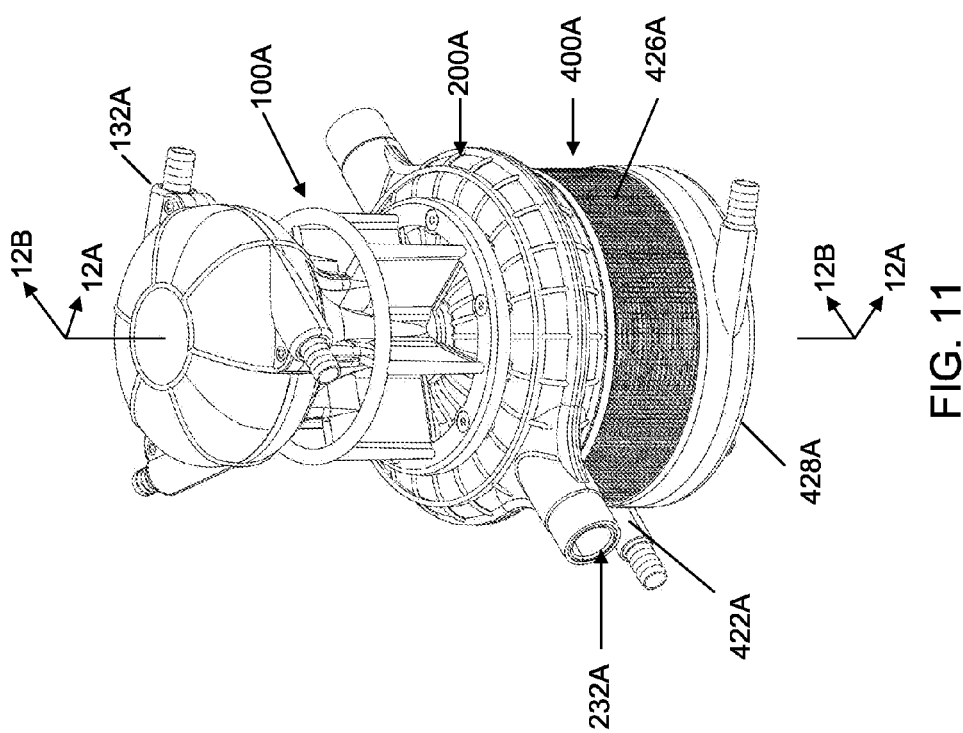
FIG. 11 illustrates a second embodiment according to the invention.
Figure 12:
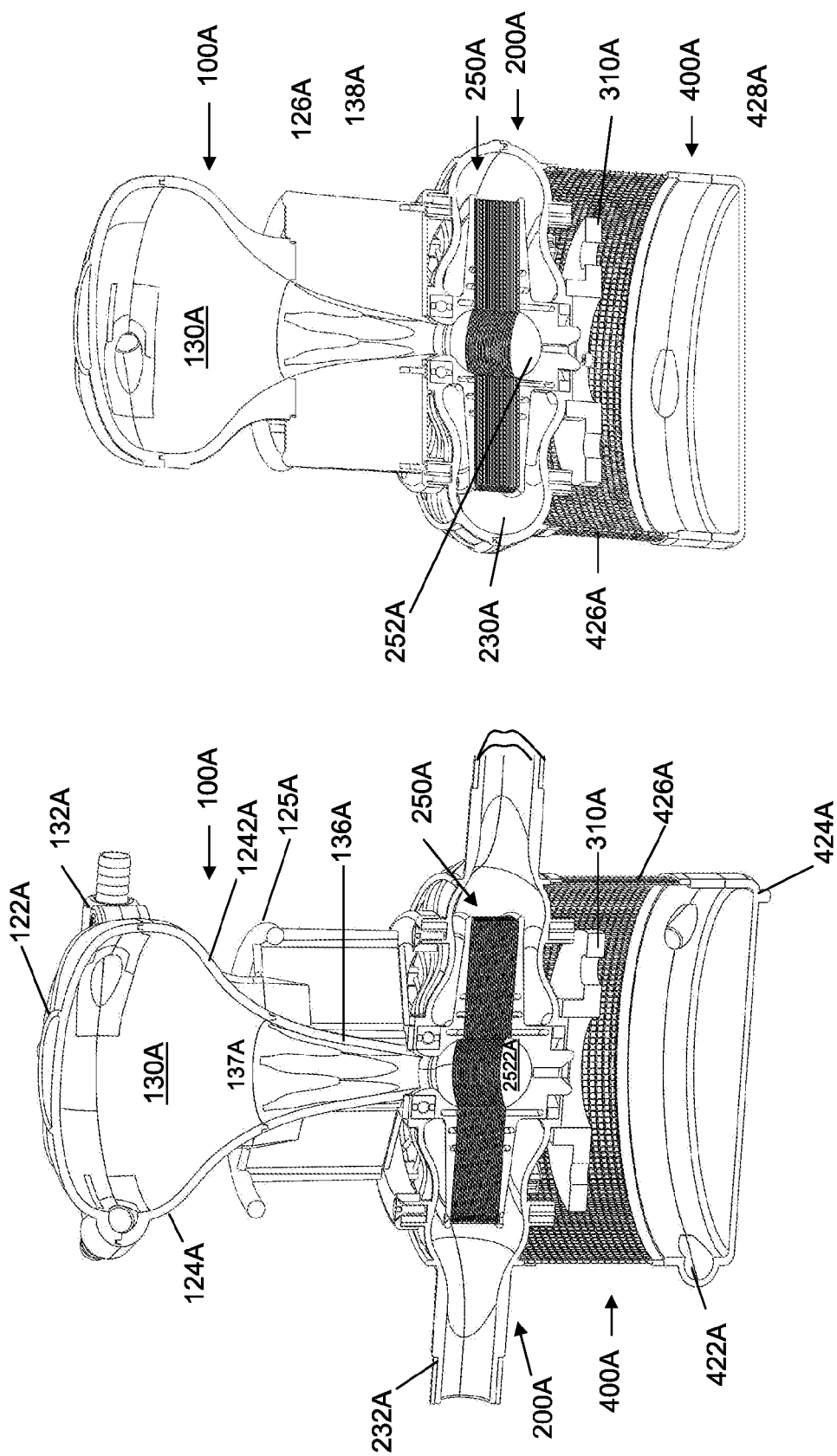
FIGS. 12A and 12B illustrate cross-section views of the embodiment illustrated in FIG. 11 taken at the respective lines in FIG. 11.

The combination motor and intake module 400A as illustrated in FIGS. 11-12B includes a housing 420A that includes a cylindrical screen 426A (or other filtering structure, see, e.g., FIGS. 16-19 and 21) with a cylindrical base 428A with an enclosed bottom. The housing 420A surrounds a motor 310A that is mounted under the disk-pack module 200A for driving the disk-pack 250A with its single shaft 314A (as a double shaft is not needed for this embodiment with the omission of an impeller). In an alternative embodiment, the motor is located in a protective housing isolating it from the disk-pack module and further protects the motor from the fluid beyond the protection offered by the motor housing. The screen 426A provides a barrier for extraneous material that may be present in the water (or other fluid) such as algae, rocks, sticks, animals, animal larvae, and other debris. Once the water passes through the screen 426A, it will then be drawn into the plurality of conduit (not shown) connecting the intake module 400A with the vortex module 100A. This embodiment does not include an impeller to draw in the water and feed the connecting conduit, because the disk-pack turbine 250A is relied on to draw in the fluid. This embodiment is an example of minimal footings 424A being used on the bottom of the system compared to the relative footing size on the previous embodiment illustrated, for example, in FIG. 3.

The combination motor and intake module 400A and the vortex module 100A are connected together with conduit (not shown). Each module includes an equal number of connectors (outlets 422A/inlets 132A, respectively). For illustration purposes, an example of a connector 132A, 422A that can be used is the illustrated barbed connector that allows for flexible piping to be placed over the connector 132A, 422A to form the connection, allowing for easy replacement of the conduit if needed as illustrated, for example, in FIG. 11. The connectors 132A, 422A may be integrally formed with their respective module's housing or as illustrated, for example, in FIGS. 13 and 14 have a threaded (or other mechanical coupling) connection between the housing 120A, 420A and the connector 132A, 422A. Other examples of mechanical coupling include, for example, ring channels on the inside of the connector and protrusions or O-rings on the outside of the conduit to substantially seal and connect the pieces, clamps around the outside of tubing that connects over the connectors, and barbs or other protrusions on the connectors to more firmly engage connected tubing. The illustrated arrangement of the connectors 132A, 422A facilitates the flow of water through the connectors 132A, 422A, particularly for the vortex chamber 130A with the water flowing in a counterclockwise direction to support the formation of a vortex. The angle of the connector 132A relative to the housing 120A in the illustrated embodiment is an acute angle between the flows of water. In at least one embodiment, the angle of the connector 132A relative to the vortex chamber 130A allows for the tangential addition of water into the vortex chamber 130A. In an alternative embodiment, the system is arranged with the inlets 132A into the vortex chamber 130A angled for reverse motion and the motor 310A built for turning the disk-pack turbine 250A in the reverse direction for creation of a clockwise rotation of the fluids, which would be useful in the Earth's Southern Hemisphere.

The structure of the vortex module 100A remains the same in terms of its operation; however, the illustrated external housing 120A is smaller and more fitted about the vortex chamber 130A with the addition of structural support members 126A extending up from a bottom plate 128A that connects to the disk-pack module 200A to a point part way up the vortex module 100A to a support ring 125A as illustrated in FIG. 11. The support ring 125A in the illustrated embodiment is located at about the height of where the vortex chamber walls approach an angle in excess of 75 degrees, although other heights are possible. The support members 126A, as illustrated, for example, in FIG. 11, are walls that extend radially out from the outside of the vortex chamber 130A to a distance approximating the radius of the support ring 125A where the walls 126A each have a support column 127A, which may be omitted. In addition to the support walls 126A, FIGS. 11 and 12A illustrates the presence of additional support walls 123A extending above the support ring 125A and abutting the bottom of the housing 120A around an upper section of the vortex chamber 130A. In a further embodiment, the support structure is omitted or configured in a different way.

Figure 14:
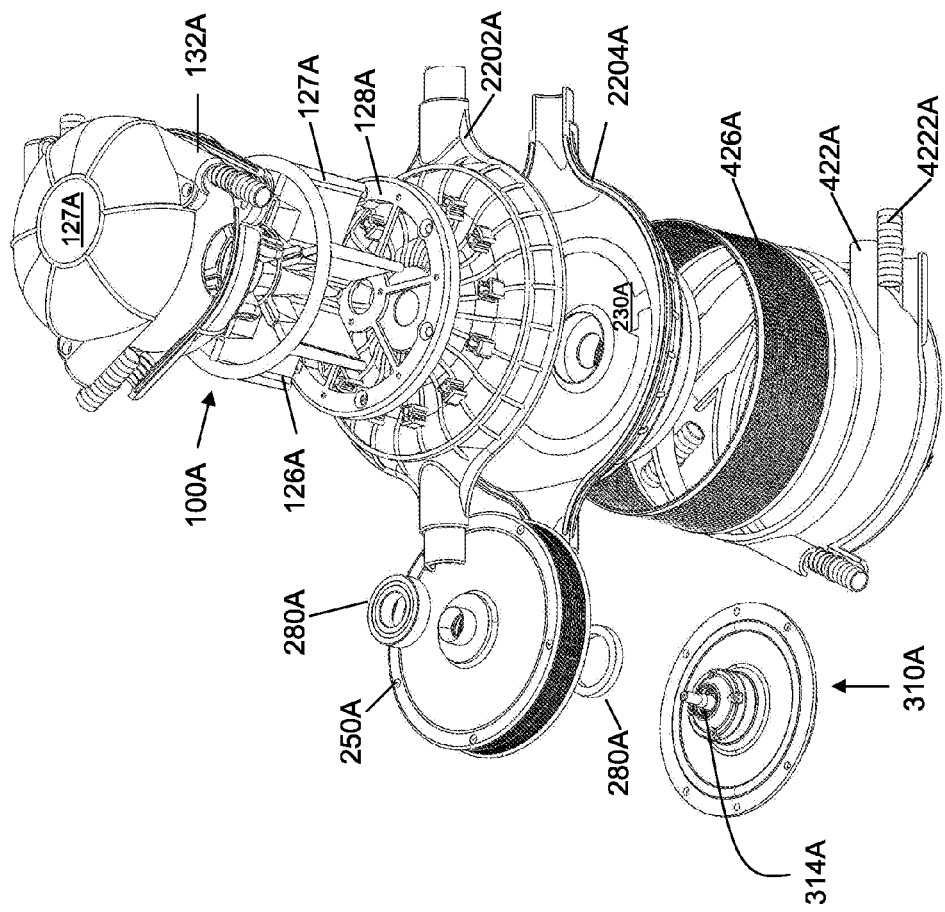
FIG. 14 illustrates a perspective and exploded view of the embodiment illustrated in FIG. 11 according to the invention.
Figure 13:
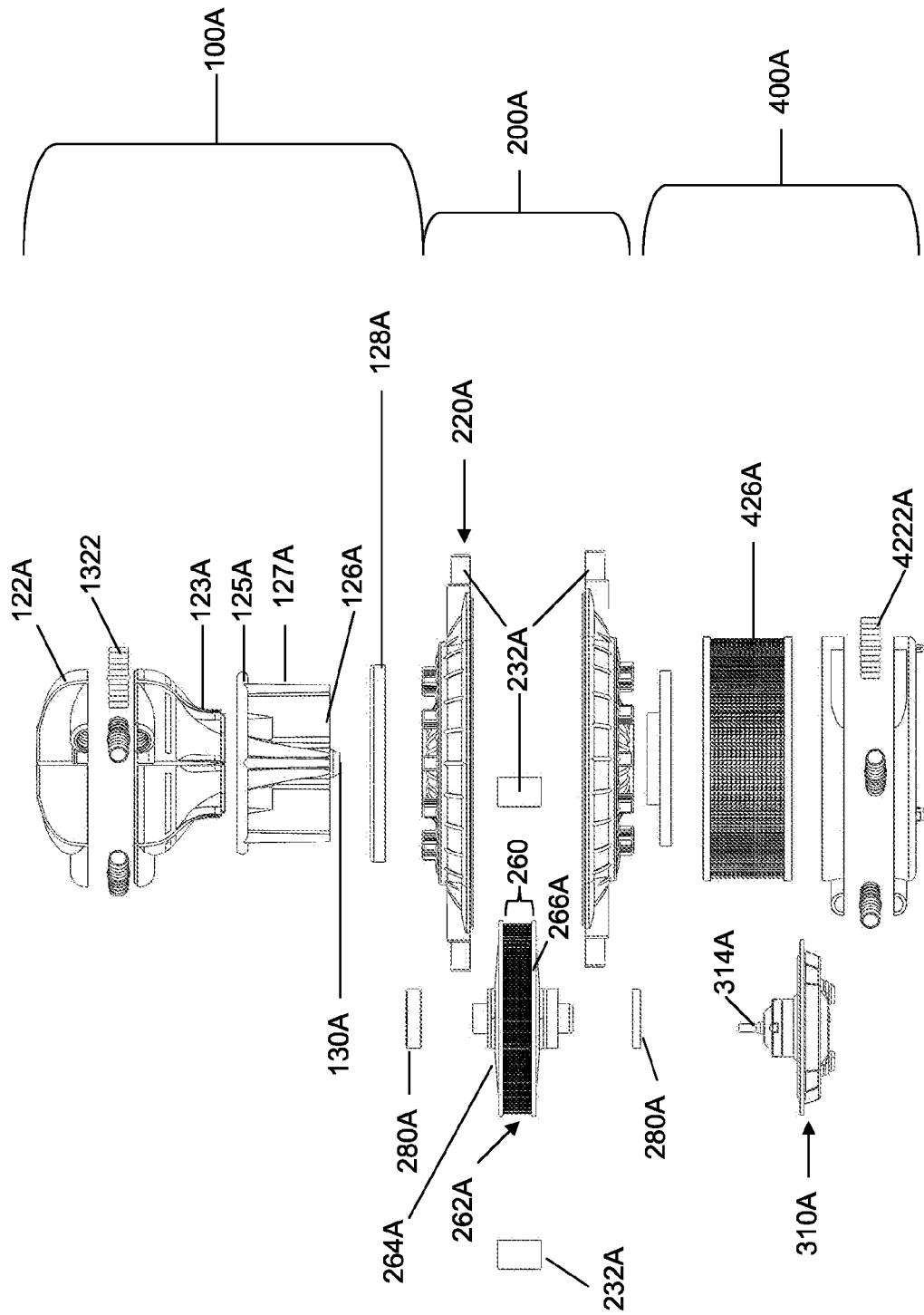
FIG. 13 illustrates an exploded view of the embodiment illustrated in FIG. 11 according to the invention.
Figure 15:
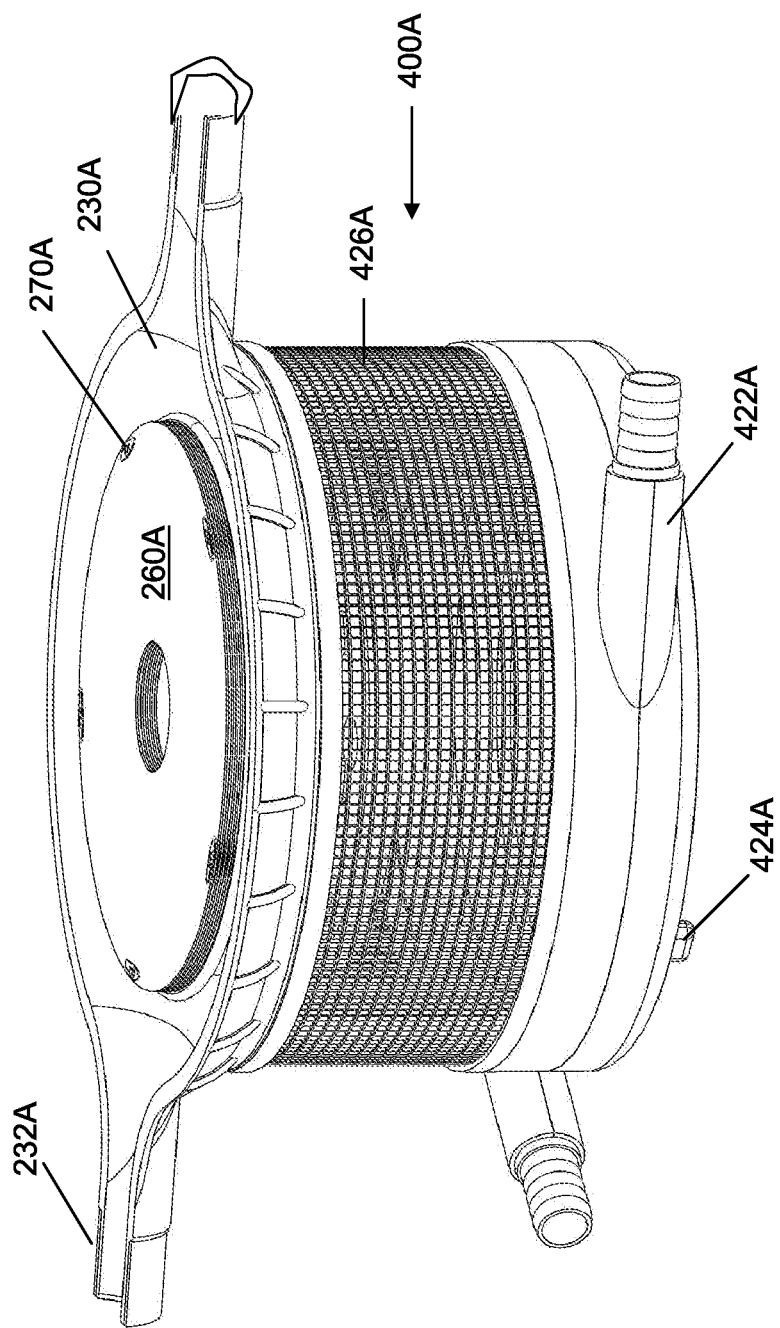
FIG. 15 illustrates an intake module and partial disk-pack module of the embodiment illustrated in FIG. 11 according to the invention.

The disk-pack module 200A has some similarities to the previously described disk-pack module 200 as illustrated in FIG. 12A-13. The disk-pack turbine 250A includes a top plate 264A, a plurality of disks 260A, and a bottom plate 268A that includes a motor coupling (or hub). The top plate 264A and the bottom plate 268A mounted in the housing 220A in at least one embodiment with a bearing element 280A serving as the connection point at the top and bottom to allow for rotation of the disk-pack turbine 250A, as illustrated in FIG. 13. As illustrated in FIG. 14, the disk-pack turbine 250A includes at least two bolts 254A connecting plates 264A, 268A and the disks 260A together in addition to a plurality of wing shims 270A. The wing shims 270A in this embodiment are spaced in from the disk periphery as illustrated in FIG. 15. The illustrated discharge chamber 230A has a slightly different toroid/paraboloid shape, as illustrated in FIGS. 12A and 12B, than the previous embodiment. The disk-pack turbine 250A includes an oval expansion chamber 252A in which to receive the incoming water flow from the vortex chamber 130A. The disk-pack turbine 250A in this embodiment, as illustrated, is a larger disk-pack than the previous embodiment in terms of the number of stacked disks 260A. The outside diameter of the disk-pack turbine 250A and the main housing 220A, as well as the vortex chamber 130A, are significantly larger and the vortex chamber 130A has substantially greater depth as compared to the previously described embodiment.

The discharge chamber 230A includes a pair of laterally concave sections connected by a convex section along the ceiling and the floor. The discharge chamber 230A is taller in the inner concave section than in the outer concave section. The outer concave section is connected with a second convex section that merges into an arcuate side wall. As with the previous embodiment, two discharge ports 232A are illustrated as exiting from the discharge chamber 230A.

In a further embodiment, the system is wrapped with filter material to act as a first stage filter to prevent large particles from entering the intake module 400A.

d. Third Example Embodiment

An alternative of the above-described embodiment is to locate the motor in its own housing and relocate the intake module 400 to around the vortex module 100 such that the connecting conduit is omitted. In this embodiment, the vortex chamber intakes will draw water through the surrounding screen enclosure directly into the vortex chamber based on suction forces resulting from movement of water through and out of the disk-pack.

Figure 16:
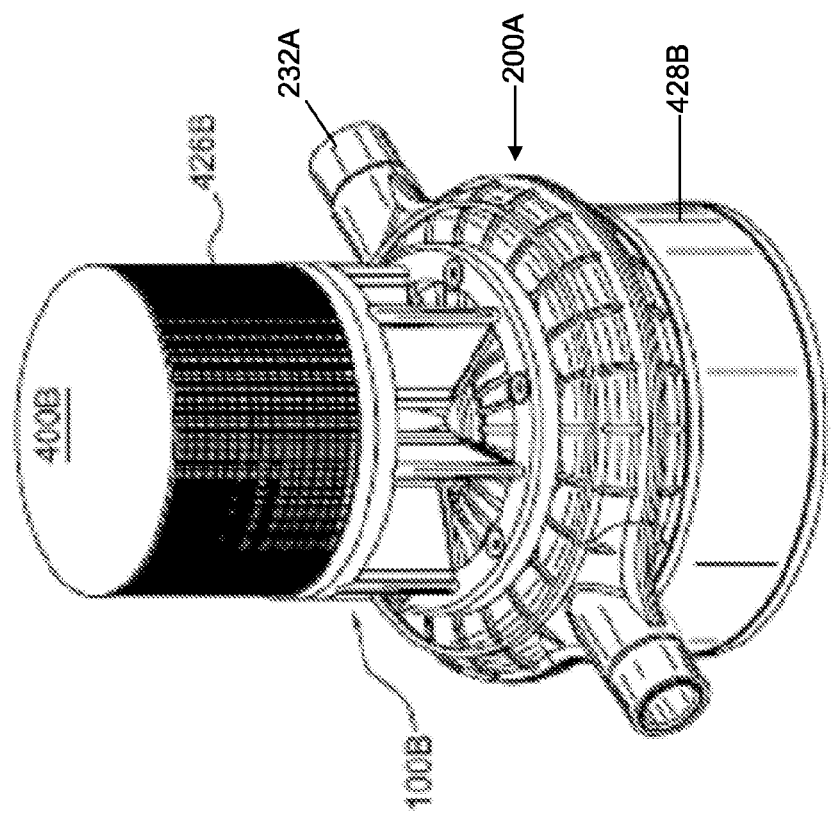
FIG. 16 illustrates a third embodiment according to the invention.

One possible structure for this embodiment is illustrated in FIG. 16. This embodiment places an input module 400B having a filter 426B (or other screen structure) above and around the top of the vortex module 1008. This embodiment will feed the water into the top of the vortex chamber.

Figure 17:
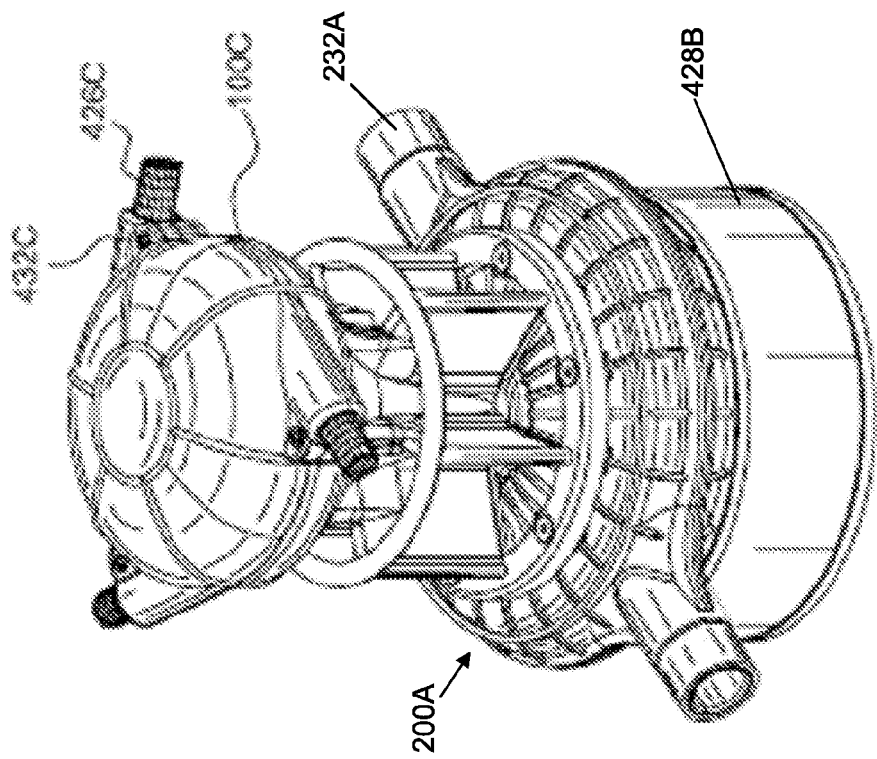
FIG. 17 illustrates an alternative embodiment according to the invention.

A second possible structure for this embodiment is illustrated in FIG. 17. This embodiment includes a plurality of inlets 132C into the vortex chamber around the side of the vortex module 100C. The addition is the placement of a screen (or other filter) 426C around the top portion of the vortex module 100C to cover the inlets 132C. In at least one embodiment, the screen 426C is placed next to or abutting the inlets 132C, and as such may be a cover that is placed over the inlets 132C.

In another embodiment illustrated in FIG. 18, a screen 426D is spaced from the inlets to provide a gap between them, and as such may resemble a cap over the top of the vortex module 100D similar to the structure depicted in FIG. 16.

e. Fourth Example Embodiment

Figure 19:
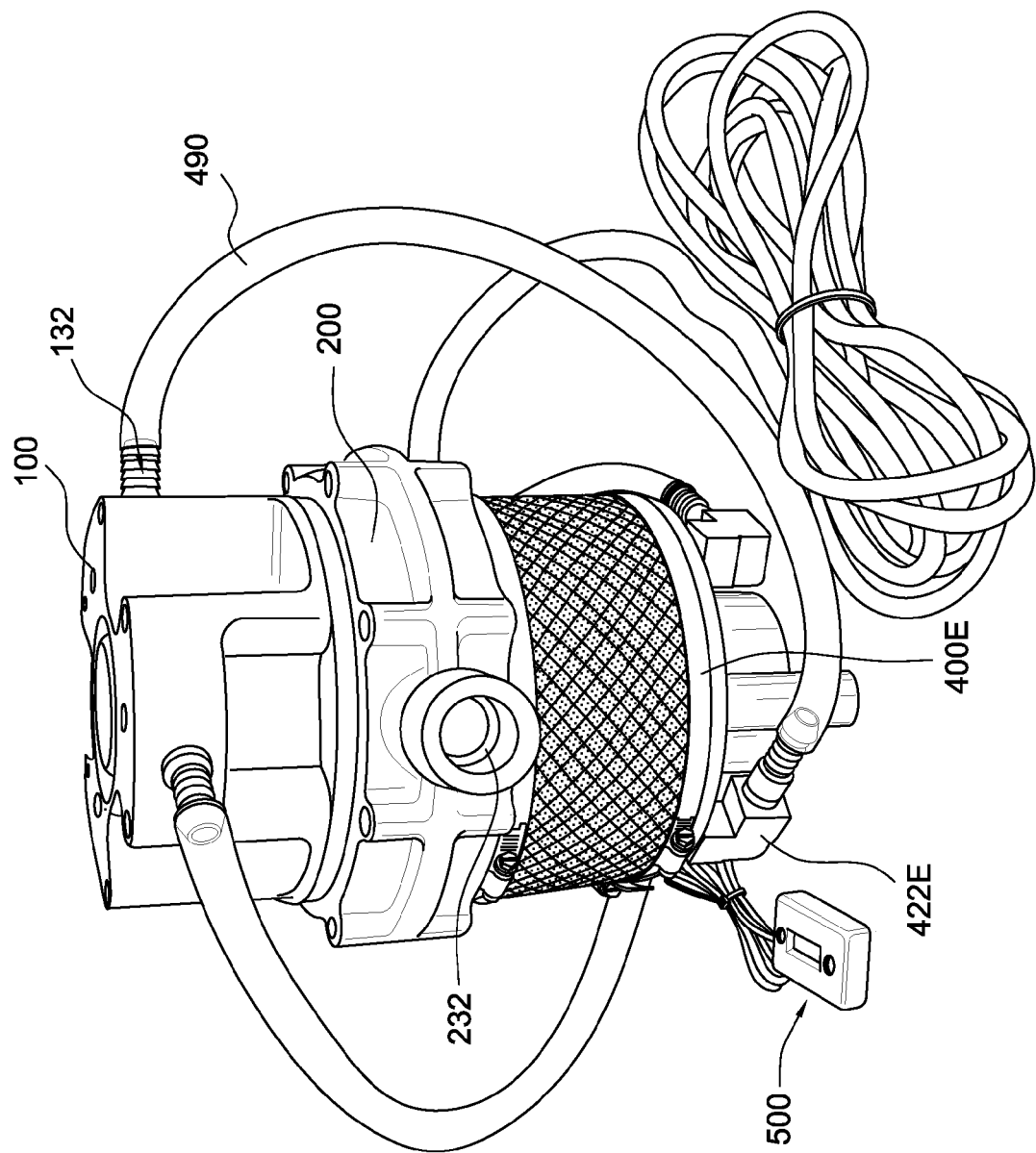
FIG. 19 illustrates a side view of a fourth embodiment according to the invention.
Figure 20:
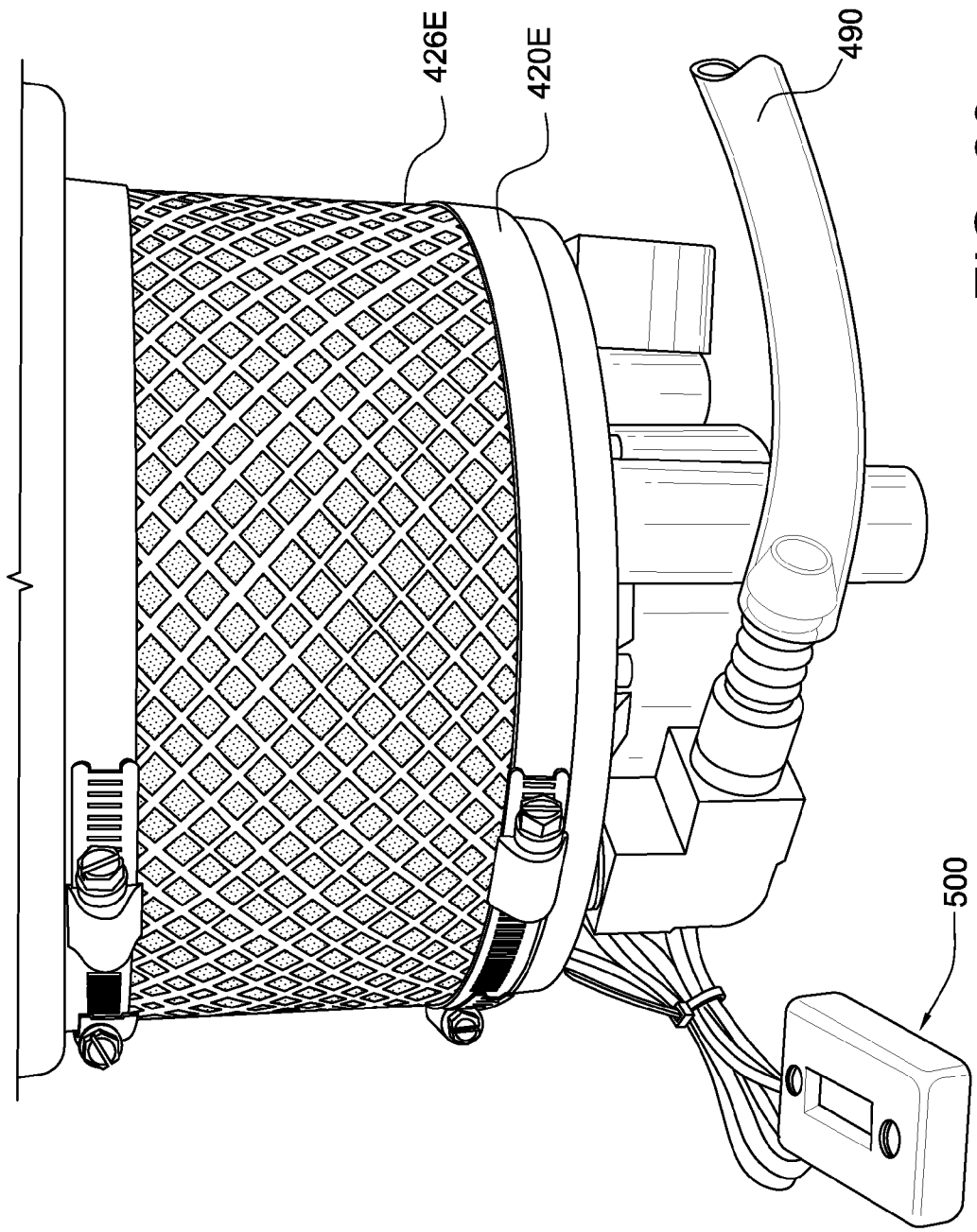
FIG. 20 illustrates a side view of the embodiment illustrated in FIG. 19.

FIGS. 19 and 20 illustrate an embodiment according to the invention that includes a vortex module 100, a disk-pack module 200, and a motor module 400E (or combination motor and intake module 400E). The illustrated motor module 400E includes a single shaft motor (not shown) and a mounting section 420E that has incorporated into it three water-charging suction ports 422E and a water screen 426E. This example embodiment relies on a suction-generated flow-through feeding vortex utilizing, exclusively, rotary suction generated via the rotating disk-pack turbine.

Water is supplied to the vortex chamber via the three water-charging suction ports 422E (or outlets) which are incorporated into a plastic ring structure 420E that also serves as the primary motor mount. Each of the three illustrated inlet ports 132E having a barbed fitting to which conduit 490 is attached and connected to each of the three corresponding vortex chamber inlets. The three inlet suction ports 422E may be arranged radially with a 120 degree separation between them to draw water through the filter. Water pulled into the device via the disk-pack turbine 250 generated suction, is supplied to the vortex chamber through the triple inlet ports 132, which are illustrated as being arranged radially with a 120 degree separation between them. In at least one embodiment, the triple inlet ports 132 are angled to establish fluid circulation in the vortex chamber, which results in a continuous highly energetic, concentrating, through-flowing vortex. FIG. 19 illustrates an example of the conduit 490 curved between the motor module 400E and the vortex module 100.

In this illustrative embodiment, the efficiency of the feed rate remains intentionally restricted for purposes of propagating greater suction forces within the fluid, which accentuates the degree of fluid expansion prior to distribution of the fluid into the disk chambers 262.

Prototypes built according to this embodiment utilizing a disk-pack assembled with all stainless steel disks and a disk gap tolerance of between 2.0 and 2.7 mm have precipitated dissolved and suspended solids and deposited them in low flow/eddy zones on the bottom of the container (or vessel) from which the source water was drawn and returned in what can be considered a closed re-circulating application of the device.

f. Fifth Example Embodiment

FIGS. 21-26C illustrate a further example embodiment according to the invention. The illustrated embodiment is similar to prior embodiments. The illustrated embodiment is approximately 18 inches tall with a base (excluding the outlets 422F) having a diameter of approximately 11 inches and the distance between the opening of the discharge ports 232F having a distance of approximately 11.7 inches. The illustrated embodiment includes a vortex module 100F, a disk-pack module 200F, and a combined motor/intake module 400F.

As illustrated, for example, in FIGS. 23A-23D, motor/intake module 400F includes a pair of screens 426F, 427F that together with a base 420F provide the housing for the module 400F. The inner screen 426F attaches to the base 420F and the bottom of the disk-pack module 200F and over it is placed the outer screen 427F that is able to at least partially rotate over the inner screen 426F. The outer screen 427F includes a lever (or handle) 4272F, which may be omitted, that assists in rotation of the outer screen 427F relative to the inner screen 426F. The pair of screens, 426F, 427F each includes a plurality of slots 4262F, 4276F, respectively, spaced around their periphery such that when the slots 4262F, 4276F. The relative position of the two screens 426F, 427F to each other define whether there are any openings through which the water may pass along with the size of the resulting openings. In at least one embodiment, the screens 426F, 427F together are a filter. In use, the openings will be set such that they will be small enough to block a vast majority of debris and other material present in the water being processed. In an alternative embodiment, the slots 4262F, 4276F are slanted relative to vertical.

Figure 23A:
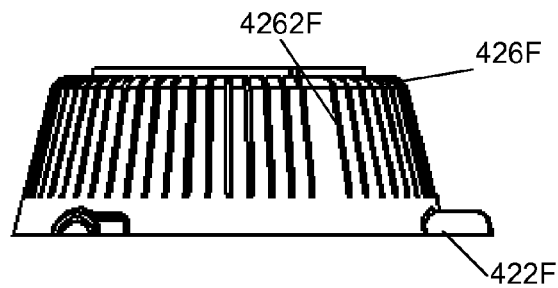
FIG. 23A-23C illustrate side views of an intake module of the embodiment illustrated in FIG. 21.
Figure 23B:
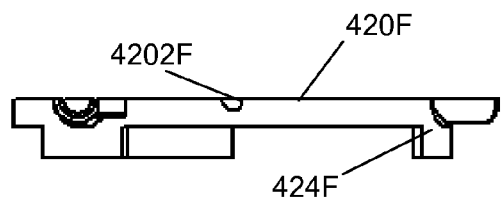
Figure 23C:
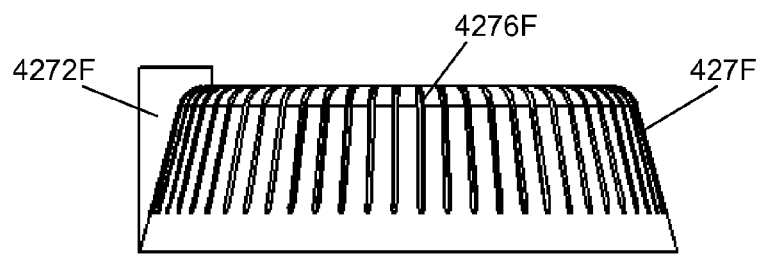
Figure 23D:
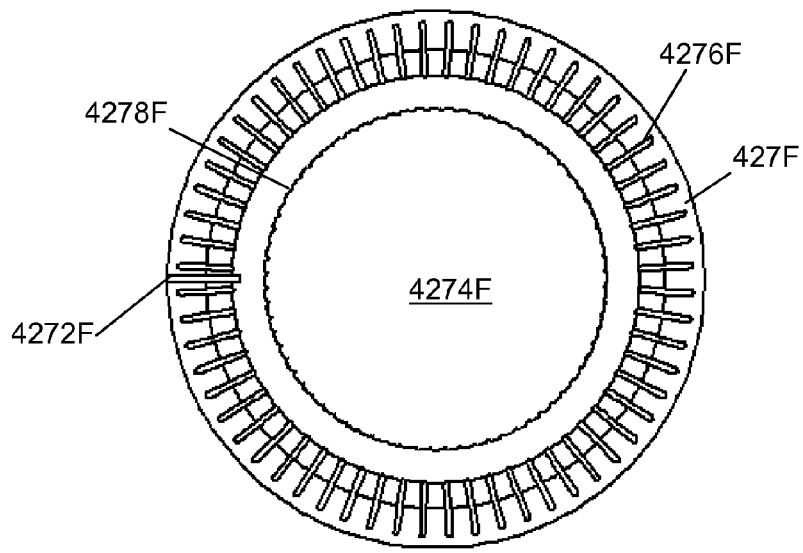
FIG. 23D illustrates a top view of an outer screen of the intake module.

The outer screen 427F illustrated in FIG. 23D includes an axially centered opening 4274F that provides an area through which the base of the disk-pack module 200F can be attached to the inner screen 426F. FIG. 23D also illustrates an example of how the outer screen 427F in at least one embodiment engages the inner screen 426F, around the periphery of the opening 4274F there are a plurality of serrations 4278F that engage reciprocal structures on the inner screen 426F to allow for incremental rotation of the outer screen 427F relative to the inner screen 426F. Based on this disclosure, it should be understood that a variety of other approaches may be used in place of the serrations 4278F.

FIGS. 21 and 23B, for example, illustrate an example of a power supply hole 4202F for the power supply and/or control wire(s) (not illustrated) to pass through the housing of the motor/intake module 400F. Although illustrated in connection with this example, the power supply hole 4202F may be incorporated into other embodiments, for example, FIGS. 1A and 29.

Figure 24A:
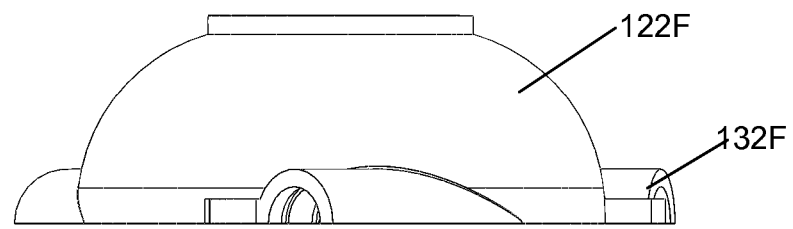
FIGS. 24A-24B illustrate side views of a vortex module of the embodiment illustrated in FIG. 21.
Figure 24B:
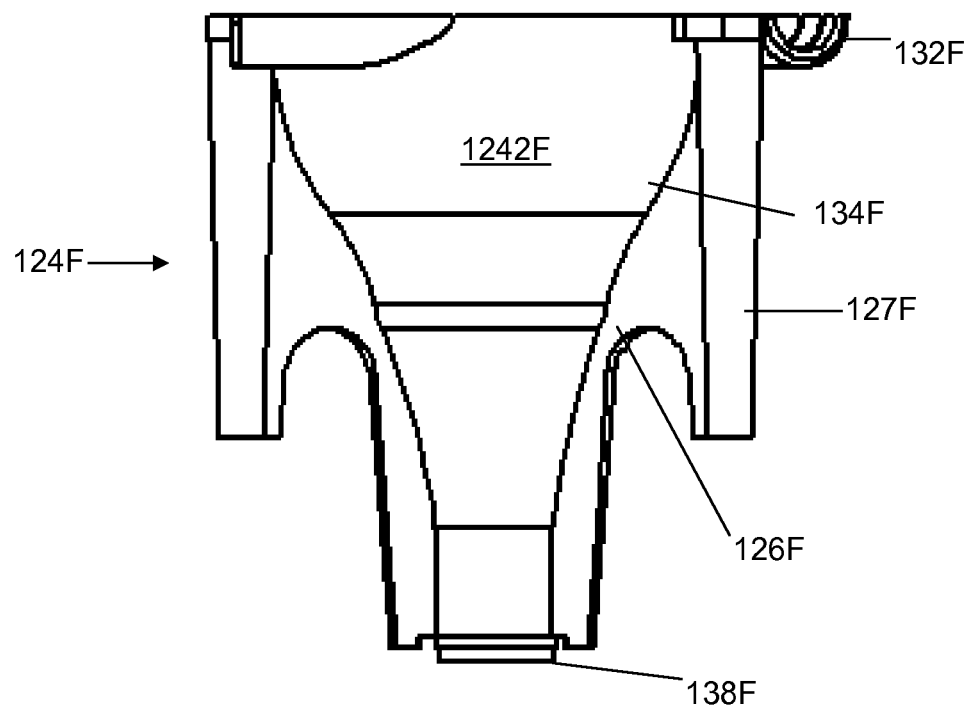

FIGS. 24A and 24B illustrate a vortex module 100F with a cap 122F and a main body 124F. The main body 124F has a top opening having a diameter of approximately 4.6 inches before narrowing down to an outlet 138F having a diameter of approximately 0.8 inches over a distance of approximately 6.2 inches. The upper section 134F over at least a portion has a radius of approximately 0.34 inches. The main body 124F includes corresponding attachment holes 1244F to allow the cap 122F to be secured to the main body 124F as illustrated, for example, in FIG. 22. Based on this disclosure, it should be appreciated that there are a variety of ways to attach the cap 122F and the main body 124F together.

The embodiment illustrated in FIGS. 21 and 24B include structure support members 126F similar to that of the second example embodiment that each include a support column 172F extending down from the top of the main body 124F to abut against a support column 123F extending up from a support plate 125F. The support plate 125F includes an axially centered opening having a diameter of approximately 1.3 inches through which the main body 124F passes. The main body 124F includes an outlet of the vortex chamber extending below the housing to engage the disk-pack turbine 250F in the disk-pack module 200F.

FIGS. 25A-25C illustrate a disk-pack module 200F that receives the fluid from the vortex chamber. The disk-pack module 200F includes two housing pieces 2202F, 2204F that are identical to each other thus expediting assembly of the device. Each housing piece also includes an axially centered opening having a diameter to allow for the vortex chamber to pass through or the motor shaft depending upon orientation of the housing piece in the assembled device. In the illustrated embodiment in FIG. 22, the housing pieces 2202F, 2204F include attachment holes 2206F for receiving a bolt or the like (not shown). Based on this disclosure, it should be appreciated that there are a variety of ways to attach the two housing pieces 2202F, 2204F together. FIG. 25C illustrates a cross-section view of one of the housing pieces 2202F, 2204F and the discharge chamber 230F into which the disk-pack turbine 250F resides.

FIGS. 26A-26C illustrate an example of a disk-pack turbine 250F that can be used in described embodiment. The disk-pack turbine 250F has a height of approximately 4.3 inches with a diameter of approximately 5.5 inches and an expansion chamber 252F with a diameter of approximately 1.1 inches to fit within the discharge chamber 230F along with a bearing member. The top plate 264F includes a cylindrical intake and openings for connecting to wing shims 270F spaced from the axial center of the plate. The bottom plate 268F has a similar structure to the top plate 264F, but instead of an opening passing through its axial center there is a motor mount and a concave feature 2522F axially centered on the plate to form the bottom of the expansion chamber 252F. The illustrated disk-pack turbine 250F includes 16 disks 260F having a height of approximately 0.05 inches spaced apart approximately 0.05 inches with approximately 1.7 inches between the top plate 264F and the bottom plate 268F.

FIG. 26C also illustrates an alternative embodiment for the wing shim 270F that includes spacers similar to those discussed in connection to FIGS. 33A-35. One difference is that the opening in the spacer and the opening in the disk are sized to fit around a standoff member 273F. The standoff member 273F in at least one embodiment is attached to the top plate 264F and the bottom plate 268F with bolts 276F.

g. Sixth Example Embodiment

FIGS. 27A and 27B illustrate a further example embodiment according to the invention. This illustrated embodiment combines the intake module and the vortex module 1000 together such that the vortex module 1000 draws the water (or other fluid) directly into the vortex chamber 130G. This embodiment also places the motor module 300G at the bottom of the device to drive the disk-pack 250G.

The vortex module 100G includes a vortex chamber 130G that runs from the top of the vortex module housing 120G where a plurality of openings 132G is present. One way for the vortex chamber 130G to attach to the housing 120G is through a screw connection such that the inside of the housing 120G includes a plurality of grooves to receive the protrusions 131G around the top of the vortex chamber 130G. Although the openings 132G are illustrated as having a spiral configuration, other opening arrangements are possible while still providing for flow of water (or other fluid) into the device. As illustrated in FIG. 27B, the vortex chamber 130G includes a collection area that is substantially of the same diameter as the area covered by the intake openings 132G. As water flows through the vortex chamber 130G, the rotation is assisted by the closing in of the chamber walls 137G to form a floor area before beginning a steep descent into the inlet for the disk-pack turbine 250G.

The illustrated disk-pack module 200G includes a housing formed with a top part 2202G and a bottom part 2204G that provides the space for the discharge chamber 230G around the disk-pack turbine 250G in addition to providing the channels 2322G that form the discharge ports 232G. As illustrated in FIGS. 27A and 27B the top part 2202G and the bottom part 2204G of the housing have complementary groove and protrusion patterns to allow for the parts to mate together to form the housing 220G for the disk-pack module 200G. The lower plate of the intake module is attached to the vortex module housing 120G with a plurality of bolts that sandwich the disk-pack housing parts 2202G, 2204G together to mechanically seal them together.

FIG. 27B provides a view of an example of a cross-section view that may be used for the discharge chamber 230G that provides a substantially flat surface before expanding the height of the discharge chamber 230G by having the floor and ceiling of the chamber curve away from each other such that the maximum height of the chamber is at a distance from the center substantially equal to the radius of the disk-pack turbine 250G. Beyond the point of maximum height in the discharge chamber 230G, the floor and the ceiling curve towards each other to form the side wall through which the discharge outlets exit from the discharge chamber 230G.

FIG. 27B also provides an example of the connection between the vortex chamber 130G and the expansion chamber 252G where the bottom end 138G of the vortex chamber 130G extends into the expansion chamber 252G.

In this illustrated embodiment, the motor module 300G is located below the disk-pack module. The motor 310G (not shown in cross-section in FIG. 27B) drives a driveshaft 314G that engages the disk-pack turbine 250G.

In a further alternative embodiment, a vortex impeller is located above the vortex chamber to drive the rotation of the water into the vortex chamber from the intake source, which could be from, for example, an intake module of one of the previous embodiments or directly fed into the vortex module from outside the system as discussed in the fifth example embodiment.

h. Seventh Example Embodiment

FIGS. 28A and 28B illustrate a further example embodiment according to the invention. FIG. 28B illustrates a top view without the top of the vortex module 100H being present. The illustrated embodiment includes internal conduit (or passageways) 490H running up through the walls of the disk-pack module 200H and the vortex module 100H. The internal conduit 490H runs from the intake module 400H, which is fed through inlets 432H that include openings passing through the intake chamber bottom 420H, to a point near the top of the vortex chamber 130H. Each junction between the conduit 490H and the vortex chamber 130H is a vortex inlet. Although four conduits are illustrated in FIG. 23, a variety of number of conduits could be used. The flow of fluid from the vortex chamber 130H through the disk-pack turbine 250H out through the disk chambers 262 into the accumulation chamber 230H and then out the discharge ports 232H is similar to the embodiments discussed above.

i. Eighth Example Embodiment

FIGS. 29 and 30 illustrate two examples of sweetening ports that could be added to the above-described embodiments.

Illustrated in FIG. 29 is an alternative embodiment with at least one additional sweetening/supplemental inlet (or feed inlet) 1322I is added to each of the vortex inlets 132I to the vortex module 100I. The sweetening inlet 1322I in at least one alternate embodiment is similar in structure to the other inlets and, in at least one further embodiment, all the inlets are evenly spaced to allow for continual introduction of sweetening material into the fluid during operation of the system. FIG. 29 also illustrates an alternative embodiment that includes a window 1224I present in the cap 122I. Based on this disclosure, it should be appreciated that other embodiments in this disclosure could also include a window in the top of the vortex chamber. The lower portion of the vortex module 100I is substantially similar to that discussed in the fifth example embodiment above.

FIG. 30 illustrates another inlet arrangement that includes at least one sweetening inlet 123J located on the top of the vortex housing 120J with at least one embodiment having the inlet at a shallow angle to the horizontal and entering on a line that is substantially parallel to a tangential line. In a further embodiment, the sweetening inlet 123J includes a lever handle 1232J (representative of a valve) to control the opening/closing of the sweetening inlet 123J. In an alternative embodiment, a handle similar to the lever handle 1232J is added to the sweetening inlets 1322I from the previous embodiment.

The sweetening inlets will allow for introduction of sweetening material that could be any desirable agent for the fluid being processed to have other material that would be added coagulate and/or blend with the fluid. In a further embodiment, the sweetening inlet includes a small valve and a tube (or port), which would allow for introduction of atmospheric air into the vortex chamber 130.

j. Ninth Example Embodiment

The ninth embodiment includes a version of the system that omits the vortex chamber and/or other input modules leaving the disk-pack module with a motor module. In a further embodiment, the housing around the disk pack is removed and the disk pack discharges the water directly from the periphery of the disk-pack directly into the container that it is running in. These embodiments may be combined together in a further embodiment. One impact of running the system in an open configuration is that the vortex created leads to the creation of extremely powerful whirlpools that are believed will be beneficial for mixing of the water present in the vessel containing the water being treated. Experimental systems have been capable of establishing a very concentrated "eye of the whirlpool" which will draw in surface air at disk-pack submerged depths of more than two feet.

k. Tenth Example Embodiment

The illustrated and above-described embodiments may take a variety of dimensions depending upon the desired application. Likewise, the above described embodiments may be scaled up to work in large bodies of water such as large reservoirs or lakes. One way to scale the size is to increase the dimensions of the system to increase the throughput in the system along with increasing the power of the motor. Additionally, the number of disks in the disk-packs in most embodiments will range between 2 to 14 disks, but the number of disks may be greater than 14. The size in terms of thickness and diameter (both of the opening and the disk itself) can vary depending on the application and the desired throughput. There has been one device built according to an embodiment of the invention that was able to manage a multi-acre lake in part because the process is communicative as treated water propagates and comes into contact with untreated water. In an alternative embodiment, multiple smaller units are used in place of a larger unit.

l. Controller

The above-described motor modules 300/400 may be provided with a variety of operation, control, and process monitoring features. Examples include a switch (binary and variable), computer controlled, or built-in controller resident in the motor module 300. Examples of a built-in controller include an application specific integrated circuit, an analog circuit, a processor or a combination of these. FIGS. 19 and 20 illustrate an example of a controller 500, alternatively the controller provides the power to the motor. The controller in at least one embodiment provides control of the motor via a signal or direct control of the power provided to the motor. The controller in at least one embodiment is programmed to control the RPM of the motor over a predetermined time based on time of day/week/month/year or length of time since process start, and in other embodiments the controller responds to the one or more characteristics to determine the speed at which the motor is operated.

In at least one embodiment, the controller monitors at least one of the voltage, amperage, and RPM of the motor to determine the appropriate level of power to provide the motor for operation. Other examples of input parameters include chemical oxygen demand (CDO), biological oxygen demand (BDO), pH, ORP, dissolved oxygen (DO), bound oxygen and other concentrations of elements and/or lack there of and have the controller respond accordingly by automatically adjusting operational speeds and run times. In embodiments that utilize electrolytic and magnetic effects, the controller will also control the operation of the system with respect to these effects. In embodiments that include the sweetening inlets, the flow (or release) rate of the material being added can be controlled, for example, based on concentration of the material or other substances in the fluid, fluid properties, etc.

m. Wing Shims

FIGS. 31A-37C illustrate different examples of placement of the wing shims and configurations of the wing shims themselves. As have been illustrated in the Figures connected to the various above-described embodiments, the number and location of wing shims can also vary between devices built according to the invention.

As illustrated, for example, in FIGS. 31A-37C, the wing shims can take a variety of forms and locations as will be developed more fully below. In at least one embodiment, the wing shims enhance the flow dynamics of the fluid being processed by minimizing undesirable turbulence, detrimental internal flow characteristics and avoiding (or, at least, minimizing) cavitations of the fluid as it passes around the wing shims.

FIGS. 31A-31D illustrate a wing shim 270K that includes a plurality of spacers 272K and a wing 274K. Each wing 274K includes a leading edge 2742K and a trailing edge 2744K with a middle section 2746K between the two edges as illustrated in FIG. 31C, which illustrates the left side as the leading edge and the right side as the trailing edge. The two edges 2742K, 2744K extend from the middle section 2746K and taper down to an edge for their free ends. The middle section 2746K includes a pair of protrusions 2747K, 2748K and a groove 2479K running the length of the wing 274K. Each disk 260K in the disk-pack turbine includes a cut-out 2602K along its edge to match the protrusions 2747K, 2748K and groove 2749K of the wing shim 270K as illustrated in FIG. 31D. The wing 274K is slid into and through the cutouts 2602K with the spacers 272K slid into position on the wing 274K such that at least one spacer 272K (see, e.g., FIG. 31B) is present between adjacent disks 260K to hold the wing 274K in place relative to the disks 260K and to maintain disk separation (i.e., form disk chambers). The spacers 272K include a cutout 2722K that matches the structure of the wing 274K for mechanical/geometric orientation and engagement (including frictional engagement) between the pieces without the use of bolts or other components as illustrated in FIGS. 31B and 31C. The pieces are physically connected, for example, interlock, coupled, or mounted to each other in addition to the disks 260K thus avoiding the need for adhesives that may lose effectiveness over time during use. In an alternative embodiment, a spacer is placed on the outside of the top and bottom disks.

FIGS. 32A-32C illustrate a different wing shim 270L that includes a plurality of spacers 272L and a wing 274L. The wing 274L includes an engagement section 2746L and a wing section 2742L as illustrated in FIG. 32A. As illustrated, the engagement section 2746L is substantially a cylindrical portion with the wing section 2742L extending away from it and having a triangular horizontal cross-section. The wing 274L includes a pair of channels 2749L running its length on either side of the wing 274L where the engagement and wing sections 2746L, 2742L meet that provide a place for the ends 2722L of the spacers 272L to slide and attach to the wing 274L as illustrated in FIG. 32B. The spacers 272L each have a tapered section 2724L with two engagement arms 2722L extending from it with a circular area 2726L formed between the arms 2722L for engaging the engagement section 2746L of the wing 274L. The illustrated disks 260L include an opening 2602L passing through each of the disks 260L that is spaced from the periphery for passing the wing 274L through to secure the disks 260L in relative position to each other with at least one spacer 272L being located between adjacent disks 260L as illustrated in FIG. 32C. The wing 274L with a spacer 272L forms a surface area to cut through the water present between the disks 260L.

FIGS. 33A-33C illustrate a wing shim 270M having a plurality of spacers 272M and a threaded bolt 276M connecting them. Each spacer 272M, when viewed from its top, has a cross-section akin to a wing with an opening 2726M passing through its tallest portion as illustrated in FIG. 33A. The illustrated wing shim 270M is designed to be rotated in a counterclockwise direction with the disk-pack turbine 250M, thus providing a leading edge that is short and more abrupt compared to the trailing edge for moving through the fluid in the disk chambers. As illustrated in FIG. 33A, at least one spacer 272M is placed between adjacent disks 260M in the disk-pack 250M to control the height of the disk chambers. The threaded bolt 276M is placed through the stack of disks 260M and spacers 272M to connect them together and hold them in place as illustrated in FIG. 33B. Unlike the previous wing shim embodiments, the top and bottom rotors as illustrated in FIG. 33C include a plurality of openings passing through the rotor for engaging the plurality of threaded bolts to maintain the relative placement of the discs to each other and to insure that the disk-pack turbine moves as one when rotated. The openings in the disk-pack turbine, when aligned, form a channel through which the bolts pass. In an alternative version, the bottom rotor includes a plurality of recesses in place of openings such that the bottom surface of the bottom rotor is smooth.

FIG. 34 illustrates another wing shim 270N having a plurality of spacers 272N and a threaded bolt 276K connecting them. The difference with the previous wing shim is the addition of a locking pins 278N, which in at least one embodiment is shorter than the threaded bolt 276m, and the addition of a second opening 2728N passing through each of the spacers. The locking pins 278N in at least one embodiment provide proper orientation and alignment for the spacers 272N of the wing shim. In at least one embodiment, the rods 278N fit into recesses present in the top and bottom plates and are secured between these plates. In at least one embodiment, the spacer has a length between 0.5 and 0.75 inches, a width at its widest point between 0.1 and 0.25 inches, a large opening diameter of between 0.075 and 0.125 inches, and a small opening diameter of between 0.05 and 0.08 inches. In at least one embodiment, the locking pin 278N is selected from a group including piano wire, a metal member, or a non-conductive material.

FIG. 35 illustrates an example of wing shims 270N similar to the previous example with the addition of more wing shims 270N being present and having them spaced at two different radial distances from the center of the disk-pack turbine with one set near the periphery of the disks 260P and the second set spaced further in from the periphery of the disks 260P. This example is offered to show that the number of wing shims 270N used can be varied along with the placement of them.

FIG. 36 Illustrates the wing shim 270Q being integrally formed with the disk-pack turbine 250Q as one piece that is manufactured by a rapid prototyping method utilizing a polycarbonate and acrylonitrile butadiene styrene (ABS) plastic blend. Another approach for manufacturing this one piece design is to use injection molding around a water soluble core.

FIG. 37 illustrates a wing shim 270R that includes spacers 272R similar to those illustrated in connection to FIGS. 33A-35. One difference is that opening 2726R in spacer 272R and opening 2602R in disk 260R are sized to fit around a standoff member 273R. The standoff member in at least one embodiment is attached to the top plate 264R and the bottom plate 268R with bolts 276R although other connection means may be used in place of the bolts 276R. One advantage to the standoff member 272R In at least one embodiment, the threaded bolt, standoff member, and the like and the locking pins are examples of connection members.

The various wing shims are illustrated for use in counter-clockwise systems. Most of these wing shim embodiments can also be easily used in clockwise systems by reorientating the pieces to reverse their respective orientation, for example by rotating or turning them around.

Examples of material that can be used to construct the wing shims include brass, stainless steel, plastic such as polycarbonate and acrylonitrile butadiene styrene, etc., or any combination of these. Based on this disclosure, it should be understood that a variety of materials or stacked and perhaps bonded combinations of varying materials could be used to make the wing shims.

n. Disk-Pack Turbine

FIGS. 37A-37C illustrate another example of a disk-pack turbine. FIG. 37A illustrates a 13 disk configuration with stainless steel disks 260R. Illustrated in FIG. 37B is the upper rotor 264R including a bearing element such as a stainless steel race and nylon or Vesconite bushing lining the inside of the opening to decrease the level of friction between the disk-pack 250R and the outlet of the vortex chamber that would extend into the upper rotor opening. FIGS. 37B and 37C also illustrate that this particular embodiment includes ten wing shims 270R. Illustrated in FIG. 37C is the lower rotor 268R including a recess 269R for engaging the driveshaft. The illustrated upper and lower rotors 266R, 268R include a plastic substantially flat disk integrally formed with a metal hub that engages another component in the system.

Based on this disclosure, it should be appreciated that there is a tremendous amount of flexibility in the invention. In at least one embodiment, the disk-pack module can be disassembled to allow for exchange of the disk-pack turbine being used in the device. In addition, the disk-pack turbine used in any one embodiment can also be made according to a variety of specifications with the following offered for that purpose.

The density and number of disks present within any disk-pack turbine can vary depending upon intended application of the device. As discussed previously, the disk separation gap between disks will impact the properties of the water being treated.

The expansion chamber may take a variety of shapes based on the size and shape of the opening through the disks that make up a particular disk-pack turbine. In at least one embodiment, the center holes through the disk are not consistent size in the disks that make-up a disk-pack turbine. For example, the center holes are different diameters and/or different shapes. In a further embodiment, the disks include a waveform or geometric pattern along at least one side of the disk.

In at least one embodiment, one or more disks include an impeller with a plurality of blades in the center opening passing through the disk, the blades are orientated to provide additional suction forces to draw fluid through the passageway between the vortex chamber and the expansion chamber. In at least one implementation, the impeller is integrally formed with the disk, while in another implementation the impeller is an insert piece that engages the central opening in the disk, for example, with friction, press fit, and snap-in.

The materials used to manufacture the disks can range from a variety of metals to plastics including using different materials for the disks within one disk-pack turbine with examples as follows. A disk-pack turbine assembled with polycarbonate housings, brass wing-shims and stainless steel disks renders product water with, among other attributes, oxidation/rust inhibiting characteristics. A disk-pack turbine assembled with polycarbonate housings, brass wing-shims and alternating brass and stainless steel disks renders product water which, among other attributes, acts as an aggressive oxidizer that decimates mosquito larvae and other undesirable microbiological organisms. A disk-pack turbine constructed with disks and wing shims establishing bi-metal relationships such as stainless steel and brass with disk gap tolerances of less than 1.7 mm has been found to generate significant levels of hydroelectrolytic processes, which tend to dissolve solids into hydrocolloidal and/or hydroelectrolytic colloidal suspensions. A disk-pack turbine made of all-plastic materials with a disk gap tolerance of 1.7 mm rapidly precipitates suspended solids, chills and densifies water and also produces high levels of dissolved oxygen. The concept of densifying water includes reducing the volume occupied by water after it has been processed by the system. Disk-pack turbines constructed with disk gap tolerances above 2.5 mm tend to precipitate virtually all solids out of suspension, including dissolved solids over time, resulting in very low dissolved solids instrument readings, i.e., 32 ppm.

Water processed using systems built according to this invention have been found to be either rust/oxidation inhibiting or aggressive/oxidizing in nature, depending on applied material's relationships within the system and system configuration. For example, a system configured with a stainless steel disk-pack turbine assembled with a gap/tolerance between the disks of 1.3 mm and a mixture of brass and stainless steel wing shims, in water with a baseline pH of 7.7 and an ORP (Oxidation-Reduction Potential) of 185, is capable of instantaneously shifting pH levels into the 2 and 3 range which is not due to actual acidity, but extremely high levels of dissociative effervescent effects and extremely high levels of Hydrogen ion activity. Within two minutes of turning off the system, the Hydrogen dissipates and pH values will return to the mid-7s, low 8s. For example, the ORP, at the time pH measurements are low, fluctuates substantially between readings of −700 to −800 (negative) to +200 to +1600 (positive). In another example, the same system using a disk-pack turbine with a 2.3 mm gap/tolerance between the disks and using the same source water, will produce more typical water with varying, over time, pH measurements in the 7 to 8.5 range and ORP readings fluctuate between negative and positive values, depending on time and speed of operation. These two examples above are of water produced in electrically isolated disk-pack turbines as well as vessels, with no reference to earth ground.

Use of bi-metal disk-pack turbines with alternating brass and stainless steel disks on a volume of water infested with mosquito larvae results in the immediate eradication of larvae and has remained larvae-free for long periods of time.

Selectively and electrically isolating and grounding system components can significantly influence a process. For example, when the components are isolated, electrical values, ORP, etc., swing wildly to extremes and electrolytic processes are much more profound. It is under these conditions that brass is plated out on stainless parts. This also appears to be more effective in reducing solids into a colloidal state. Also using a grounded system is much better if the objective is to precipitate solids as opposed to reducing them.

In at least one embodiment, adhesive backed flexible magnetic material is applied to at least one of the following locations: on the top side of the upper rotor plate, the bottom side of the lower rotor plate, the inner concave cap feature of the vortex chamber. Water that is processed through a system with this modification, when viewed under a microscope, exhibits an amorphous structure that looks not unlike a topographical map similar to what Victor Schauberger previously described as "perfect water".

In at least one embodiment, a static and/or dynamic electromagnetic field is applied to the water as it passes through the system. In a further alternative embodiment, electrical charges are selectively induced into water being processed by selectively using/charging one or more disks as anodes and/or cathodes.

o. Other Variants

The invention lends itself to a great degree of variability relative to scale and functional characteristics and will be produced for general use to highly specialized versions that build upon the previously described embodiments.

As has been mentioned, the number of discharge ports and their orientation can be adjusted to further refine or impact the generation of motion in the surrounding water based on the discharge of water from the device. The geometry of the cross-section of the discharge port may take a variety of forms from the illustrated circular cross-section with a long radii path from the discharge chamber to the outlet compared to the toroid cross-section shape with spiral path between the discharge chamber to the outlet.

For applications such as industrial process water, it is beneficial to have outlet geometries that cause a circulation in tanks, sumps, cisterns, etc. This results in precipitated solids accumulating in low flow zones. It has been found that adding long radius elbows to the straight discharge ports is very effective in accomplishing the precipitation of solids. Examples of material for the long radius elbows include PVC and brass. In an embodiment with the long radius elbows, it is important that the geometries must not restrict or compress the discharging water. The disk separation also will impact whether solids precipitate or dissolve into the water.

Although the above discussion referred to particular numbers for the discharge port and the vortex chamber inlet, these elements may be present in other numbers. For example, the discharge port could be one up to any number that would allow for them to be adequately spaced around the disk-pack module (i.e., dependent in part on the size of the main housing). The number of vortex chamber inlets could also be different; once again dependent in part on the size of the vortex chamber.

p. Operation

To further describe the invention, an example of the operation of at least one embodiment according to the invention will be described.

At least one of the above-described embodiments is a self-contained system that emulates nature's ability to renew and restore vitality to stressed water ecosystems, as demonstrated by a meandering mountain stream which, through constantly varying flow conditions relative to the entire flowing volume of water and energizes the water. The vortex chamber (Stage One) generates a continuous, highly energetic, concentrating, through-flowing vortex which accelerates flows and causes water to decrease in temperature and converts heat to kinetic energy as the charging water progresses into the rotating expansion and distribution chamber, which velocity of the water is already matched to speed of rotation in at least one embodiment (Stage Two). There it undergoes rapid rotational acceleration resulting in simultaneous mixed, reciprocating dynamic negative and positive pressures within the expanding, twisting, spinning, rotating water which causes a high degree of elemental/molecular destabilization.

The elementally-destabilized water further progresses and is divided/distributed between multiple separated chambers that exist between the rotating substantially flat disks within the disk-pack turbine (Stage Three). Water is drawn into the rotating disk chambers via centrifugal suction generated by the rotating disks and wing-shims. Once within the disk chambers, the water undergoes a transition into helical, accelerating, variable (due to elemental instability and internal dynamically-generated flow and pressure differentials) flows with multiple characteristics including continuous shifting and changing of high and low pressure/velocity flow zones, propagation and implosion of innumerable internal micro-vortices, motion-induced electrical charges, and dissociative tendencies resulting from the exotic motion, electrolytic processes and combinations of influences articulated above.

Water discharges from the disk-pack turbine into the ample, over-size, geometrically specialized torus/hyperbolic/paraboloid shaped discharge chamber within the disk-pack module housing (Stage Four) where water imbued with device-generated exotic motion, energies, varied fluid pressure/suction and velocities accumulates and is discharged via submerged dual discharge ports (Stage Five) directly into the main body of water being processed.

The highly energetic product water lags and surges as it discharges at relatively low velocities and pressures through the discharge ports. The discharging water transmits its varied, accumulated characteristics into the body of water being processed, generating continuous propagation and spinning-off of vortices/whirlpools at discharge which travel through the water, constantly forming and re-forming until their creational energy diminishes. Simultaneously, visible eddies, currents and counter-currents occur in proximity as a direct result of the extremely mixed flow and energetic characteristics at the point of systemic discharge as illustrated by the differences between FIG. 1A and FIG. 1B. The nature of the internal flow dynamics tends to create variations in temperature in the out-flowing water.

During testing of prototypes built according to the invention, it has been observed that, in some embodiments, the water discharges from one port while the opposing port pulsates, gently drawing in and rhythmically discharging water. The discharge port and pulsating port reverse their function intermittently and, at times, both ports do charge simultaneously.

q. Typical Water Processing Scenario

With units designed with submersible motors, a vessel is filled with sufficient water to submerge at least a portion of the unit to cover at least the discharge ports. When testing the device, initial water values are recorded, such as pH, Oxidation Reduction Potential (ORP), Dissolved Oxygen, Dissolved Solids, temperature and Standing Voltage measured relative to ground (when possible). The unit is turned on and run at an operational speed in a typical range of 750-2200 RPM, depending on water characteristics. When water is visibly and substantially contaminated, it has been found that higher initial operating speeds for the first couple of hours tend to accelerate results. After this initial period, it has been found that beneficial process speeds generally fall in a range of 750-1200 RPM. Variations in speed of operation over time have also demonstrated benefits to the process. A run time of two to five hours is normally sufficient to impart transformative characteristics to water processed within a contained volume; however, tests have also been performed over extended periods of time. There is a recorded instance of having successfully transformed 800 gallons of water in two and a half hours, which water remained vital, crystalline, algae-free and alive (residual motion present) for three-plus months until it was drained from the vessel containing the water.

Values are recorded at intervals throughout the testing process. Typically, values will enter a flux state, often rising and retreating throughout the process. An example of value change could be: starting values of pH 6.5, ORP 265, Dissolved Solids 228, and Voltage −0.256 with resulting post process values of pH 8.3, ORP 133, Dissolved Solids 280, and Voltage −0.713.

From finish of the process, for as long as processed water has been stored to date, the water typically has remained in a state of flux, with values rising and falling on successive readings, particularly pH and ORP: typically when the pH rises, ORP falls; when the ORP rises, pH falls. Recent tests indicate that the dissolved Oxygen (DO) values remain elevated as compared to initial readings. There have, however, been some exceptions to this. Most notable is, when storing aggressive/corrosive processed water in close proximity to anti-oxidizing processed water, both volumes become predominantly corrosive. Processed water, as a transmitting medium in these conditions, falls or tends toward corrosive.

It has been found that post-process water matures. An example of this is, after three days, water that had an initial pH of 6.8 and an end-of-process pH of 7.6 could, three days later, display a pH value of 8.4. A subsequent reading could be 8.0, followed by 8.7, hours or days later. Typically, the pH values will vary over time (in some cases the variance has followed a sine wave) providing support for characterizing the water as being alive.

The process, when initiated, particularly in water that has not been processed previously, typically causes the emission of gases which manifest in the form of effervescence. Initially, bubbling can be extremely vigorous, with the bubbles ranging in size from quite large (sometimes up to a half inch in diameter) to millions of micro-bubbles. After a period of time, the larger bubbles begin to subside and the micro-bubbles tend to diminish in size as they increase in volume. It is not uncommon for visible out-gassing to subside to a point of being virtually undetectable. This initial out-gassing usually corresponds to an immediate rise or fall in pH, depending on the initial pH and/or disk gap tolerances and/or material used in the disk-pack. Some water that is neutral to basic can drop into a low acidic range, as determined by use of a pH meter, once the process is initiated, which is the result of high levels of dissociative effervescence and Hydrogen ion activity. Within two minutes of cessation of the process, pH values will rise above the neutral range. On occasion, gases have been collected from the effervescence and exposed to flame, often resulting in ignition/flashing, clearly demonstrating an elemental dissociative effect.

When processed water is reprocessed, the water may show little or no effervescence. If the processed water is then run through a centrifugal pump, the structure is apparently broken down and the water will again effervesce. If the water is allowed to settle for hours/days, it will reorganize/restructure and exhibit minimal effervescence upon reprocessing.

In a further embodiment according to the invention, the above described systems are used in the production of aragonite from calcite present in water. FIGS. 38A and 38B illustrate before and after treatment electron microscopic images of water. FIG. 38A illustrates the presence of calcite in the water, while FIG. 38B illustrates how the calcite has been converted into aragonite as represented by the multiple tubular (or pin) shaped objects. Typically, this process required ultra-high temperatures to convert calcite into aragonite, which is believe to be the most beneficial form of calcium for biological assimilation. The method includes filling a water storage vessel with water, placing a unit into the water and running the unit at 1200-1500 RPM for at least 30 minutes before reducing the speed of the motor to below 1000 RPM. While the unit runs, water is brought into the unit and feed through the vortex chamber into the expansion chamber for distribution out through the disk chambers into the discharge chamber for release through one or more discharge ports back into the water storage vessel to further mix with the water present in the water storage vessel. After the unit has run, collecting the formed crystals of aragonite. In at least one embodiment, water enters the system through a second discharge port to supplement and mix with water present in the discharge chamber. In a further embodiment, the water pulsates in and out of the second discharge port.

V. TESTING AND EXPERIMENTS

Prototypes built according to the invention have been employed in a variety of test and experimental situations, both directly and indirectly, to determine in part whether the invention would work for its intended purpose. To date, processing test environments (i.e., vessels) include jars, bowls, buckets, tanks, swimming pools and fountains, stream-fed vernal ponds, domestic water wells, irrigation ditches, irrigation reservoirs, evaporative air conditioning systems, industrial process water systems, and fish tanks; plant studies; and animal studies and biological/microbiological studies.

Processed water has been produced by directly utilizing water from sources such as commercial distilled water, city tap water, residential well water, swimming pool and fountain water, water well-supplied irrigation reservoir, irrigation canal water, small lakes and other similar sources. Indirect testing has been accomplished through introducing quantities of product water to unprocessed water for the purpose of observing and monitoring effects and changes in the values of the water being treated over time. Testing of this nature has been done from laboratory scale up to and including a residential water well, a spring-fed creek and a storm water drainage system.

Confirmation that qualities and characteristics are imbued in the water is implied when baseline values, such as pH, ORP, dissolved Oxygen and voltage change. Once in motion, values in processed water tend to remain unstable, even in water processed in previous months, indicating that the water, whether in process or processed, is vital and alive. One repeated result to date indicating that water is active has been obtained through the immersion of rust/oxidized items in processed water. The rust/oxidation soon begins to dissolve and, over time, is completely removed. This phenomenon takes place both in systems with an active unit running, i.e., industrial process water systems, cooling towers and swamp coolers and in process water that has been stored for months. Although processed water dissolves and removes rust, once certain equilibrium is reached, the processes of oxidation resume. In systems that utilize make-up water to maintain water levels, i.e., process water systems, oxidation ceases and does not recur as long as a unit remains actively in place and running.

In further testing, it has been reliably determined that processed water imbued with aggressive oxidizing characteristics and fluctuating values is produced by mixing stainless steel disks within the disk-pack turbine with brass disks and systemic components in variable combinations. The aggressive oxidizing characteristics are further intensified as disk gap tolerance is reduced. At present, all variations of disks and wing shims used in devices built according to an embodiment of the invention have been configured utilizing combinations of plastics, stainless steel, and brass components.

A variety of testing and experimentation has occurred using processed water in different situations. Prototypes built according to the invention have precipitated solids and other particulate matter out of solution, depositing dense material in low-flow/low-turbulence zones in the vessels containing the fluid, leaving water bright, clear, and crystalline.

Testing has resulted in processed water that has exhibited a variety of characteristics depending upon the prototype used to process the water where the prototype has been built according to the invention. The processed water changes values such as pH, ORP, dissolved Oxygen, dissolved solids, voltage, etc., and sends these values into a state of flux. The processed water inhibits and dissolves rust and oxidation or, alternatively, via specific systemic material relationships, promotes oxidation. The processed water produced with at least one embodiment eliminates organics such as mold/fungi, algae, etc. The processed water produced with at least one embodiment limits and/or eliminates waterborne microorganisms.

The processed water produced with at least one embodiment has been shown to not be harmful to pets/animals such as fish, frogs, pets, etc. as these animals have thrived. An example of this is that animals including birds and other wildlife are drawn to ponds (or reservoirs) containing processed water. Pets and other animals invariably will drink the processed water over water that has not been processed. When a prototype has been operating in a pool, small, normally shy fish within a pool leave their usual hiding places to cluster in the unit out-flowing water.

Crystalline structures have been present in virtually all processed water microscopically observed. The processed water becomes ultra-clear, with a luminous crystalline appearance. When observed under a microscope, it is apparent that the crystalline appearance is due to the presence of crystalline structures within the water. When processed water is within an environment where silt and solids are not continually agitated, water settles out into a clear, crystalline state.

In many of the experiments, water has normally been processed for at least three days and left to mature for another two days before use and/or monitoring. Often, it has been found that the most profound fluctuations in values will typically occur after two or more days after processing.

a. Plants

The processed water has helped trees, bushes, flowers, and grass thrive and become exceedingly vital. For example, Hibiscus flowers tripled in size; tomato plants exposed to one application of water produced perfect, flawless, deep red, exceedingly sweet fruit; repeated examples of rapid germination and seed success compared to controls receiving unprocessed water; stunted, stressed and apparently diseased vegetation regains vitality, even with a single application of water.

Successful seed germination rate is approximately 60% higher for plants watered with processed water. Growth rate is generally at least 40% more vigorous. These results have been confirmed through numerous experiments in the United States and Mexico. Recently, tests were performed in a laboratory in China, where results were again confirmed.

An experiment was conducted in the region of Ensenada Baja California, Mexico using four different mixtures for the plants including normal tap water, normal tap water and fertilizer, treated tap water, and treated tap water and fertilizer. Seeds of different varieties were planted in planters made of plywood for this experiment including: zucchini, radish, onion, cabbage, carrot, green peas, and cilantro in addition to tomato and strawberry plants having an approximate size of 3 inches. The planters were approximately 3 meters long, 0.6 meters wide at the base and 0.8 meters wide at the top, and 0.4 meters tall and were elevated above the ground on legs. The plywood was untreated. The planters were filled with soil from a nearby dry riverbed, and also the soil was not treated beyond using approximately 12.5 kg of organic humus to prevent the soil from compacting. The planters were subdivided for the different seed types. The seeds were tomato, zucchini, radish, cabbage, carrot, cilantro, and green beans. There were also two planters: one with two tomato plants that were 6 inches tall, and the second planter had two strawberry plants that were 3 inches tall. The plants were purchased from a store in California. A 450 liter plastic tank was used to process the water using a device built according to the invention. The water used was tap water in that region of Mexico. Each planter received the same amount of water until an adjustment was made part way through the experiment.

On June $4^{th}$, the soil was mixed with humus to prevent the natural soil of the region from becoming tight and compact. Holes were made to plant the seeds. While the seeds germinated, the planters were covered with old newspaper to preserve humidity in the soil. On June $5^{th}$, 16 liters of water were added to each of the planters. On June $6^{th}$, some radish seeds had germinated in the normal water planter, while the treated water planter had radish, carrot, and cilantro germinations. The fertilized and treated water planter had radish germinations. Each of the planters again received 16 liters of water. On June $7^{th}$, the number of radish germinations was as follows: normal water—30, normal water and fertilizer—0, treated water—45, and treated water and fertilizer—82. On June $8^{th}$, it was determined that some of the seedlings in the treated water planters were rotting from excess water, while the normal water planters had soil that was moist but not wet. The germination count was as follows:

| Seed Type | Normal Water | Normal Water + Fertilizer | Treated Water | Treated Water + Fertilizer |
| --- | --- | --- | --- | --- |
| Radish | 68 | 22 | 98 | 138 |
| Tomato | 0 | 0 | 1 | 2 |
| Onion | 0 | 0 | 4 | 2 |
| Cilantro | 0 | 0 | 2 | 0 |
| Cabbage | 0 | 0 | 1 | 0 |
| Carrot | 0 | 0 | 2 | 0 |

The first strawberry flower buds were opened in the two treated water planters and the regular water with fertilizer planter. The comparative size of plants was as follows:

| | Normal Water | Treated Water + Fertilizer |
| --- | --- | --- |
| Radish from seeds | 0.5 inches | 0.75 inches |
| Strawberry plants | 3.75 inches by 10.5 inches | 5.25 inches by 8.5 inches |
| Tomato plants | 9 inches by 13 inches | 10.5 inches by 16 inches |

Based upon the results above, it appears that treated water makes the fertilizer more easily assimilated/available to the plants. On June $10^{th}$, the treated water plants were more numerous and healthier than the normal water plants even though the amount of water provided to the treated water plants was reduced starting on June $8^{th}$.

On June $15^{th}$, five strawberries were picked from the treated water and fertilizer planter, four strawberries were picked from the treated water planter, and two strawberries were picked from the normal water planter. The radish plants began to flower. On June 26th, approximately 50 g of 16-16-16 fertilizer was added to each of the planters.

On July 2nd, a crack developed in the cistern that forced water schedules to be suspended until repairs were completed on July 12th. On July 13th, the cistern was refilled with 6 cubic meters of water, and the 450 liter tank was filled and the water was processed. On July 15th, measurements were taken and a general inspection of the plants was performed. The two normal water planters were noticeably dry along with the soil in them, while the treated water planters still had soil moisture. The size of the tomatoes in the treated water and fertilizer planter were noticeably bigger than the other planters. The following measurements were taken:

| Seed Type | Normal Water | Normal Water + Fertilizer | Treated Water | Treated Water + Fertilizer |
|---|---|---|---|---|
| Radish | 8" | 8" | 10" | 12" |
| Tomato | 3" | 3" | 4.5" | 6" |
| Onion | 3" | 2.5" | 1.5" | 4.5" |
| Cilantro | 1" | 1" | 0 | 4" |
| Cabbage | 6" | 0 | 0 | 7" |
| Carrot | 4" | 0 | 0 | 4.5" |
| Strawberry | 3" × 9" | 4.5" × 11" | 5.5" × 12" | 5.5" × 13" |
| Green beans | 5" | 5" | 6" | 10" |
| Green peas | 12" | 3.5" | 0 | 7" |
| Zucchini | 7" × 11" | 8" × 10" | 13" × 16" | 12" × 14" |
| Tomato | 17" | 19" | 20" | 26" |

The following number of produce was picked from the planters:

| Plant Type | Normal Water | Normal Water + Fertilizer | Treated Water | Treated Water + Fertilizer |
|---|---|---|---|---|
| Strawberry | 1 | 2 | 7 | 8 |
| Radishes | 0 | 0 | 2 | 1 |

On July 20th, 10 kg of soil was added to each planter due to the plants showing stress from lack of nutrients. On July 23rd, a ripe tomato was picked from the treated water with fertilizer planter that had a diameter of 2.5 inches. Between July 24th and August 3rd, water was suspended to verify the amount of moisture in the planters. Measurements were taken with a household garden grade humidity meter. The normal water planters had dry soil with no indication of moisture being present in the soil, while the treated water planters had soil moisture that although low was still within acceptable levels despite receiving half of the water the normal water planters did.

On August 4th, 2 zucchinis were picked from the treated water planter and 1 zucchini was picked from the normal water with fertilizer planter. The two treated water zucchinis measured 17 cm long by 6.5 cm diameter with a weight of 150 g and 10 cm long by 3.5 cm diameter with a weight of 80 g compared to the normal water with fertilizer zucchini that measured 9 cm long by 2.5 cm diameter with a weight of 50 g. The treated water planter produced 8 strawberries, the normal water planter produced two strawberries, and the normal water with fertilizer planter produced 6 strawberries. At this point the seeding experiment was terminated.

The following measurements were taken of the treated water on July 23rd with the last column reflecting the readings on August 1st:

| | Initial | 1 Hour | 2 Hours | Final | Aug. 1st |
|---|---|---|---|---|---|
| pH | 7.45 | 8.00 | 8.00 | 8.10 | 8.43 |
| Conductivity | 1.47 | 1.47 | 1.48 | 1.48 | 1.46 |
| Dissolved Solids | 730 | 730 | 730 | 730 | 730 |
| Dissolved Oxygen | 6.6 | 7.2 | 7.5 | 7.5 | 7.5 | b. Pecan Trees and Reservoir

A reservoir with approximate dimensions of 130'×165'×5' deep used to provide water to a large pecan orchard via irrigation, drip line, and sprinkler systems fed by seven large wells with vertical turbine pumps had been experiencing a severe problem of systemic fouling as a result of extremely dense algae growth. Large filter boxes were built around the secondary pump intakes, which pumps were used to supply the water to the trees. The algae were so dense that the reservoir water surface was completely covered with a greenish/brown mat as shown in FIG. 38A. The filter boxes required daily cleaning or the pumps would starve. A unit was put into the reservoir. Within 72 hours, the surface was completely clear of algae and bottom features of the reservoir could be clearly seen as illustrated in FIG. 38B. The algae had died and precipitated to the bottom as illustrated in FIG. 38C. This result was effective even though the seven supply pumps were continuously refilling the reservoir. The process was terminated and after five days the algae began to re-establish in the reservoir.

Chlorotic young pecan trees incapable of up-taking sufficient nutrients/iron recovered and began to turn green within 24 hours after the application of water from the treated reservoir and were cured within days. Over time, the trees began to show signs of being over-watered, even though the volume of water being applied to the trees was equal to the customary volume applied to all trees within the nursery. A 40% reduction in water applied stabilized the condition of the trees. The implication is that vegetation watered with processed water thrives with less water.

c. Fish Experiment

A testing laboratory in China prepared two identical tanks of water, each containing 20 young goldfish. The fish were given the same amount of nutrients, but provided with no supplemental air source. A small volume of processed water was added to one tank. After two weeks, fourteen fish in the untreated, control tank had perished, while only one fish in the tank containing the infused water had died.

d. Oxidation Experiments

Within process water systems, residential to industrial, rust and oxidation has been inhibited or eliminated; mineral concentrations, etc., are precipitated out of solution, limiting and/or eliminating fouling of filters, screens, valves, etc. Odors and organics and their propagation are controlled or eliminated.

The effects of processed water on systems such as evaporative coolers, industrial process water systems, cooling towers; pumping, piping, storage and water transmission systems; swimming pools, spas, and fountains has been to reverse systemic deterioration resulting from rust and oxidation.

After a period ranging from days to months, systems benefiting from the continuous presence of a unit's processed product water will, when inspected, demonstrate the phenomenon of accumulated rust sloughing off when gently brushed to reveal fresh, bright, clean metal underneath. Even heavily rust-pocked drive-shafts, valves, pumps, sheet metal, structural elements, bolts, flanges, pipes, couplings, etc. are left bright and clean, down to the deepest recesses in pocks/pits.

Oxidation is completely arrested and no subsequent oxidation occurs unless a unit is turned off or removed from the process, which over time results in the return of the natural oxidation processes.

All components within mechanical and electromechanical systems that share electric continuity and/or contact with processed water utilized within integrated systems benefit from associative chain reactions and interactions. This results in entire integrated mechanical and electromechanical systems being insulated and protected from rust/oxidation and deterioration; even components not in direct contact with processed water.

e. Cooling Equipment Experiments

There have been two experiments conducted using a device built according to an embodiment of the invention.

The first experiment used water processed for approximately 20 hours with the resulting water having a raised pH and DO levels. The water was placed in a portable evaporative cooling system. The resulting temperature of the discharged air from the evaporative cooling system dropped from the 68.5 Fahrenheit realized through normal use of tap water to 56 degrees Fahrenheit utilizing processed water.

The second experiment used a single system placed in-line to the water intake for 12 industrial sized cooling systems that processed water for a brief time as it passed through the reservoir where the system was installed. Despite the short contact time with the water, the temperature of the air coming from the ducts was also 10-15 degrees Fahrenheit cooler than when untreated water was used in the evaporative air cooling systems and compared to another 6 equal air cooling systems running at the facility which had been left out of the loop as a control.

f. Water Experiments

Indirect application of processed water through inoculation of a domestic water well with a total of 40 gallons of water changed the well from a relatively static pH of 6.5 to a well that fluctuates in a pH range of mid-7s to low-8s. Subsequent injections of water totaling an additional 120 gallons caused the well to remain in a consistent 7.3 to 7.8 pH range over a period about 15 months. This experiment will be discussed in more detail later in the disclosure.

1. The Effects of Introducing Product Water Produced in a 90 Gallon Vessel into Domestic Water Well The procedure began with adding 24 gallons of processed water directly into a 4" well casing of a 240'-deep domestic water well at 3:53 P.M. on Day 1. The processed water originated in the same well and, before processing, had approximately the same values as those stated for the starting well water values.

The starting processed water values were pH 9.4, ORP 199, Dissolved Solids 193, temperature 64.2° F., and a standing Voltage of −0.983 VDC. The starting well water values were pH 6.5, ORP 198, Dissolved Solids 215, temperature 58.6° F. The table below shows subsequent monitored well readings.

| Date  | Time      | pH  | ORP | Dissolved Solids |
|-------|-----------|-----|-----|------------------|
| Day 2 | 4:06 P.M. | 7.8 | 215 | 196 |
|       | 7:43 P.M. | 8.1 | 215 | 191 |
| Day 3 | 9:14 A.M. | 8.2 | 222 | 198 |
| Day 4 | 8:31 A.M. | 8.9 | 194 | 194 |
|       | 8:21 P.M. | 8.1 | 202 | 183 |
| Day 6 | 8:22 A.M. | 8.4 | 220 | 180 |
| Day 7 | 9:28 A.M. | 8.0 | 210 | 214 |

-continued

| Date   | Time       | pH  | ORP | Dissolved Solids |
|--------|------------|-----|-----|------------------|
| Day 8  | 1:06 P.M.  | 9.0 | 215 | 207 |
| Day 9  | 10:47 A.M. | 8.7 | 208 | 179 |
| Day 10 | 9:20 A.M.  | 8.7 | 208 | 191 |
| Day 12 | 8:05 A.M   | 8.2 | 176 | 193 |
| Day 13 | 7:20 A.M.  | 8.4 | 150 | 171 |
| Day 14 | 9:34 A.M.  | 9.7 | 160 | 185 |
| Day 15 | 8:59 A.M.  | 9.2 | 177 | 186 |
| Day 17 | 9:21 A.M.  | 8.8 | 185 | 177 |
| Day 18 | 5:10 P.M.  | 8.8 | 195 | 194 |
| Day 19 | 8:45 A.M.  | 9.1 | 180 | 189 |

As part of this testing, a set-aside sample test was performed by taking a well water sample and testing that same sample from Day 18 through Day 28 with the following results:

| Date                      | Time       | pH   | ORP | Dissolved Solids |
|---------------------------|------------|------|-----|------------------|
| Day 18                    | 5:10 P.M.  | 8.8  | 195 | 194 (sample taken) |
| Day 19                    | 10.23 A.M. | 10.3 | 164 | 204 |
| Checked water:<br>Day 19  | 5:02 P.M.  | 10.4 | 165 | 208 |
| Checked water:<br>Day 24  | 10:09 A.M. | 10.7 | 181 | 211 |
| Checked water:<br>Day 28  | 8:02 P.M.  | 10.7 | 134 | 225 |

On Day 34 the well water values were checked for the first time in 15 days. The pH had dropped to 6.6, ORP 090, Dissolved Solids 198, which were close to original starting values. The assumption was made that the well source water might be reverting to original values. To test this assumption, 16 gallons of processed water were added to the same domestic water well on Day 34 at 8:27 A.M.

The 16 gallons processed water values were pH 7.2, ORP 110, and Dissolved Solids 313 prior to being poured directly into well casing. The starting well water values were pH 6.6, ORP 090, Dissolved Solids 198

| Day 34 | 1:47 P.M.  | 7.5 | 103 | 195 |
| Day 35 | 8:19 A.M.  | 6.4 | 092 | 195 |
|        | 1:15 P.M.  | 6.9 | 099 | 188 |
|        | 8:59 P.M.  | 7.0 | 098 | 196 |
| Day 36 | 1:01 P.M.  | 6.3 | 156 | 242 |
|        | 10:18 P.M. | 7.3 | 164 | 177 |
| Day 38 | 10:58 A.M. | 7.4 | 103 | 189 |
| Day 39 | 2:32 P.M.  | 7.4 | 096 | 188 |
| Day 43 | 3:17 P.M.  | 7.4 | 133 | 173 |
| Day 56 | 8:26 A.M.  | 7.4 | 098 | 191 |
| Day 60 | 9:00 A.M.  | 7.5 | 109 | 177 |
|        | 1:38 P.M.  | 7.1 | 210 | 163 |

The inoculation of the well with the additional 16 gallons of processed water resulted in pH values remaining in a range between 7.1 and 7.5 for a long period of time. As clearly established by the data above, a proportionately small amount of process water has been proven to be capable of altering an immense volume of underground water. Microscopic observations indicate that crystalline structures are present in the water and no living biologicals have been seen since the first 24 gallon introduction of process water.

2. 90 Gallons of Water Processed in Tub

On Day 1, 90 gallons of water was placed into a tub. The water was processed for a total of five hours and then monitored over time for fluctuations. The following measurements were taken post-processing:

| Date | Time | pH | ORP | Dissolved Solids |
|---|---|---|---|---|
| Day 4 | 8:31 A.M. | 8.9 | 194 | 194 |
| Day 6 | 8:27 A.M. | 8.9 | 206 | 197 |
| Day 7 | 9:28 A.M. | 8.6 | 195 | 197 |
| Day 8 | 1:06 P.M. | 9.6 | 205 | 199 |
| Day 9 | 10:47 A.M. | 9.5 | 183 | 201 |
| Day 10 | 9:20 A.M. | 9.2 | 200 | 198 |
| Day 12 | 8:05 A.M. | 8.5 | 167 | 195 |
| Day 13 | 7:20 A.M. | 9.5 | 134 | 202 |
| Day 14 | 9:34 A.M. | 9.6 | 154 | 203 |
| Day 15 | 8:59 A.M. | 10.1 | 140 | 204 |
| Day 16 | 8:45 A.M. | 10.3 | 164 | 204 |

3. 90 Gallons of Well Water Processed in Tub

A second test was run using a new 90 gallons of water drawn from a well to be processed in a tub. The baseline values for the well water after being pumped were pH 6.8, ORP 190, Dissolved Solids 185, and Voltage −0.630. The start time for this test was 9:30 A.M. with a device built according to one of the above-described embodiments running until about 8:45 pm on Day 1.

| Date | Time | pH | ORP | Dissolved Solids | Volts |
|---|---|---|---|---|---|
| Day 1 | 1:19 P.M. | 6.3 | 183 | 188 | −.352 |
| | 2:09 | 6.9 | 180 | 189 | −.303 |
| | 2:31 | 6.2 | 178 | 185 | |
| | 3:08 | 6.6 | 176 | 190 | −.305 |
| | 3:53 | 6.1 | 177 | 190 | −.601 |
| | 4:05 | 6.8 | 173 | 256 | −.324 |
| | 4:23 | 6.9 | 164 | 259 | |
| | 4:29 | 7.0 | 153 | 280 | −.304 |
| | 5:05 | 7.0 | 150 | 277 | −.294 |
| | 5:18 | 7.5 | 151 | 275 | −.328 |
| | 5:34 | 7.2 | 151 | 288 | −.305 |
| | 6.01 | 7.1 | 148 | 297 | −.306 |
| | 6:30 | 6.6 | 147 | 289 | −.602 |
| | 7:58 | 7.4 | 138 | 296 | −.311 |
| device stopped | 8:45 | 7.0 | 136 | 300 | −.451 |
| Day 2 | 8:02 A.M. | 7.4 | 114 | 303 | −.312 |
| | 5:51 P.M. | 7.7 | 110 | 301 | −.329 |
| | 8:02 | 7.2 | 124 | 310 | −.320 |
| Day 3 | 11:00 A.M. | 6.9 | 164 | 306 | −.328 |
| | 5:38 P.M. | 7.5 | 142 | 311 | −.355 |
| Day 4 | 7:01 A.M. | 7.2 | 107 | 309 | −.346 |
| | 7:44 P.M. | 7.4 | 084 | 323 | −.434 |
| Day 5 | 8:23 A.M. | 7.0 | 094 | 313 | −.564 |
| | 1:09 P.M. | 7.5 | 073 | 315 | −.611 |
| | 9:00 | 7.1 | 110 | 316 | −.465 |
| Day 6 | 11:01 A.M. | 7.0 | 152 | 311 | −.412 |
| | 10:13 P.M. | 7.3 | 148 | 309 | −.412 |

During operation of the device on Day 1, run-time speeds were varied. At times, an ambient air sipping straw was inserted into the unit to inject atmospheric air into the process, which accounts for some shifts in run-time values.

g. Fountain/Swimming Pool Experiments

One gallon of six-month old processed water eradicated a dense population of mosquito larvae in a waterfall/fountain and left what was previously cloudy, opaque water clear and crystalline five days after the processed water was added to the waterfall/fountain.

After 48 hours of operation, a 25,000 gallon swimming pool that had not been treated in any way for eight months and which was infested with an extremely dense mosquito larvae, waterborne worm and water bug population was rendered completely free of these undesirables. Experimental fish within the same water continued to thrive for weeks with a zero mortality rate until the fish were finally removed from the pool.

Ten thousand gallons of the above-mentioned swimming pool water was released into a vernal pond storm drain system. It clarified, purified and revitalized this ecosystem. For the first time in six years, the bottom features and deposited materials were clearly visible with no lensing effect. Weeks after application, vegetation along the banks flourished in an unprecedented way and the water clarity remained clean and clear.

A swimming pool in Maryland, which had been covered and untreated in any way for two seasons, was opened and exposed to the elements for 30 days prior to initiation of processes. The water had become a veritable primordial soup. Water was green, algae covered all submerged surfaces, mosquito larvae populations were dense, many species of surface and sub-surface dwelling water-bugs were present and a swampy odor was evident. Within 90 minutes of initiation of the process, water temperature decreased from 89.7° F. to 74.9° F. This phenomenon was also noted in the previous California swimming pool test where all algae turned from yellow and green to brown within three hours, water became crystal clear within 24 hours with the exception of floating debris and rafts of a dense film of coagulating gelatinous material comprised of dead microorganisms formed on the surface. Within 72 hours, the film and floating debris had sunk to the bottom of the pool leaving a mirror surface. By day four, all mosquito larvae had perished and sub-surface water bug populations were substantially diminished. Surface dwelling bugs appear to be unaffected as of the last observation. Initial pH 7.6, post-process fluctuates between 7.1 and 7.9. Initial ORP 086, post-process fluctuates between 110 and 177, Initial Dissolved Solids 0.015 ppm, post-process ranges between 0.005 and 0.009. The water was odor free.

The above examples of what can be described as "fevered water" were caused by the elevation of water temperature that results from organic decomposition, fermentation, i.e., chemical and biochemical reactions, which increase with sun exposure, and decreasing levels of dissolved Oxygen. In the experiments, tens of thousands of gallons of stagnant, odious water experienced a dramatic decrease in temperature within minutes of initiating the process. Subsequent tests involving similar circumstances have resulted in temperatures falling as many as 30° F. within 45 minutes.

h. Organic, Biological, Microbiological Effects (Elimination/Inhibition) Experiments Extensive testing and observation of water samples obtained from many diverse environments (e.g., California, Maryland, and Mexico) during and post-processing indicates that, if allowed to process uninterrupted over time, all microbiologicals visible up to 120× under a microscope are killed and eliminated. If the water source is heavily burdened with microbiologicals, at a certain point, they become floating gelatinous mass, which eventually sinks. The introduction of a small volume of water to a larger volume of water is capable of diminishing and/or eliminating significant microbiological populations while being clearly beneficial to fish, frogs, snails, mammals, etc.

Application of the system results in the elimination of most algae, mold, moss and other visible biologicals/organics and microbiological organisms within their humid systemically associated environments. Process water and evaporative cooling systems are known for the swampy odors they emit. Maintenance personnel will often add a bit of chlorine to the water to eliminate the biologicals responsible for their attendant smell. It is believed that a system built according to an embodiment of the invention will eliminate these disagreeable odors without the use of any chemicals.

Water-based processing, conditioning, cooling and purification systems share common issues requiring regular attention and maintenance: replacement and/or the cleaning of filters, screens, pads, etc. These items accumulate mineral deposits and other contaminants very quickly and, to maintain systemic efficiencies, must be serviced often. Most common methods are labor intensive, requiring the use of brushes, chemical cleaners, high-power spray rinsing, etc. A system built according to the invention has been found to virtually eliminate mineral and contaminant accumulation. Small residual accumulations that do occur, when allowed to dry, manifest in the form of unbound dust, powder and surface sludge that can easily be wiped or blown away with compressed air.

System source/feed water typically has high concentrations of dissolved mineral and particulate matter in suspension. Use of the system to process water removes minerals and contaminants, rendering water that remains clear and crystalline. Matter in suspension within a volume of water is precipitated out, tending to bind, coagulate, congeal and be deposited in low-flow areas such as pans, sumps, tanks, reservoirs, etc. The material exhibits cohesiveness and remains bound as a sludge-like compound which can be easily removed during maintenance.

Over a period of about 12 days, an experiment was conducted using water samples from a spring-fed creek in Maryland.

On a Monday, water samples were gathered from a spring-fed creek with jars. The water samples were examined with a microscope, and the presence of various microorganisms, including active colonies and individuals of elongated yellow capsule-like organisms which were identified as e-coli, were identified. Immediately upon introduction of a drop of processed water to the slide containing the creek water, the formerly clear yellow e-coli organisms filled internally with black striated lines and what appeared as gray-black fibrous clusters enveloped the organisms which became inactive on contact and appeared to die. It appeared that other microorganisms began feeding on their corpses. Subsequently, a small amount of water was added to the unsealed jar of sample creek water. By day three, no living organisms remained in the jar of sample creek water. The water was crystalline, all sediments and previously suspended solids having precipitated to the bottom of the jar.

Stagnant rainwater samples discovered in outdoor plastic container containing decomposing leaves and grass were collected also on that Monday. It was observed that there were active populations and colonies of microorganisms (no e-coli) to be present in the stagnant rainwater samples. A small amount of processed water was added to these samples. Again, within three days no living organisms remained with the exception of some very small active black specks which proved to be mosquito larvae. Over subsequent days, the water remained clear of other microorganisms and the mosquito larvae progressed to their final stage of development, at which point they were disposed of. Since this experiment was run, it has been discovered that the addition of one or more brass disks to the process results in the immediate eradication of mosquito larvae.

On Thursday, two (2) one-gallon pitchers of processed water were poured into the spring-fed creek previously described. After several days passed, another sample of the creek water was gathered and observed under the microscope. The presence of active biological organisms was minimal, and no living e-coli forms were found. The dead e-coli forms and fragments of dead e-coli forms displayed the same cloudy and dark-material characteristics as those observed in the creek water sample taken on the original Monday.

Two Saturdays later, an additional sample of creek water was taken. The results of water observed under the microscope were virtually identical to the first Thursday's results.

FIGS. 40A-40C illustrate the effect of adding 10,000 gallons of processed water from one of the swimming pool tests to a heavily stressed/contaminated vernal drainage-collection pond (see FIG. 40A). As with the spring-fed creek water tests, the water became crystal clear and the bottom was visible through the water (see FIGS. 40B and 40C). In addition, the level of wildlife visiting the pond increased dramatically over the level observed prior to adding the processed water.

When a device built according to one of the above-described embodiments is used to process water, the resulting water has a significant elevation in levels of dissolved Oxygen (DO). For example, muddy, smelly irrigation canal water with initial DO of 1.8 milligrams per liter, after processing had a DO content of 12 milligrams of DO per liter and the water was rendered clear and odor-free.

i. Desalinization

Five pounds of table salt were added to 90 gallons of water and stirred into solution. After four hours of processing, the water became stratified, fresher water on the top with greater concentrations of salt on the bottom. Within 24 hours, large amounts of the salt had been precipitated out and deposited in low-flow areas on the bottom of the vessel leading to stratification between water and the salt.

j. Electroplating

Significant levels of electrolytic activity take place within the process, which is most clearly demonstrated in systems utilizing disk assemblies incorporating two or more metals. An example is brass and stainless steel. FIG. 41 shows brass having been plated out onto stainless steel components, even though all internal moving components are electrically isolated. Using a system built according to one embodiment of the invention is believed to create the electrolytic process through motion and materials relationships alone, without any requirement for the induction of ancillary electricity through customary anodic/cathotic processes. The system generates highly electrolytic/electro-dynamic action which is similar, although potentially more profound, compared to current technological approaches for the creation of colloidal suspensions of organic matter, metals and minerals. Based on the stunning results that take place in plant and animal development and improvement, what is believed to be happening is that metals and minerals present in water become colloidal suspensions through the process that makes them more available for assimilation/metabolization by plants and animals. It is also believed that, when highly energetic water is applied to soil, it serves to react with and activate latent nutrients in the soil in such a way as to convert them into a condition for enhanced and beneficial assimilation.

k. Freezing of Processed Water

Processed water has been subjected to temperatures as low as zero degrees Fahrenheit for days at a time, causing the formation of an ice shell while the center core volume remains liquid. At a certain point the outer shell will crack, allowing equalization of pressures, remnant motion and energy, and the eventual freezing of the entire volume of water Exposure to freezing temperatures as low as zero degrees Fahrenheit results in dramatic crystalline ice formations within the water, some of them rising above the water level. After prolonged exposure to freezing temperatures, a portion of the water remains in a fluid/liquid condition, demonstrating residual energetic motion that has precluded the freezing of the entire volume of water. FIGS. 42A-42D illustrate some examples of these phenomena.

l. Densification of Water

In experiments conducted on contained volumes of water, significant out-gassing occurs for a period of time, dependent on the volume of water involved, even though the unit is completely submerged. This process results in the literal densification of the water. An example is two identical vessels with one filled with tap water weighs 8.85 pounds as compared to the other vessel filled with water that weighs 9.15 pounds. Another example: A 90 gallon vessel has experienced a water level drop of 0.3" after three hours of processing. Over time, the water becomes progressively more viscous, which is evidenced by the operational speed of the system dropping, over time, by as much as 300 to 400 RPM without increasing electrical power input. In this example, operational speed at 8:30 P.M. is 1240 RPM and at 9:00 A.M. is 870 RPM. Running at elevated speeds tends to produce less viscous water. Objects floated in the densified water are more buoyant than when they are floated in the control water.

m. Processed Water as a Transmitting and Replication Media

Processed water has a transmitting, communicative effect on nearby, unprocessed water and on untreated water to which processed water is introduced. The inventors have seen this phenomenon occur on different occasions. Examples of as little as half a percent of processed water added to untreated water have transmitted and replicated these effects, which become more profound over time; eventually reaching a state of what may be referred to as a state of maturity. These same effects have been achieved in dealing with extensive volumes of water, i.e., treatment of a domestic water well discussed above, precluding the necessity of direct processing.

A container of water is drawn from water to be processed. It is sealed and placed in close proximity to the water which will be processed. A unit processes the mother water. During and post-processing, water values in the container will chase/mirror the values of the larger volume of water.

n. Distilled Water pH Tests

Two tests were run involving distilled water to determine the impact on pH values for the distilled water after running a device built according to one of the above-described embodiments and mixing processed water into the vessel with the distilled water.

1. Distilled Water Test 1

Clean, distilled water beginning with a pH of 6.9, processed within a sealed container, precluding the possibility of entrainment of atmospheric air/oxygen, undergoes a pH increase to 7.95 over time, which clearly demonstrates uptake and potentially entrainment of supplemental oxygen as a direct result of the dynamic process. Once the system was turned off, water pH values fluctuated in the 7.3-7.9 range. It is believed these changes in pH are attributed to changes in values caused by the process, as outside air was precluded and other elements are not present in distilled water. Product discharge was submerged at the bottom of the container.

| Date  | Time      | pH   |                   |
|-------|-----------|------|-------------------|
| Day 1 | 7:00 P.M. | 6.9  | process started   |
|       | 7:20      | 7.33 |                   |
|       | 7:40      | 7.71 |                   |
|       | 8:00      | 7.71 |                   |
|       | 8:20      | 7.66 |                   |
|       | 8:40      | 7.59 |                   |
|       | 9:00      | 7.62 |                   |

-continued

| Date  | Time      | pH   |                   |
|-------|-----------|------|-------------------|
|       | 9:30      | 7.66 |                   |
|       | 10.0      | 7.64 | turned off system |
|       | 10:20     | 7.39 |                   |
|       | 10:50     | 7.22 |                   |
| Day 2 | 8:00 A.M. | 7.42 | restarted system  |
|       | 8:55      | 7.39 |                   |
|       | 9:05      | 7.64 |                   |
|       | 9:15      | 7.78 |                   |
|       | 9:40      | 7.95 |                   |
|       | 10:00     | 7.95 | turned off system |

2. Distilled Water Test 2

The second distilled water test involved mixing two cups distilled water with two tablespoons of processed water. The starting values for the distilled water were pH 7.6, ORP 098, and Dissolved Solids 001. The starting values for the processed water were pH 6.8, ORP 164, and Dissolved Solids 306.

| Date  | Time      | pH  | ORP | Dissolved Solids |
|-------|-----------|-----|-----|------------------|
| Day 1 | 9:45 A.M. | 7.7 | 105 | 023              |
|       | 10:05     | 6.9 | 115 | 026              |
|       | 1:00 P.M. | 7.3 | 128 | 023              |
|       | 5:35      | 8.4 | 102 | 024              |
| Day 2 | 6:57 A.M. | 7.8 | 089 | 030              |
|       | 5:14      | 7.9 | 109 | 034              |
| Day 3 | 8:16 A.M. | 7.7 | 052 | 032              |
|       | 1:14 P.M. | 7.5 | 053 | 034              |
|       | 9:03      | 7.8 | 072 | 030              |
| Day 4 | 11:08 A.M.| 7.5 | 101 | 033              |
| Day 6 | 11:01 A.M.| 8.1 | 080 | 035              |
| Day 7 | 2:34 P.M. | 7.6 | 083 | 036              | o. Laboratory Water Tests

Water was taken from two different sources in Mexico and was treated with a system built according to an embodiment of the invention. The water was tested by the Instituto Politecnico Nacional. The first water collection was from the central patio fountain in Jiquilpan, Michoacan, Mexico where the water was contaminated and algae infested. The second water collection was from an irrigation canal in the Vallado del Rey near Zamora, Michoacan, Mexico.

Both samples showed an improvement in the quality of the water from being treated by a system. The tables shown in FIGS. 43 and 44 show what the initial readings were for the water samples, readings after being treated for two hours, and readings after being treated for four hours. From each water collection, there were three samples taken prior to running the system, at 2 hours after the system began running, and at 4 hours after the system began running. Just one sample out of each set of three samples was chemically tested, while all the samples were biologically tested. The biological sampling and quantification is a population approximation based on statistical methodologies.

1. Central Patio Fountain Water

Over the course of the water being treated, the amount of sulfates, the amount of potassium, the number of coliforms, the number of E. coli, the amount of molds, and the amount of algae were decreased tremendously between the initial and after 4 hours of treatment. FIG. 43 shows a table with the resulting measured data at the three measurement points and three samples for each point with the left side of the table listing the parameter being measured and the right side identifying the units of measure and/or the methodology used to conduct the measurement.

2. Vallado Del Rey Water

Over the course of the water being treated, the amount of sulfates, the amount of potassium, the number of coliforms, the number of *E. coli*, the amount of molds, and the amount of algae were decreased tremendously between the initial and after 4 hours of treatment. The number of total coliforms was decreased by more than 99.9% while fecal coliforms were decreased by more than 88%. With both coliform measurements the largest drop occurred in the first two hours of water treatment. Another interesting result with this water was that the total hardness decreased by approximately 11.5%. FIG. 44 shows a table with the resulting measured data at the three measurement points and three samples for each point with the left side of the table listing the parameter being measured and the right side identifying the units of measure and/or the methodology used to conduct the measurement.

It should be noted that the present invention may, however, be embodied in many different forms and should not be construed as limited to the embodiments and prototype examples set forth herein; rather, the embodiments set forth herein are provided so that the disclosure will be thorough and complete, and will fully convey the scope of the invention to those skilled in the art. The accompanying drawings illustrate embodiment and prototype examples of the invention.

As used above "substantially," "generally," and other words of degree are relative modifiers intended to indicate permissible variation from the characteristic so modified. It is not intended to be limited to the absolute value or characteristic which it modifies but rather possessing more of the physical or functional characteristic than its opposite, and preferably, approaching or approximating such a physical or functional characteristic. "Substantially" also is used to reflect the existence of manufacturing tolerances that exist for manufacturing components.

Based on this disclosure, one of ordinary skill in the art will appreciate that the use of "same", "identical" and other similar words are inclusive of differences that would arise during manufacturing to reflect typical tolerances for goods of this type.

Those skilled in the art will appreciate that various adaptations and modifications of the exemplary and alternative embodiments described above can be configured without departing from the scope and spirit of the invention. Therefore, it is to be understood that, within the scope of the appended claims, the invention may be practiced other than as specifically described herein.

We claim:

1. A system comprising:
   a motor;
   a vortex module having
      a housing,
      a plurality of inlets spaced around the periphery of the housing, and
      a vortex chamber formed in said housing and in fluid communication with said plurality of inlets extending from said vortex housing at an acute angle and are evenly spaced about said vortex housing; and
   a disk-pack module having
      a housing having a discharge chamber formed in said disk-pack housing, and said discharge chamber having at least one discharge port providing a fluid pathway from said discharge chamber to outside of said disk-pack housing, and
      a disk-pack turbine having an expansion chamber formed in an axial center and in fluid communication with said vortex chamber, said disk-pack turbine having a plurality of spaced apart disks providing a plurality of passageways between said expansion chamber and said discharge chamber, said disk-pack turbine connected to said motor.

2. The system according to claim 1, further comprising an intake module including
   a intake housing with at least one intake opening passing through it into an intake chamber formed in said intake housing, and
   a plurality of ports in fluid communication with said intake chamber, each of said plurality of ports is in fluid communication with one inlet of said vortex module.

3. The system according to claim 2, further comprising at least one passageway connecting each port to said respective inlet, wherein said passageway passes through the disk-pack module.

4. The system according to claim 2, further comprising at least one tube connecting each port to said respective inlet.

5. The system according to claim 2, further comprising a second driveshaft engaging said motor, and
   said intake module further includes at least one impeller engaging said second driveshaft, said at least one impeller rotates about said second driveshaft in said intake chamber.

6. The system according to claim 1, wherein said vortex module further includes at least one supplemental port in fluid communication with said vortex chamber where said at least one supplemental port extends from a top of said vortex housing.

7. The system according to claim 1, wherein said vortex chamber includes at least one section having walls that angle inward from a top of the section to a bottom of the section.

8. The system according to clam 1, further comprising a plurality of wing shims connected to said plurality of disks, said wing shims maintain the spacing between the disks and the alignment of the disks to each other.

9. The system according to claim 1, further comprising an intake module having a screen.

10. The system according claim 9, wherein said screen includes
    an inner screen having a plurality of slots passing therethrough;
    a bottom connected to said inner screen; and
    an outer screen having a plurality of slots passing therethrough in rotational engagement with said inner screen, and
    wherein an overlap of the slots of said inner screen and the slots of said outer screen control a size of particle permitted to enter said system.

11. The system according to claim 1, further comprising an intake module having an intake chamber housing an impeller having a plurality of blades,
    said impeller is rotated by said motor.

12. The system according to claim 1, further comprising a controller in communication with said motor, said controller having means for controlling the operational speed of the motor based on at least one of the following criteria: time of day, day, time of month, month, time of year, time since starting motor, and feedback regarding water characteristics.

13. The system according to claim 1, wherein said discharge chamber having a parabolic shape having a plurality of curved surfaces.

14. The system according to claim 1, wherein each of said inlets of said vortex module are spaced evenly around said vortex housing and extend from said vortex housing at an acute angle as measured between respective fluid flows.

15. A disk-pack turbine comprising:
a top disk plate having an opening passing through an axial center of said top disk plate;
a plurality of disks with each disk having an opening passing through an axial center of said disk;
a bottom plate having a mount capable of attachment to at least one of a motor and a driveshaft; and
a plurality of wing shims connecting and aligning said top disk plate, said plurality of disks and said bottom plate to form an area defined by the plurality of openings and a depression in said bottom plate, said plurality of wing shims space apart said plurality of disks such that a disk chamber is formed between adjacent disks.

16. The disk-pack according to claim 15, wherein at least three of the disk chambers have a height of at least 1.7 mm, said disks include stainless steel, and
said wing shims include at least one of brass and stainless steel.

17. The disk-pack turbine according to claim 15, wherein at least three of the disk chambers have a height of between 1.3 mm and 2.5 mm.

18. The disk-pack turbine according to claim 15, wherein each of said wing shims includes
a plurality of spacers, where at least one spacer is present between adjacent disks of said plurality of disks, each spacer includes at least one opening passing therethrough, and
at least one connection member; and
wherein each disk includes a plurality of openings passing therethrough with at least one opening being associated with each wing shim,
for each wing shim, said at least one connection member connects said spacers of said wing shim and said plurality of disks together, said at least one connection member aligns said spacers relative to said plurality of disks.

19. The disk-pack turbine according to claim 15, wherein said top disk plate further includes a bushing, and said bottom plate further includes a bushing and a depression located at an axial center of said bottom plate.

20. The disk-pack turbine according to claim 15, wherein at least two of said plurality of disks are made of at least one of stainless steel, brass, and polycarbonate.

21. The disk-pack turbine according to claim 15, wherein said mount is on an opposing surface of said bottom plate from said top disk plate and said depression.

22. A system comprising:
a motor;
a vortex module having
a housing,
a plurality of inlets spaced around the periphery of the housing, and
a vortex chamber formed in said housing and in fluid communication with said plurality of inlets extending from said vortex housing at an acute angle and are evenly spaced about said vortex housing; and
a disk-pack module having
a housing having a discharge chamber formed in said disk-pack housing, and said discharge chamber having at least one discharge port, and
a disk-pack turbine having an expansion chamber formed in an axial center and in fluid communication with said vortex chamber, said disk-pack turbine having a plurality of spaced apart disks providing a plurality of passageways between said expansion chamber and said discharge chamber, said disk-pack turbine connected to said motor; and
wherein a fluid pathway exists from at least one of said plurality of inlets to said vortex chamber to said expansion chamber through at least one passageway between adjacent disks into said discharge chamber and out said at least one discharge port with fluid flowing along the fluid pathway when said disk-pack turbine is rotated by said motor.

* * * * *